(12) United States Patent
Chisena et al.

(10) Patent No.: US 12,527,588 B2
(45) Date of Patent: Jan. 20, 2026

(54) MICROCATHETER SYSTEMS AND METHODS FOR CROSSING TOTAL OCCLUSIONS

(71) Applicant: Amplitude Vascular Systems, Inc., Boston, MA (US)

(72) Inventors: Robert Chisena, Boston, MA (US); Hitinder Gurm, Boston, MA (US)

(73) Assignee: Amplitude Vascular Systems, Inc., Waltham, MA (US)

( * ) Notice: Subject to any disclaimer, the term of this patent is extended or adjusted under 35 U.S.C. 154(b) by 149 days.

(21) Appl. No.: 18/686,996

(22) PCT Filed: Aug. 17, 2022

(86) PCT No.: PCT/US2022/040586
§ 371 (c)(1),
(2) Date: Feb. 27, 2024

(87) PCT Pub. No.: WO2023/034023
PCT Pub. Date: Mar. 9, 2023

(65) Prior Publication Data
US 2024/0366243 A1 Nov. 7, 2024

Related U.S. Application Data

(60) Provisional application No. 63/238,381, filed on Aug. 30, 2021.

(51) Int. Cl.
*A61B 17/22* (2006.01)
*A61M 25/00* (2006.01)
(Continued)

(52) U.S. Cl.
CPC .... *A61B 17/22* (2013.01); *A61B 2017/22038* (2013.01); *A61B 2017/22065* (2013.01);
(Continued)

(58) Field of Classification Search
CPC .................. A61B 17/22; A61B 17/221; A61B 2017/22001; A61B 2017/22037;
(Continued)

(56) References Cited

U.S. PATENT DOCUMENTS 4,676,228 A * 6/1987 Krasner ............ A61B 1/00082
600/116
11,464,949 B2 10/2022 Chisena et al.
(Continued)

FOREIGN PATENT DOCUMENTS

EP 0987045 A2 3/2000
JP 2010527678 A 8/2010
(Continued)

*Primary Examiner* — Tuan V Nguyen
(74) *Attorney, Agent, or Firm* — Bret E. Field; Bozicevic, Field & Francis LLP

(57) ABSTRACT

A microcatheter system for crossing total occlusions including a distal crosser unit and an actuator is disclosed. The distal crosser unit comprises: a microcatheter having a guidewire lumen; a guidewire present in the guidewire lumen and extending beyond the distal end of the microcatheter; a proximal balloon attached to both the microcatheter and the guidewire, wherein the proximal balloon is configured to longitudinally expand; and a distal anchor member present on the guidewire. And the actuator is configured to sequentially inflate and deflate the proximal balloon such that the distal crosser unit progressively moves across a chronic total occlusion.

20 Claims, 20 Drawing Sheets

US 12,527,588 B2
Page 2

(51) Int. Cl.
*A61M 25/09* (2006.01)
*A61M 25/10* (2013.01)

(52) U.S. Cl.
CPC .............. *A61B 2017/22094* (2013.01); *A61M 2025/0042* (2013.01); *A61M 2025/09008* (2013.01); *A61M 2025/1004* (2013.01); *A61M 25/1018* (2013.01)

(58) Field of Classification Search
CPC ........... A61B 2017/22042; A61B 2017/22044; A61B 2017/22045; A61B 2017/22048; A61B 2017/22049; A61B 2017/22038; A61B 2017/22065; A61B 2017/22069; A61B 2017/22094; A61M 2025/09008; A61M 25/1018; A61M 25/10185
See application file for complete search history.

(56) References Cited

U.S. PATENT DOCUMENTS

| | | |
|---|---|---|
| 2007/0088380 A1 | 4/2007 | Hirszowicz et al. |
| 2009/0171278 A1* | 7/2009 | Hirszowicz ......... A61M 25/104 604/509 |
| 2009/0292296 A1* | 11/2009 | Pansky ............ A61B 17/22012 606/127 |
| 2010/0125244 A1 | 5/2010 | McAndrew |
| 2012/0271339 A1 | 10/2012 | O'Beirne et al. |
| 2014/0039513 A1 | 2/2014 | Hakala et al. |
| 2016/0174995 A1 | 6/2016 | Turjman et al. |
| 2017/0151415 A1 | 6/2017 | Maeda et al. |
| 2020/0046949 A1 | 2/2020 | Chisena et al. |
| 2021/0001093 A1 | 1/2021 | Govari et al. |
| 2021/0085347 A1 | 3/2021 | Phan et al. |
| 2022/0287730 A1 | 9/2022 | Chisena et al. |
| 2022/0409869 A1 | 12/2022 | Chisena et al. |
| 2023/0380903 A1 | 11/2023 | Chisena et al. |
| 2023/0381472 A1 | 11/2023 | Chisena et al. |

FOREIGN PATENT DOCUMENTS

| | | |
|---|---|---|
| WO | WO2007017876 A2 | 2/2007 |
| WO | WO2019200201 A1 | 10/2019 |
| WO | WO2021076538 A1 | 4/2021 |
| WO | WO2022169778 A1 | 8/2022 |
| WO | WO2023229908 A1 | 11/2023 |
| WO | WO2023230232 A1 | 11/2023 |

* cited by examiner

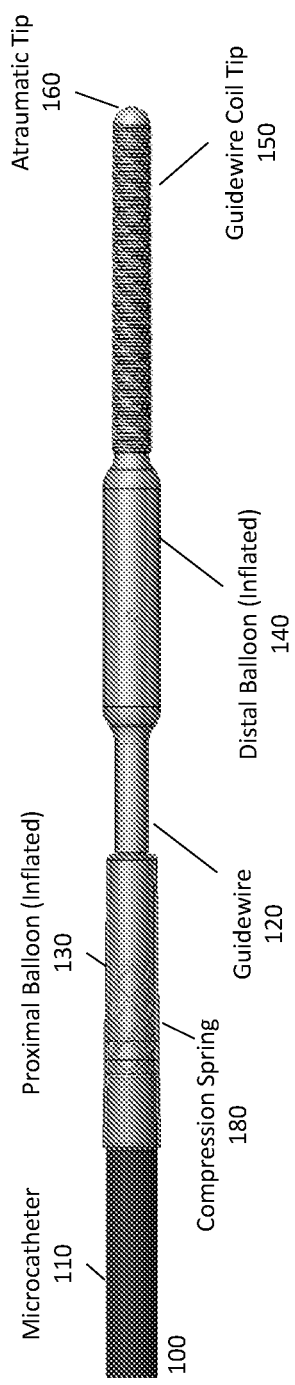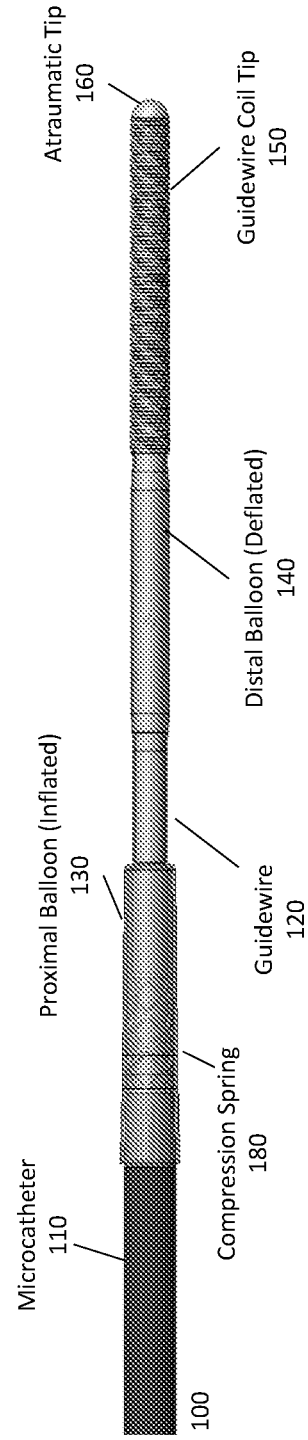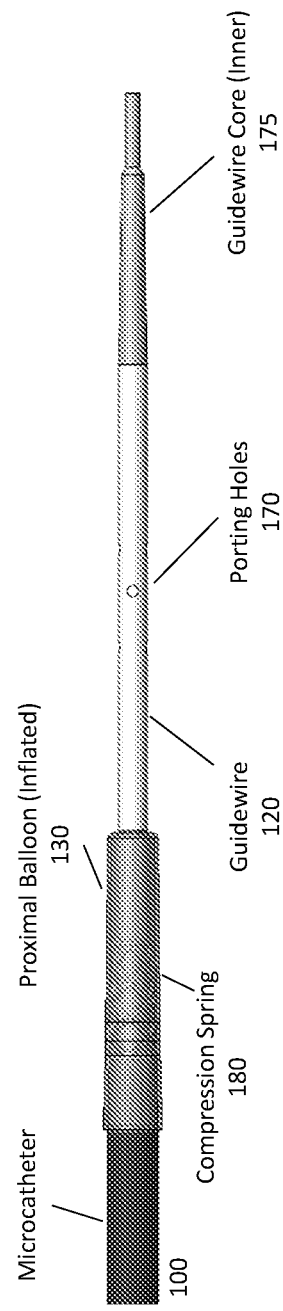
FIG. 1A
FIG. 1B
FIG. 1C

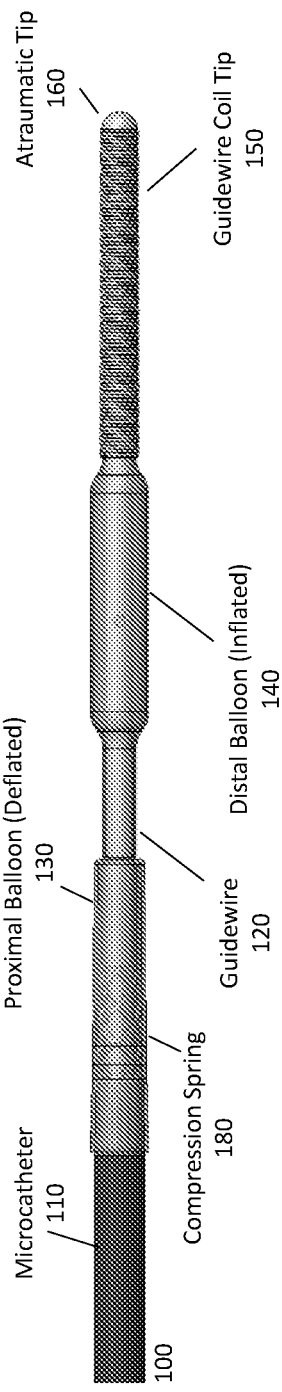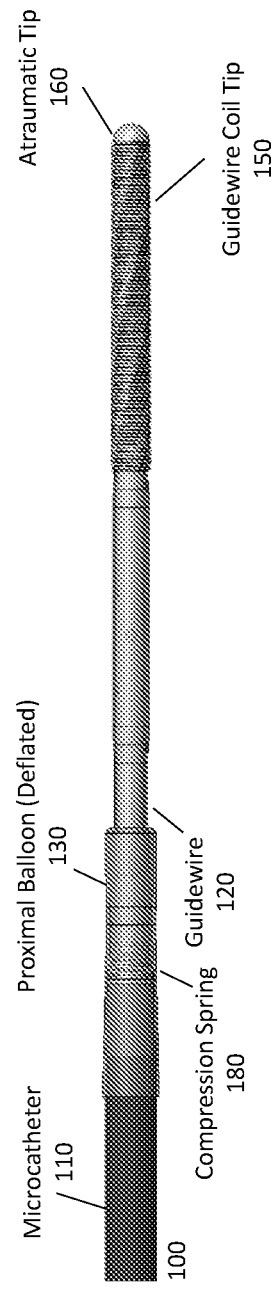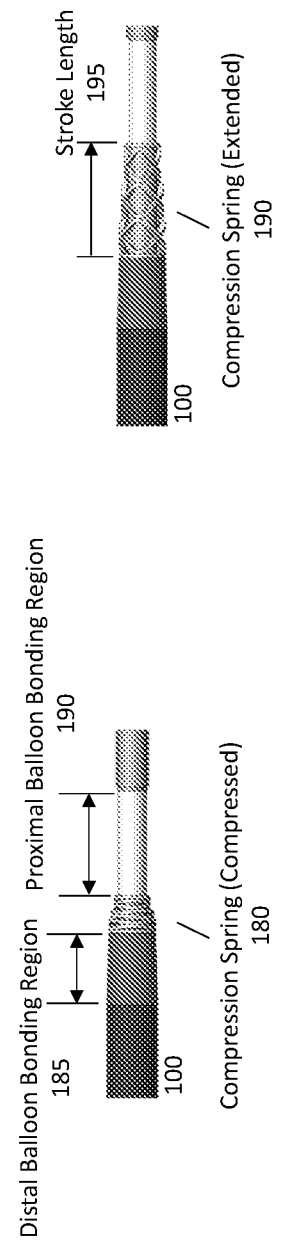
FIG. 1D
FIG. 1E
FIG. 1F
FIG. 1G

FIG. 2

| Step | PB | DB | LS | Description |
|---|---|---|---|---|
| 1 | - | - | C | Guidewire is pushed across initial portion of CTO lesion to initiate treatment |
| 2 | + | - | C -> E | PB is pressurized coinciding with deflation of DB -> PB engages wall (radial expansion), extends spring and pushes inner guidewire across lesion (axial expansion); |
| 3 | + | + | E | DB is pressurized -> DB engages wall; spring is extended to equilibrium state (spring axial travel distance depends on PB pressure, spring force, and limited balloon material extension) |
| 4 | - | + | E -> C | PB is deflated -> PB releases wall (radial compression) and spring compresses to pull outer shaft through the CTO towards DB |
| 5 | - | + | C | Spring fully compresses |
| 6 | + | - | C -> E | Process restarts back to Step 2 continuously advancing system across lesion |

PB = Proximal Balloon    LS = Linear Spring

DB = Distal Balloon    C = Compressed

+ = Pressurized    E = Extended

- = Deflated

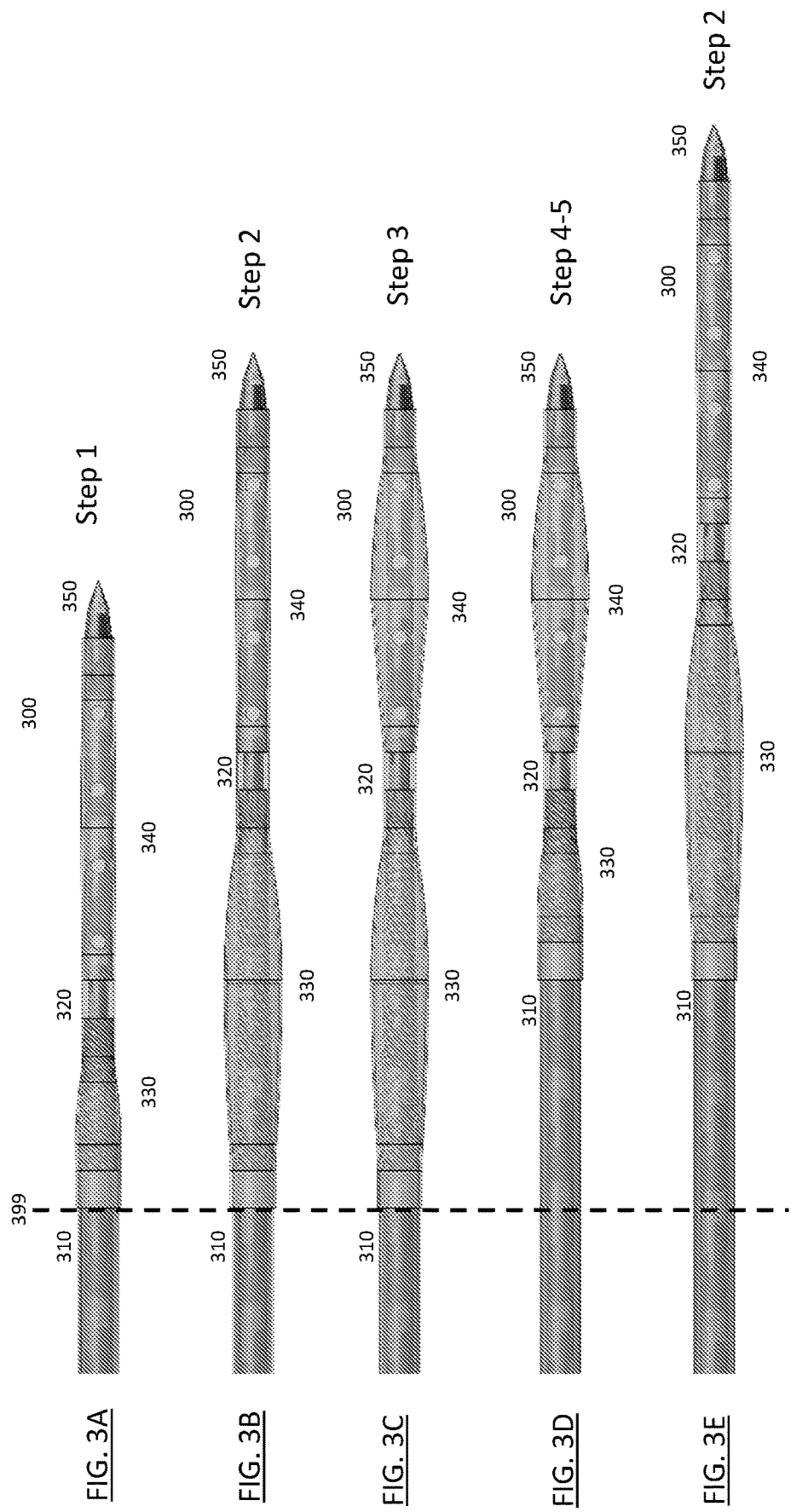

Proximal Inflation Unit

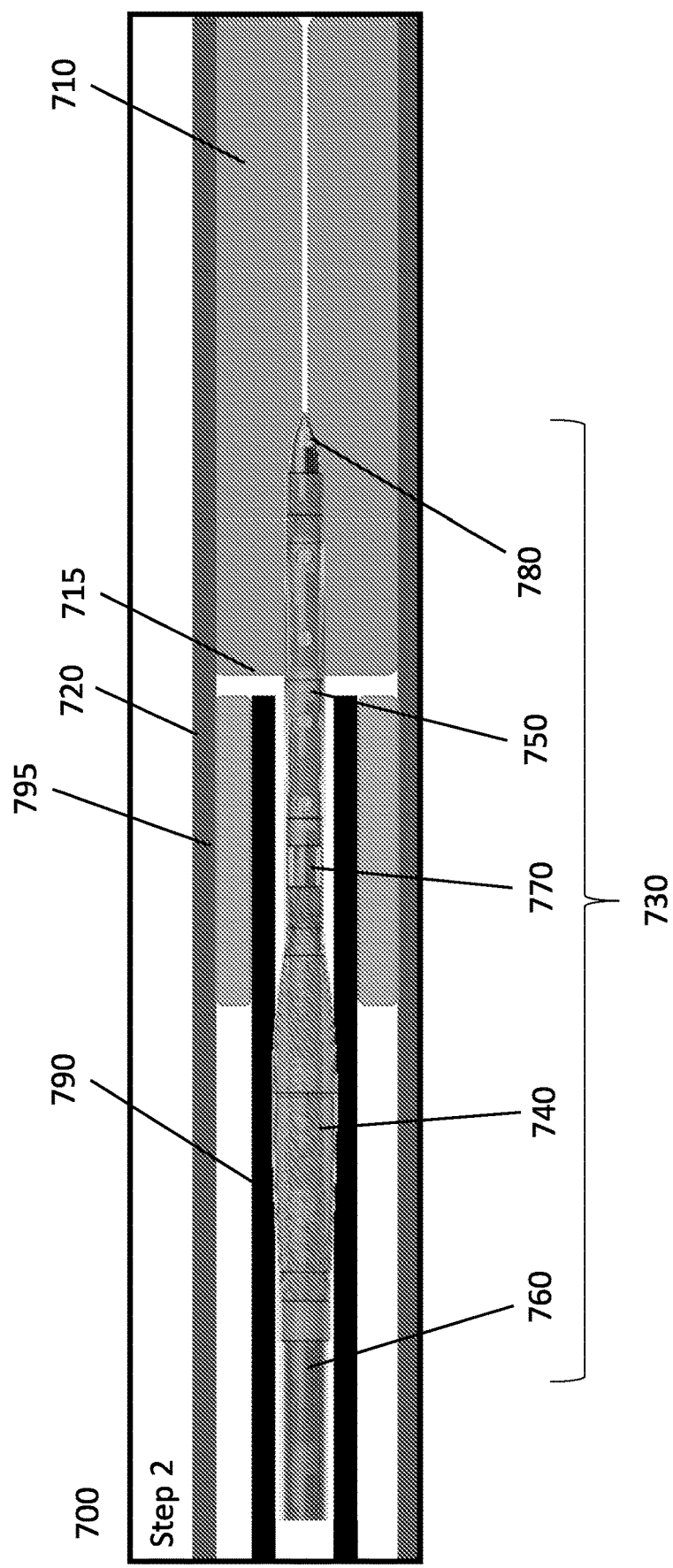

~500 mm/s

~600 mm/s

MICROCATHETER SYSTEMS AND METHODS FOR CROSSING TOTAL OCCLUSIONS

CROSS-REFERENCE TO RELATED APPLICATIONS

Pursuant to 35 U.S.C. § 119 (e), this application claims priority to the filing date of U.S. provisional patent application Ser. No. 63/238,381 filed Aug. 30, 2021; the disclosure of which application is incorporated herein by reference in its entirety.

INTRODUCTION

Chronic total occlusions (CTOs) are complete atherosclerotic vessel occlusions that occur in cardiovascular arteries. Koelbl C O, Nedeljkovic Z S, Jacobs A K. Coronary Chronic Total Occlusion (CTO): A Review. Rev Cardiovasc Med. 2018; 19(1): 33-39. doi: 10.31083/j.rcm.2018.01.906. CTOs occur in approximately 20% of all patients undergoing coronary angiography. Fefer P, Knudtson M L, Cheema A N, et al. Current Perspectives on Coronary Chronic Total Occlusions. J Am Coll Cardiol. 2012; 59(11): 991-997. doi: 10.1016/j.jacc.2011.12.007. Attempts at endovascular interventions are low at 10-15%. Id. Interventions that are attempted have considerably lower procedural success rates, in between 55% and 90%, compared to >95% in non-occluded or acutely occluded coronary vessels. Galassi A R, Tomasello S D, Reifart N, et al. In-hospital outcomes of percutaneous coronary intervention in patients with chronic total occlusion: insights from the ERCTO (European Registry of Chronic Total Occlusion) registry. EuroIntervention. 2011; 7(4): 472-479. doi: 10.4244/EIJV7I4A77. See also Galassi A R, Werner G S, Boukhris M, et al. Percutaneous recanalisation of chronic total occlusions: 2019 consensus document from the EuroCTO Club. EuroIntervention. 2019; 15(2): 198-208. doi: 10.4244/EIJ-D-18-00826; Stone G W, Reifart N J, Moussa I, et al. Percutaneous recanalization of chronically occluded coronary arteries: a consensus document: part II. Circulation. 2005; 112(16): 2530-2537. doi: 10.1161/CIRCULATIONAHA.105.583716. Technical challenges surrounding treatment of CTOs include: (1) passing a thin, flexible guidewire across a CTO's proximal cap; (2) navigating through long, tortuous CTO lesions; (3) guiding the guidewire through or around varying tissue densities; and (4) remaining within and reaching the distal "true lumen."

CTOs consist of a proximal cap, often fibro-calcific, a body, and a distal cap. In practice, crossing a CTO can often be performed in an antegrade (from the front) and/or retrograde (from behind) approach. It is found that patients with CTOs often present an impaired left ventricular function, prior history of myocardial infarction, coronary artery bypass grafting (CABG), and a high rate of comorbidity, such as diabetes mellitus and chronic kidney disease.

Successful CTO treatment (surgical or percutaneously) has been observed to improve disease perception, angina frequency and physical limitation compared with those patients treated medically (i.e., without specific CTO treatment). It has been observed that the presence of a CTO was the most important independent predictor of incomplete revascularization in patients with multivessel disease treated with percutaneous coronary intervention (PCI) but not with coronary artery bypass graft (CABG).

With respect to composition of the CTO and planning for treatment thereof, intra-plaque calcium levels often reflect a long duration occlusion, while recent lesions often present a lower amount of calcium and higher quantity of cholesterol and foam cells. Age-related changes in plaque composition from lipid-rich to fibrocalcific might be associated with a lower success rate. A comprehensive lesion evaluation represents a first step for an appropriate treatment strategy, including, potentially, a CTO intervention. Morphology of the proximal cap, length of the occlusion, distal target vessel, presence of interventional collaterals, calcification, and tortuosity are all relevant parameters to consider when planning a CTO intervention.

Typically, conventional guidewires, which are usually 0.22-0.40 mm in diameter, are used to cross the CTO lesion and then are used to guide other endovascular instruments across the lesion. Conventional guidewires usually consist of an inner core and outer spring-coil or polymer jacket. Of the many guidewire features, several important features exist that effect the design of a guidewire: (1) diameter; (2) tip load (i.e., load at which the guidewire starts to buckle); (3) tip shape; (4) coatings; and (5) trackability/support (i.e., the ability of the guidewire body to follow the tip around bends in the luminal tissue). Issues with conventional guidewires cause difficulty in their use, including, for example, guidewire buckling at the CTO proximal cap and difficulty ensuring that the guidewire remains within the true lumen of the luminal tissue.

In addition to the conventional guidewire, specialty crossing techniques and devices exist that aid the interventionalist in crossing CTOs. For example, guidewires can be used to cross in anterograde (crossing through the proximal cap), retrograde (crossing through the distal cap), and/or sub-intimally (i.e., through the subintimal space). Past proposed solutions have included devices with a special support balloon that engages the proximal vessel wall and lengthens during cyclical pulsatile pressure waves to push an inner guidewire through the CTO. Such devices attempt to localize the force required to push the guidewire through the proximal cap to the wall area just proximal to the CTO lesion. Other devices apply high frequency, low-amplitude vibration energy to break through the proximal cap. However, issues with these devices include potential damage to the healthy vessel wall proximal to the CTO, poor trackability, inability to steer the guidewire, and buckling.

SUMMARY

Therefore, there remains a need for improved systems and methods for successfully penetrating the proximal cap of a total occlusion while minimizing the forces on the surrounding vessel wall and successfully navigating the length of the CTO. As described herein, the invention relates to CTO crossing systems and methods. The description will provide a mechanism to improve CTO crossing, including with respect to, (1) minimizing insertion force through the CTO by anchoring in and vibrating through the tissue; (2) navigating through the CTO using a flexible labrum-type guidewire tip; and (3) preventing buckling during insertion.

Microcatheter systems for crossing total occlusions are provided. Aspects of the systems include: a distal crosser unit and an actuator. In embodiments, the distal crosser unit comprises: a microcatheter having a guidewire lumen; a guidewire present in the guidewire lumen and extending beyond the distal end of the microcatheter; a proximal balloon attached to both the microcatheter and the guidewire, wherein the proximal balloon is configured to longitudinally expand; and a distal anchor member present on the guidewire. In such embodiments, the actuator is configured to sequentially inflate and deflate the proximal balloon such that the distal crosser unit progressively moves across a chronic total occlusion. As described in detail below, in embodiments, (1) the guidewire is advanced through the total occlusion by force applied via the inflation of the proximal balloon; (2) the guidewire anchors, via the distal anchor member, to the tissue of the chronic occlusion; (3) the guidewire acts as a rail for the microcatheter to advance over; and (4) once advanced, the microcatheter anchors to the tissue of the chronic occlusion, and the process starts over again. Also provided are methods for modulating a total occlusion, e.g., by crossing a total occlusion or modifying a proximal cap thereof, e.g., by producing a divot or hole in the proximal cap. In addition, standalone distal crosser units and kits comprising components of the systems described herein. The systems, units, methods and kits find use in a variety of different applications, including balloon angioplasty applications or other catheter-based therapies or treatments.

BRIEF DESCRIPTION OF THE FIGURES

FIGS. 1A-1G provide a schematic diagram of a distal crosser unit of a microcatheter system for crossing total occlusions according to an embodiment of the invention.

FIG. 2 provides a summary of the action of components of a microcatheter system for crossing a total occlusion according to an embodiment of the invention.

FIGS. 3A-3I provide various views of an embodiments of a distal crosser unit of the invention.

FIGS. 7A-7J depict aspects of an embodiment of the method of crossing total occlusions of the invention.

DETAILED DESCRIPTION

Figures 3F, 3G, 3H, 3I:
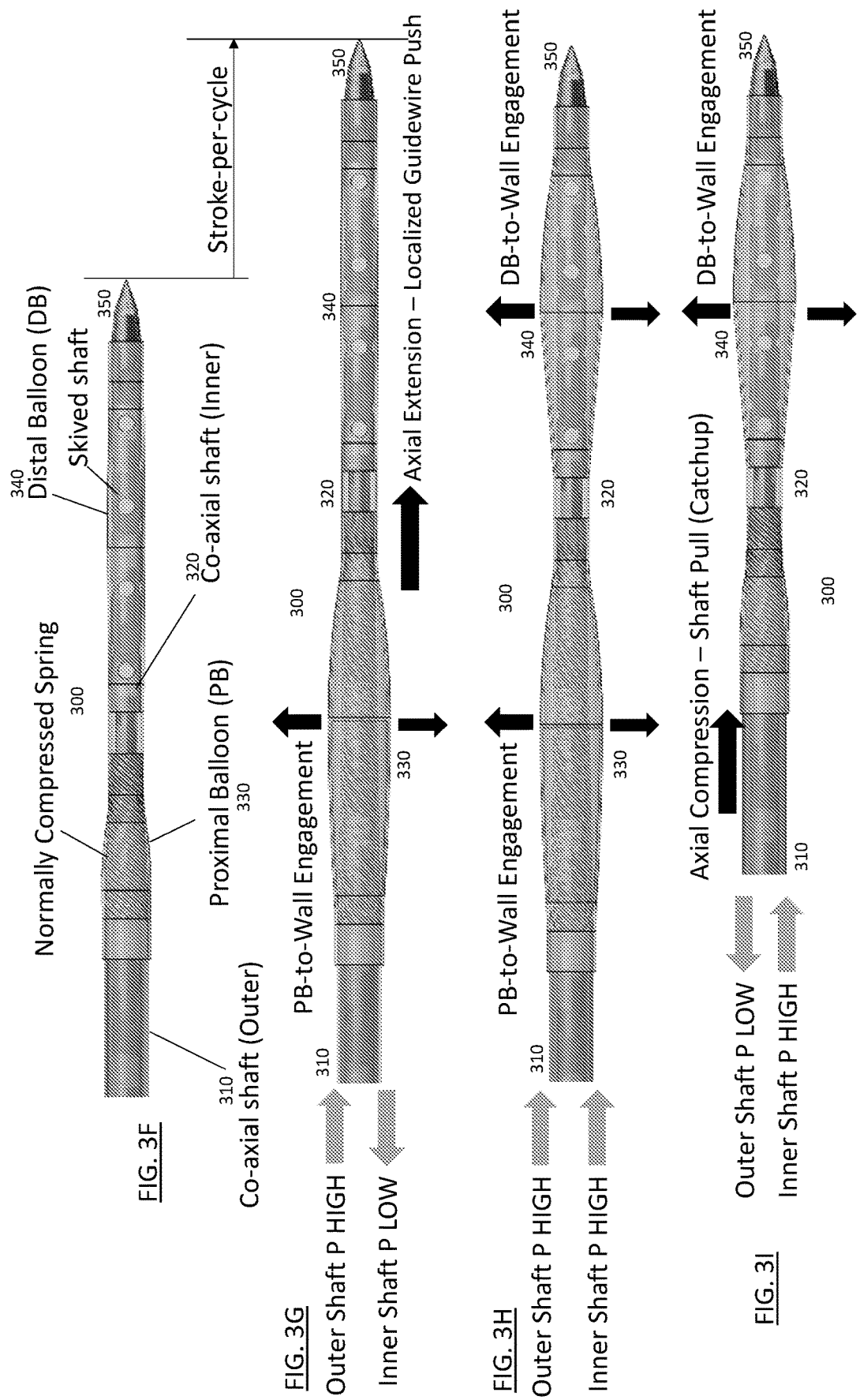

Microcatheter systems for crossing total occlusions are provided. Aspects of the systems include: a distal crosser unit and an actuator. In embodiments, the distal crosser unit comprises: a microcatheter having a guidewire lumen; a guidewire present in the guidewire lumen and extending beyond the distal end of the microcatheter; a proximal balloon attached to both the microcatheter and the guidewire, wherein the proximal balloon is configured to longitudinally expand; and a distal anchor member present on the guidewire. In such embodiments, the actuator is configured to sequentially inflate and deflate the proximal balloon such that the distal crosser unit progressively moves across a chronic total occlusion. Also provided are methods for modulating a total occlusion, e.g., by crossing a total occlusion or modifying a proximal cap thereof, e.g., by producing a divot or hole in the proximal cap. In addition, standalone distal crosser units and kits comprising components of the systems described herein are provided. The systems, units, methods and kits find use in a variety of different applications, including balloon angioplasty applications or other catheter-based therapies or treatments.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the apparatus and method has or will be described for the sake of grammatical fluidity with functional explanations, it is to be expressly understood that the claims, unless expressly formulated under 35 U.S.C. § 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 U.S.C. § 112 are to be accorded full statutory equivalents under 35 U.S.C. § 112.

In further describing various aspects of the invention, the systems and components thereof are described first in greater detail, followed by a review of methods of using the systems as well as kits for practicing the subject methods.

Microcatheter Systems for Crossing Total Occlusions

As summarized above, microcatheter systems for crossing total occlusions are provided. Microcatheter systems of embodiments of the invention are configured to move a guidewire across a chronic total occlusion or severe stricture in a vessel structure or the like by sequentially inflating and deflating a proximal balloon attached to a microcatheter and guidewire. The microcatheter and guidewire may be configured vis a vis the proximal balloon so that inflation of the proximal balloon urges the guidewire to extend further out—i.e., distally, from the microcatheter. While the distal crosser unit of the microcatheter system crosses the total occlusion, the microcatheter that encloses and supports the guidewire extends beyond the distal end of the guidewire by only a specified amount. As such, the guidewire remains supported by the microcatheter as the guidewire is moved across the total occlusion, which offers the advantage of improving the likelihood that a guidewire can successfully cross the total occlusion, e.g., by preventing buckling as in conventional guidewires.

Systems of the invention find use in a variety of applications. In some instances, the systems find use in treating chronic total occlusions. Specifically, systems of the invention find use in treating chronic total occlusions including (1) passing a thin, flexible guidewire across a chronic total occlusion's proximal cap, (2) navigating through long, tortuous chronic total occlusion lesions, (3) guiding the guidewire through or around varying tissue densities, and (4) remaining within and reaching the distal "true lumen" of the chronic total occlusion. For embodiments presented herein, the present disclosure describes applications related to treating chronic total occlusions related to atherosclerotic calcifications within an arterial conduit, such as a coronary or peripheral artery. However, the present system and teachings are not solely limited to chronic total occlusions related to atherosclerotic calcifications nor arterial conduits and may be generally applied to other applications as determined by those skilled in the art.

The systems may be used for crossing total occlusions or strictures or otherwise restricted luminal tissue in tissue locations of any number of different subjects. In some instances, the subjects are "mammals" or "mammalian," where these terms are used broadly to describe organisms which are within the class mammalia, including the orders carnivore (e.g., dogs and cats), rodentia (e.g., mice, guinea pigs, and rats), and primates (e.g., humans, chimpanzees, and monkeys). In some instances, the subjects are humans.

Aspects of the systems include: a distal crosser unit comprising: a microcatheter having a guidewire lumen; a guidewire present in the guidewire lumen and extending beyond the distal end of the microcatheter; a proximal balloon attached to both the microcatheter and the guidewire, wherein the proximal balloon is configured to longitudinally expand; a distal anchor member present on the guidewire; and an actuator configured to sequentially inflate and deflate the proximal balloon such that the distal crosser unit progressively moves across a chronic total occlusion. Additionally, in certain embodiments, the system may further comprise a distal balloon attached to the guidewire and configured to radially expand where the actuator is further configured to sequentially inflate and deflate the distal balloon. Other embodiments further comprise a spring connecting the microcatheter to the guidewire. Some embodiments also comprise a guidewire tip. Each of these components is now described further in greater detail below.

Distal Crosser Unit

The distal crosser unit comprises a microcatheter having a guidewire lumen; a guidewire present in the guidewire lumen and extending beyond the distal end of the microcatheter; a proximal balloon attached to both the microcatheter and the guidewire, wherein the proximal balloon is configured to longitudinally expand; and a distal anchor member present on the guidewire. Distal crosser units employed in systems of the invention may be configured to be reusable or single use, as desired. As discussed in detail below, in some embodiments, microcatheters comprise a flow channel lumen (also referred to as a fluidic passage or a microcatheter fluidic passage or a first fluidic passage), where, in some instances, the microcatheter flow channel lumen is concentric with the guidewire present in the microcatheter.

Microcatheter:

The microcatheter according to the present invention may vary. In embodiments, the microcatheter may comprise an elongate microcatheter with a length ranging from approximately 50 cm to 500 cm, such as 200 cm, 300 cm or 400 cm. In embodiments, the microcatheter may have an outer diameter ranging from between 0.2 mm to 3.0 mm, such as 0.7 mm or 1.0 mm or 2.0 mm. In embodiments, the outer diameter of the microcatheter may vary as needed depending upon, among other things, characteristics of the tissue the distal crosser unit is applied to, including the diameter of the internal luminal tissue, such as an artery or vein. In other instances, the outer diameter of the microcatheter may vary depending on characteristics of the total occlusion, such as the diameter of the total occlusion. The outer diameter of the microcatheter may vary across different regions of the elongate microcatheter. In some instances, the microcatheter may be tapered. In such instances, the microcatheter may comprise a taper ranging from 0.01° to 5°, such as 1° or 2° or 3° or 4°, over a region of the microcatheter. In some instances, different regions of the microcatheter may comprise different amounts of tapering, including in some instances, no tapering. The amount of tapering may vary depending on, among other things, different applications of the distal crosser unit and different characteristics of the total occlusion.

Microcatheters of embodiments of the present invention may be constructed of any convenient, and suitably physiologically acceptable, material, including but not limited to rubber, silicone, polyurethane and the like. In some embodiments, microcatheters may consist of a braided construction, for example, a poyimide braid. Such embodiments of the microcatheter may further comprise a thermoplastic jacket, for example, a polyimide. In some instances, the microcatheter may comprise an external coating selected based on the application of the distal crosser unit or the microcatheter system. For example, in some cases, embodiments of the microcatheter may further comprise a lubricated exterior coating. Any convenient coating that reduces friction related to the interaction of the microcatheter and the internal luminal tissue to which the microcatheter is applied may be used. In some cases, such an exterior coating may consist of polytetrafluoroethylene (i.e., PTFE).

Guidewire Lumen:

By guidewire lumen, it is meant that the microcatheter is configured such that the microcatheter comprises a space, e.g., in the form of a passage, for a guidewire to be present in and move relative to the microcatheter. In some instances, the guidewire lumen may comprise a cylindrical cut out within the microcatheter, such that in some embodiments, the microcatheter is formed so as to be annular with respect to the guidewire lumen. That is, in some instances, a cross-section of the microcatheter may comprise an annulus or a hollow core where the guidewire is present. In some instances, the longitudinal axis of the microcatheter is parallel to the longitudinal axis of the guidewire lumen (and therefore the longitudinal axis of the guidewire present in the guidewire lumen). In some instances, the longitudinal axis of the microcatheter may overlap with, or may be coextensive with, or may be the same as, the longitudinal axis of the guidewire lumen (and therefore the longitudinal axis of the guidewire present in the guidewire lumen). That is, in some embodiments, the microcatheter and the guidewire lumen, as well as the guidewire present in the guidewire lumen, may be coaxial. In some instances, the longitudinal axes of the microcatheter, the guidewire lumen and the guidewire present in the guidewire lumen may be coaxial in some regions of the microcatheter and parallel in other regions of the microcatheter. The guidewire lumen may have any convenient diameter to suit the diameter of the guidewire and in general may range from 0.15 mm to 2.9 mm, such as 0.45 mm. As discussed in detail below, in some embodiments, the guidewire lumen comprises a flow channel lumen (also referred to as a fluidic passage or a microcatheter fluidic passage or a first fluidic passage), where, in some instances, the guidewire lumen is concentric with the microcatheter flow channel lumen.

In embodiments, the guidewire lumen is configured so that the guidewire present in the microcatheter can traverse longitudinally within the microcatheter. That is, the guidewire lumen may be configured to allow sufficient space between the external diameter of the guidewire and the internal diameter of the microcatheter (i.e., the diameter of the guidewire lumen) to allow the guidewire to move longitudinally, relative to the microcatheter. In embodiments, the guidewire lumen is configured to allow the guidewire to be moved so that the distal end of the guidewire moves in a distal direction relative to the distal end of the microcatheter. In embodiments, the guidewire lumen is configured to allow the guidewire to be repeatedly moved so that the distal end of the guidewire extends distally and then retracts proximally, relative to the distal end of the microcatheter.

Microcatheter Fluidic Passage:

In embodiments, the microcatheter may comprise a fluidic passage, which may be referred to as the first fluidic passage. Such fluidic passage may be configured to propagate pressure along the fluidic passage. In embodiments, the first fluidic passage extends longitudinally along the microcatheter, for example, from a proximal region of the microcatheter to a distal region of the microcatheter. In some instances, the fluid passage extends from a proximal region of the microcatheter to the proximal balloon. In such instances, the fluidic passage is configured to propagate pressure along the fluid passage from a proximal region of the microcatheter to a distal region of the microcatheter, such as to the proximal balloon operably connected to the microcatheter. In instances, the fluidic passage may be configured to comprise a fluid. In such instances, applying pressure to the fluid enables propagation of pressure along the fluidic passage. Any convenient fluid may be used, for example, a saline solution with or without a contrast fluid.

In some instances, the guidewire lumen may comprise the first fluidic passage. That is, the guidewire lumen may be co-extensive with the first fluidic passage. In some embodiments, outside of the guidewire is the fluidic passage, in concentric embodiments, i.e., a volume between the exterior wall of the guidewire and the interior wall of the microcatheter (i.e., the wall of the guidewire lumen) comprises the fluidic passage. In such embodiments, the first fluidic passage may be operably connected to the proximal balloon. That is, the guidewire lumen may be configured to provide sufficient space so that a guidewire may be present in the guidewire lumen as well as fluid surrounding the guidewire. In such embodiments, the microcatheter fluidic passage may comprise an annular space between the wall of the microcatheter guidewire lumen and the exterior wall of the guidewire. The microcatheter fluidic passage may have any suitable diameter and in general may range from 0.15 mm to 2.9 mm, such as 0.45 mm.

In some cases, the space between the guidewire present in the guidewire lumen and the inner wall of the microcatheter is operably connected to the proximal balloon. In such instances, the fluidic passage may open into the proximal balloon at the distal end of the microcatheter. That is, in some embodiments, pressure applied to the proximal end of the microcatheter, propagated along the fluidic passage of the microcatheter, may further propagate to the proximal balloon via the opening of the fluidic passage at the distal end of the microcatheter, which opening opens into (i.e., is in fluidic communication with) the proximal balloon. Such opening arises where the distal end of the microcatheter, and therefore the guidewire lumen and the fluidic passage, ends with the guidewire extending further distally beyond the distal end of the microcatheter. Such region may be covered by the proximal balloon such that the end of the first fluidic passage opens into the proximal balloon.

In certain instances, the microcatheter fluidic passage may be parallel to, but not coaxial with, the microcatheter guidewire lumen. In embodiments, the microcatheter may further comprise porting holes connecting the fluidic passage of the microcatheter with the proximal balloon. Porting holes may be located in a distal region of the microcatheter. Porting holes in embodiments may be radial holes connecting, for example, an inner wall of the microcatheter (i.e., the wall closest to the microcatheter's longitudinal axis) with the external wall of the microcatheter (i.e., the surface furthest from the longitudinal axis, for example, the surface to which the proximal balloon is attached). Porting holes may be configured to allow the passage of fluid between the microcatheter fluidic passage and the proximal balloon. In embodiments, the proximal balloon may be inflated using fluid transferred into the interior of the proximal balloon from the fluidic passage of the microcatheter via the porting holes of the microcatheter. That is, in some embodiments, pressure applied to the proximal end of the microcatheter, propagated along the fluidic passage of the microcatheter, may further propagate to the proximal balloon via the microcatheter porting holes.

The number of microcatheter porting holes may vary in embodiments of the invention. Porting holes may be any convenient diameter and their diameter may vary. The arrangement of the porting holes on the microcatheter may assume any convenient pattern. The number of porting holes, their diameters, and their arrangement on the microcatheter may be selected so as to ensure that the microcatheter retains its desired structural characteristics, notwithstanding the presence of porting holes. In some embodiments, specifically, the number of porting holes, their diameters and their arrangement on the microcatheter may be selected to ensure that the microcatheter maintains sufficient stiffness for crossing total occlusions. For example, some embodiments of microcatheters according to the present invention may comprise between 1 and 1,000 porting holes (such as 100 or 300), with diameters between 0.1 mm and 0.5 mm (such as 0.1 mm or 0.25 mm or 0.4 mm), spaced at least 0.1 mm to 5 mm apart from one another (such as 0.5 mm or 1 mm or 5 mm).

In embodiments, for example in embodiments where porting holes are used to allow fluid to enter the proximal balloon, i.e., pressurize the proximal balloon, the distal end of the microcatheter may include a covering or a cap that is configured to seal the fluid within the microcatheter fluidic passage while still allowing the distal end of the guidewire (i.e., the end of the guidewire that extends beyond the distal end of the microcatheter) to advance and retract relative to the microcatheter upon sequential inflation and deflation of the proximal balloon. Such covering or cap, in embodiments, is configured to facilitate guiding pressure propagated along the fluidic passage of the microcatheter through the microcatheter porting holes, and not allowing such pressure to dissipate through the extension and retraction of the distal end of the guidewire relative to the distal end of the microcatheter. That is, in embodiments, the covering is configured to allow the guidewire to advance longitudinally relative to the microcatheter while maintaining pressure in the microcatheter fluidic passage. In embodiments, such microcatheter distal covering or cap comprises a seal. In other embodiments, such microcatheter distal covering or cap comprises a valve. In still other embodiments, such microcatheter distal covering or cap comprises a Tuohy-Borst valve and seal. In other cases, a tapering of the distal end of the microcatheter comprises a seal and cap of the microcatheter around the guidewire.

Guidewire:

As described above, the distal crosser unit of microcatheter systems according to the invention comprises a guidewire present in the guidewire lumen and extending beyond the distal end of the microcatheter. In embodiments, the guidewire is an elongate guidewire present in the microcatheter lumen, e.g., as described above. In embodiments, the guidewire may comprise an elongate guidewire with a length that varies, ranging in some instances from 50 cm to 500 cm, such as 200 cm, 300 cm or 400 cm. The length of the guidewire may be substantially coextensive with the microcatheter, i.e., the guidewire may extend substantially the length of the microcatheter. The guidewire may be a braided (e.g., a polyimide braid) or a solid (e.g., stainless steel) construction. The amount that the guidewire extends beyond the distal end of the microcatheter varies with the application of the microcatheter system and is described below in connection with the load that the guidewire tip can bear. As described above, the guidewire is configured to act as a rail for other tools to pass over, e.g., from a relatively proximal region of the guidewire to a relatively distal region of the guidewire. In embodiments, the guidewire acts as a rail for the microcatheter to pass over, such that the microcatheter is advanced from a relatively proximal position to a relatively distal position in the chronic total occlusion along the guidewire.

Further, in embodiments, the guidewire is configured to extend beyond the distal end of the microcatheter. In embodiments, the amount by which the guidewire extends beyond the distal end of the microcatheter varies while the distal crosser unit is being used to cross a total occlusion. Specifically, the amount by which the guidewire extends beyond the distal end of the microcatheter varies as the actuator sequentially inflates and deflates the proximal balloon. In certain embodiments, the guidewire may extend beyond the distal end of the microcatheter by about 0.5 mm to 50 mm, including 5 mm or 10 mm, at a minimum or at its most "collapsed" or proximal position (i.e., when the proximal balloon is not inflated) to about 1 mm to 100 mm, including 10 mm or 15 mm, or more at a maximum or at its most "extended" or distal position (i.e., when the proximal balloon is substantially inflated).

In embodiments, the outer diameter of the guidewire may vary and may be sized to fit within the diameter of the guidewire lumen of the microcatheter, such as a diameter that allows a fluidic passage to be present in the space between the exterior wall of the guidewire and the wall of the guidewire lumen of the microcatheter (i.e., the interior microcatheter wall). In embodiments, the guidewire may have an outer diameter between about 0.1 mm to 2.8 mm, such as, for example, 0.3 mm or 1.0 mm or 2.0 mm.

Guidewire Fluidic Passage:

In some cases, the guidewire may comprise a fluidic passage. Such fluidic passage may be configured to propagate pressure via a fluid along the fluidic passage. In embodiments, the fluidic passage extends longitudinally along the guidewire, for example, from a proximal region of the guidewire to a distal region of the guidewire. In some instances, the fluidic passage extends from a proximal region of the guidewire to a distal balloon attached to a distal region of the guidewire, as described in detail below. In such instances, the fluidic passage is configured to propagate pressure via a fluid along the fluidic passage from a proximal region of the guidewire to a distal region of the guidewire, such as to the distal balloon operably connected to the guidewire. The guidewire fluidic passage may have a diameter that varies, in some instances ranging between 0.05 mm to 2.7 mm, such as 0.2 mm or 1.2 mm.

In instances, the fluidic passage is configured to comprise a fluid. In such instances, applying pressure to the fluid enables propagation of pressure along the fluidic passage. Any convenient fluid may be used, for example, a saline solution with or without a contrast fluid.

In embodiments, the guidewire fluidic passage may comprise a coaxial path through the center of the guidewire. That is, the guidewire may have an annular cross section. In embodiments, the fluidic passage may extend the entirety of the length of the guidewire or a region of the guidewire.

In embodiments, the guidewire may further comprise porting holes connecting the fluidic passage of the guidewire with the distal balloon, as described below. Porting holes in embodiments may be radial holes connecting the inner surface of the guidewire (i.e., the surface closest to the longitudinal axis) with the external surface of the guidewire (i.e., the surface furthest from the longitudinal axis. Porting holes may be configured to allow the passage of fluid between the guidewire fluidic passage and the distal balloon. In embodiments, the distal balloon may be inflated using fluid transferred into the interior of the distal balloon from the fluidic passage of the guidewire via guidewire porting holes. That is, in some cases, pressure applied to the proximal end of the guidewire, propagated along the fluidic passage of the guidewire, may be further propagated to the distal balloon via the guidewire porting holes.

Embodiments may comprise any number of guidewire porting holes. Porting holes may be any convenient diameter and their diameter may vary. The arrangement of the porting holes on the guidewire may take any convenient pattern. The number of porting holes, their diameters, and their arrangement on the guidewire may be selected so as to ensure that the guidewire retains its desired structural characteristics, notwithstanding the presence of porting holes. In some embodiments, specifically, the number of porting holes, their diameters and their arrangement on the guidewire may be selected to ensure that the guidewire retains sufficient stiffness for crossing total occlusions. For example, some embodiments of guidewires according to the present invention may comprise between 1 and 1,000 porting holes (such as 100 or 300), with diameters between 0.1 mm and 0.5 mm (such as 0.1 mm or 0.25 mm or 0.4 mm), spaced at least 0.1 mm to 5 mm apart from one another (such as 0.5 mm or 1 mm or 5 mm).

Proximal Balloon:

As described above, the distal crosser unit according to the invention comprises a proximal balloon attached to both the microcatheter and the guidewire, wherein the proximal balloon is configured to longitudinally expand. By "longitudinally expand," it is meant that the proximal balloon is configured to expand in a direction parallel to the long axis of the proximal balloon. In embodiments, the proximal balloon is configured to expand longitudinally in a distal direction. That is, the proximal balloon may expand such that its proximal end remains in a relatively fixed position, while its distal end expands, getting longer with the expansion or, in some cases, the unfolding, of the proximal balloon in a distal direction. In embodiments, this longitudinal expansion of the proximal balloon applies a longitudinal force to the guidewire. In some cases, the longitudinal expansion applies a force to the guidewire in a relatively distal direction. Such force is applied with reference to the distal end of the microcatheter, such that the force applied to the guidewire via expansion of the proximal balloon advances the guidewire in a distal direction from the distal end of the microcatheter. In embodiments, the longitudinal force applied to the guidewire by the proximal balloon advances the guidewire relative to the total occlusion. That is, the force applied to the guidewire advances the guidewire a certain distance across the total occlusion.

As described above, the proximal balloon is attached to both the microcatheter and the guidewire, in embodiments of the present invention. In some cases, the proximal balloon is attached to distal regions of both the microcatheter and the guidewire. In embodiments, a proximal region of the proximal balloon is affixed, i.e., bonded, to a distal region of the microcatheter while a distal region of the proximal balloon is affixed, i.e., bonded, to a distal region of the guidewire. For example, the distal region of the proximal balloon may be affixed to the region of the guidewire that extends beyond the distal end of the microcatheter. The proximal balloon may be bonded to the microcatheter and guidewire using any convenient and physiologically suitable bonding technique, such as with an epoxy, plastic cement, solvent bonding technique, thermoplastic reflow or combination thereof, or any other suitable glue or adhesive or bonding technique.

In certain embodiments, the distal crosser unit is configured such that inflation of the proximal balloon causes the guidewire to extend in a distal direction relative to the distal end of the microcatheter by a specified length, referred to as a stroke-per-cycle length. In such cases, "stroke" refers to the extension of the guidewire, i.e., the distance the guidewire advances longitudinally, and "cycle" refers to a cycle of sequentially inflating the proximal balloon, in particular the step of inflating the proximal balloon from a deflated state and then deflating the balloon, returning the proximal balloon to its initial deflated state. In some cases, the stroke-per-cycle length of a distal crosser unit is configurable based on pressure applied to the proximal balloon. For example, a relatively greater pressure may apply a relatively greater longitudinal force to the guidewire, which may cause the guidewire to extend a relatively greater distance distally, as compared with a relatively smaller pressure that may apply a relatively smaller longitudinal force to the guidewire, which may cause the guidewire to extend a relatively shorter distance distally. In embodiments, the microcatheter system may be configured to modulate the pressure applied to the proximal balloon and thereby adjust characteristics and behavior of the system, such as the stroke length or force applied by the guidewire to the chronic occlusion.

In embodiments, higher pressure applied to the proximal balloon may also equate to a stronger longitudinal force for driving the guidewire into the chronic total occlusion. That is, applying higher pressure to the proximal balloon may cause the distal crosser unit to apply a greater magnitude force to the occlusion, such as, may cause the guidewire tip, as described in detail below, to apply a greater magnitude force to the occlusion.

In embodiments, the distal crosser unit may be configured to provide a physical limit that prevents the distal crosser unit from over-extending when pressure is applied to the proximal balloon. By preventing over-extending, it is meant, in certain embodiments, a limit that prevents the guidewire from extending beyond the distal end of the microcatheter by a certain, predetermined amount. In embodiments, the limit may comprise the proximal balloon itself, where the proximal balloon is configured so that it can extend no greater than a certain longitudinal distance. In other embodiments, the limit may comprise a retention ring present on the guidewire and configured to conflict with a distal region of the microcatheter. That is, the retention ring may act as a stop preventing the guidewire from extending further than a predetermined distance distally, beyond the distal end of the microcatheter. In such embodiments, regardless of how much pressure is applied to the proximal balloon and how much longitudinal force the proximal balloon applies to the guidewire, the guidewire nonetheless is prevented from extending past a predetermined distance beyond the distal end of the microcatheter.

In some embodiments, the proximal balloon may be configured to expand radially, as well as longitudinally. That is, inflating the proximal balloon causes the proximal balloon to expand its radial width as well as expand longitudinally, as described above. The proximal balloon may be configured to expand radially as needed and the amount of radial expansion may vary. The degree to which the proximal balloon is configured to expand radially may depend on, for example, characteristics of the internal lumen to which the distal crosser unit is applied, such as, for example, its diameter, its elasticity or the amount of friction presented by the luminal tissue surface with respect to the proximal balloon; characteristics of the total occlusion; or characteristics of the microcatheter, such as, for example, its diameter. In some cases, radial expansion of the proximal balloon facilitates holding the microcatheter in a fixed position relative to the total occlusion. That is, in embodiments, radial expansion of the proximal balloon causes the proximal balloon to hold itself against the tissue wall by pressing against the internal luminal wall or an internal wall of the total occlusion thereby preventing the proximal balloon, and the microcatheter attached thereto, from changing position relative to the total occlusion. Such fixed position allows the lateral expansion of the proximal balloon to apply a longitudinal force to the guidewire that results in the guidewire advancing distally relative to the total occlusion, instead of causing the microcatheter to be pushed in a relatively proximal direction.

In some cases, the proximal balloon is further configured to comprise passive features that improve its ability to hold a fixed position relative to the total occlusion. For example, the exterior surface of the proximal balloon, i.e., the surface of the proximal balloon that interfaces with the interior lumen surface or the total occlusion may be rough, or otherwise comprise features to diminish the smoothness and/or slipperiness of the surface, in order to facilitate having the surface of the proximal balloon catching and holding onto, instead of sliding against, the internal lumen surface or total occlusion surface. In some embodiments, such passive features comprise a roughened surface of the proximal balloon or a serrated surface or a rough edge or a serrated edge, or any combination thereof that restricts backward movement. In some cases, the proximal balloon is tapered. By "tapered," it is meant that upon inflation, the proximal end of the proximal balloon has a different cross-sectional radius than the distal end of the proximal balloon. In some cases, the proximal end of the proximal balloon has a larger cross-sectional radius than the distal end of the proximal balloon. Such configuration may facilitate maneuvering the distal crosser unit across certain total occlusions, allowing the distal end of the distal crosser unit to fit through even narrower spaces, such as narrow spaces in a total occlusion.

The diameter of the proximal balloon may be configured based on the application or characteristics of the total occlusion and may vary. In some cases, the proximal balloon may have a low-profile, inflated balloon diameter, e.g., 0.2 mm to 3.0 mm, such as 0.70 mm. The crossing profile of the distal balloon may be the diameter of the microcatheter plus the thickness of the balloon material, which in instances, is between 0.01 mm to 1 mm, such as 0.01 mm or 0.1 mm. In embodiments, the proximal balloon may be non-compliant (i.e., have a high circumferential stiffness). By "circumferential stiffness," it is meant that a relatively higher force is required to expand the proximal balloon radially, i.e., increasing the diameter of the proximal balloon, and the balloon maintains largely the same diameter regardless of the pressure applied to the balloon.

Any convenient balloon may be employed as the proximal balloon. Suitable balloons include, but are not limited to, standard angioplasty balloons, such as compliant and non-compliant angioplasty balloons, or, in other cases, a composite balloon that includes two distinct layers, which layers include a non-compliant layer and compliant layer. In one embodiment of a composite angioplasty balloon, a non-compliant balloon is covered with a compliant sleeve to achieve an "arrowed" pressure-stretch, e.g., as further described in pending PCT application serial no. PCT/US2020/055458; the disclosure of which is herein incorporated by reference. The compliant layer may be a rubber, silicone, polyurethane, or nitinol material or another material that can stretch up to 100-500% before failure, can withstand thousands of inflation cycles before failure, and encounters minimal, if any, plastic deformation during expansion.

Proximal Balloon Folding Pattern:

As described above, in embodiments, the proximal balloon may be attached to distal regions of both the microcatheter and the guidewire. In such embodiments, the proximal balloon may be configured so that it can be folded neatly around the distal crosser unit when deflated. For example, the proximal balloon may be configured so that it folds over itself when deflated. In embodiments, the proximal balloon is configured to be folded so that expansion of the proximal balloon upon inflation enhances the longitudinal expansion of the proximal balloon. For example, the proximal balloon may be folded over itself so that inflation of the balloon urges the balloon to expand longitudinally in the distal direction. That is, the proximal balloon may be folded so that inflation of the balloon allows the balloon to expand primarily in a longitudinal direction. For example, the proximal balloon may be folded so that the path of least resistance for balloon expansion corresponds to longitudinal expansion of the balloon. As a result of such folding configuration that enhances longitudinal expansion of the balloon, the longitudinal force applied by the proximal balloon to the guidewire may also be enhanced. In such embodiments, the proximal balloon is folded in a configuration that optimizes the longitudinal force applied by the proximal balloon to the guidewire. In embodiments, the proximal balloon folding pattern may comprise folding the proximal balloon onto itself in a C-like shape, with a proximal region of the proximal balloon pointed distally, where the C-like fold is configured to enhance the longitudinal expansion of the balloon.

When the proximal balloon is configured to be folded in a specified pattern or manner, the proximal balloon may be further configured so that the proximal balloon returns to the specified folding pattern upon deflation of the balloon, including deflated in vivo. In such embodiments, the proximal balloon may repeatedly be inflated and deflated causing the proximal balloon to return to a specific folding pattern in each instance.

Distal Anchor Member:

As described above, distal crosser units according to the present invention comprise a distal anchor member present on the guidewire. In embodiments, the distal anchor member may be configured to facilitate holding a distal region of the guidewire in a fixed position relative to the total occlusion. That is, upon inflation of the proximal balloon and corresponding insertion of the distal anchor member further into the chronic occlusion, the distal anchor member is configured to hold the guidewire in a fixed position relative to the total occlusion, for example, while the proximal balloon is deflated, and the microcatheter is guided by the guidewire to advance into a further distal position of the total occlusion. That is, the guidewire (1) is advanced through the total occlusion by the force of the proximal balloon, (2) anchors, via the distal anchor member, to the tissue of the chronic occlusion, and then (3) acts as a rail for the microcatheter to advance over. Once advanced, the microcatheter anchors to the tissue of the chronic occlusion, and the process starts over again.

In some cases, the distal anchor member comprises an additional component present on the guidewire, such as a sleeve, where the sleeve comprises a material or feature configured to facilitate fixing or anchoring the distal anchor member into a position relative to the total occlusion. In other cases, the distal anchor member comprises a region of the guidewire where the exterior surface of the guidewire comprises a texture configured to facilitate fixing or anchoring the distal anchor member into a position relative to the total occlusion. In other cases, the distal anchor member comprises a region of the guidewire where the exterior surface of the guidewire comprises a material other than the material used to form other regions of the guidewire, where such material is configured to facilitate fixing or anchoring the distal anchor member into a position relative to the total occlusion. In still other cases, the distal anchor member comprises one or more combinations of the previously described configurations of the distal anchor member.

In some cases, the distal anchor member is configured to comprise passive features that improve its ability to hold a fixed position relative to the total occlusion. For example, the exterior surface of the distal anchor member, i.e., the surface of the distal anchor member that interfaces with the interior lumen surface or the total occlusion may be rough, or otherwise comprise features to diminish the smoothness and/or slipperiness of the surface, in order to facilitate having the surface of the distal anchor member catching and holding onto, instead of sliding against, the internal lumen surface or total occlusion surface. In some embodiments, such passive features comprise a roughened surface of the distal anchor member or a serrated surface or a rough edge or a serrated edge, or any combination thereof that restricts backward movement. In some cases, the distal anchor member is tapered. In some cases, the distal anchor member comprises a tapered region of the guidewire. By "tapered," it is meant that the proximal end of the distal anchor member has a different cross-sectional radius than the distal end of the distal anchor member. In some cases, the proximal end of the distal anchor member has a larger cross-sectional radius than the distal end of the distal anchor member. Such configuration may facilitate maneuvering the distal crosser unit across certain total occlusions, allowing the distal end of the distal crosser unit to fit through even narrower spaces, such as narrow spaces in a total occlusion.

In some instances, as described above, the distal anchor member comprises a distal balloon attached to the guidewire and configured to radially expand. In such instances, the actuator may be further configured to sequentially inflate and deflate the distal balloon. In embodiments, the distal balloon may be affixed, i.e., bonded, to the guidewire only and not to the microcatheter. The distal balloon may be bonded to the guidewire using any convenient and physiologically suitable bonding technique or combination thereof, such as with an epoxy, plastic cement, solvent bonding technique, thermoplastic reflow or combination thereof, or any other suitable glue or adhesive or bonding technique. The distal balloon may consist of a neck region where the balloon is bonded to the guidewire and a working region. The working region of the distal balloon may have a fully inflated diameter between 0.3 mm and 5.0 mm, such as 1.0 mm or 3.0 mm or 5.0 mm. By "fully inflated diameter," it is meant the absolute diameter of the distal balloon, i.e., including the diameter of the guidewire.

By "radially expand," it is meant, as described above with respect to the proximal balloon, that upon inflation of the distal balloon, the distal balloon expands such that its cross-sectional radius increases. Radial expansion of the distal balloon may facilitate the balloon pushing against luminal tissue walls or chronic total occlusion walls to hold the distal balloon in a fixed position relative to the total occlusion. As described above with respect to holding the proximal balloon in a fixed position relative to the total occlusion, radial expansion of the distal balloon serves to press the balloon against the walls of the internal luminal tissue or total occlusion in a manner that it requires a relatively greater force to move the distal balloon, and the guidewire attached thereto, in a longitudinal direction relative to the total occlusion. Holding the distal balloon and the guidewire in a fixed position relative to the total occlusion enables the guidewire to be retracted further into the microcatheter without causing the guidewire itself to be retracted proximally relative to the total occlusion. That is, holding the proximal balloon and the guidewire in a fixed position relative to the total occlusion facilitates collapsing the guidewire into a relatively proximal position with respect to the microcatheter (i.e., so that the distal end of the guidewire no longer extends as far beyond the distal end of the microcatheter) without having to move the guidewire in a distal direction.

As described above with respect to the distal anchor member and the proximal balloon, in some cases, the distal balloon is further configured to comprise passive features that improve its ability to hold a fixed position relative to the total occlusion. For example, the exterior surface of the distal balloon, i.e., the surface of the distal balloon that interfaces with the interior luminal surface or the total occlusion may be rough, or otherwise comprise features that diminish the smoothness of the surface, in order to facilitate the surface of the distal balloon catching and holding onto, instead of slipping against, the internal luminal surface or total occlusion surface. In some embodiments, such passive features comprise a roughened surface of the distal balloon or a serrated surface or a rough edge or a serrated edge, or any combination thereof that restricts backward movement. In some cases, the distal balloon is tapered. By "tapered," it is meant that upon inflation, the proximal end of the distal balloon has a different cross-sectional radius than the distal end of the distal balloon. In some cases, the proximal end of the distal balloon has a larger cross-sectional radius than the distal end of the distal balloon. Such configuration may facilitate maneuvering the distal crosser unit across certain total occlusions, allowing the distal end of the distal crosser unit to fit through even narrower spaces, such as narrow spaces in a total occlusion.

The distal balloon present in embodiments of the present invention may be configured so that when the balloon is uninflated, it conforms to a predetermined shape or folding pattern. In some instances, the distal balloon is configured so that when it is uninflated, it conforms to the diameter of the guidewire. In other words, the distal balloon may be configured so that it does not increase, or does not materially increase, the width of the guidewire, thereby facilitating threading the guidewire through narrow spaces.

Any convenient balloon may be employed as the distal balloon. Suitable balloons include, but are not limited to, standard angioplasty balloons, such as compliant and non-compliant angioplasty balloons, or, in other cases, a composite balloon that includes two distinct layers, which layers include a non-compliant layer and compliant layer. In one embodiment of a composite angioplasty balloon, a non-compliant balloon is covered with a compliant sleeve to achieve an "arrowed" pressure-stretch, e.g., as further described in pending PCT application serial no. PCT/US2020/055458; the disclosure of which is herein incorporated by reference. The compliant layer may be a rubber, silicone, polyurethane, or nitinol material or another material that can stretch up to 100-500% before failure, can withstand thousands of cycles before failure, and encounters minimal, if any, plastic deformation during expansion.

Spring:

Embodiments of distal crosser units according to the present invention may further comprise a spring connecting the microcatheter to the guidewire. One end of such spring may be attached at or near the distal end of the microcatheter, and the other end may be attached to a distal region of the guidewire, such as a region of the guidewire extending beyond the distal end of the microcatheter. Any convenient spring may be applied in embodiments of the present invention, such as for example, conventional helical springs or springs with a wave design.

Springs used in embodiments of the present invention may be configured so that the spring expands under tension when the proximal balloon is inflated and expands longitudinally. That is, the spring may be configured to apply no spring force when the proximal balloon is deflated and to apply a spring force when the distal end of the guidewire is pushed in a distal direction relative to the microcatheter upon the longitudinal expansion of the proximal balloon. That is, the spring force may be a tension urging the guidewire to retract further into the microcatheter, pulling the microcatheter along the guidewire acting as a rail. In other words, the spring may be configured to bias the guidewire and the microcatheter into a relatively proximal position, or into a configuration in which the guidewire extends beyond the distal end of the microcatheter by a specified length. The spring may be configured such that the spring force applied by the spring is not greater than (i.e., is not able to overcome) the longitudinal force applied to the guidewire upon inflation of the proximal balloon but nonetheless is sufficient to urge retraction of a region of the guidewire into the microcatheter upon deflation of the proximal balloon.

In embodiments, the spring may be made of a highly compliant but stiff material. For example, a spring of an embodiment of the present invention may be made of stainless steel or nitinol. The compressed length of the spring may be between 0.1 mm and 20 mm, such as 0.5 mm or 3 mm to 5 mm or 15 mm. By "compressed length," it is meant the length of the spring when the force applied by the proximal balloon to the guidewire is not present. The expanded length of the spring may be between 0.2 mm and 30 mm, such as 0.2 mm or 5 mm or 10 mm or 25 mm. By "expanded length," it is meant the length of the spring when the force applied by the proximal balloon to the guidewire is present such that the guidewire is in an extended position relative to the distal end of the microcatheter. The outer diameter of the spring may be between 0.2 mm and 3.0 mm, such as 0.7 mm or 1.0 mm or 2.0 mm. Further, the outer diameter of the spring may vary. For example, the outer diameter of the spring may be of a tapered design. In some cases, the outer diameter of the spring at a proximal region of the spring is greater than the outer diameter of the spring at a distal region of the spring. The inner diameter of the spring may be between 0.15 mm and 2.9 mm, such as 0.2 mm or 0.45 mm or 1.0 mm or 2.0 mm.

In some cases, the spring may comprise a thermoplastic coating to facilitate bonding the spring to the guidewire and microcatheter. In other embodiments, the spring may be a continuation of the microcatheter where such continuation region is configured to act as a spring, e.g., the spring may be a continuation of a braided shaft of the microcatheter. For example, the spring may be a continuation of the braided shaft of the microcatheter but configured to act as a spring. In other embodiments, instead of a separate, exclusive spring component, the proximal balloon may be configured to act as a spring. That is, the proximal balloon may be configured such that the spring force is incorporated into the proximal balloon. For example, the proximal balloon may comprise longitudinal material compliance or braided material configured to apply a spring force between the microcatheter and the guidewire.

Guidewire Tip:

In some cases, the distal end of the guidewire is tapered to form a tapered guidewire core, upon which a guidewire tip can be mounted. In general, the tapered guidewire core and the guidewire tip are located distal to the distal anchor member, i.e., at the distal end of the distal crosser unit. The guidewire tip of the distal crosser unit comprises a guidewire coil located at the distal end of the guidewire and attached to the tapered guidewire core. In embodiments, the guidewire tip may be shaped based on how the guidewire coil is wrapped to form a coil. Because the guidewire tip is shaped based on the configuration of the coil forming the tip, the guidewire tip can be shaped in any number of ways. The length and material of the tapered guidewire core and guidewire coil top are related to the stiffness of the guidewire tip and the load that the guidewire tip is designed to bear. The stiffness and tip load may be varied based on the application and underlying pathologies.

The guidewire tip may have the same, or substantially the same, diameter as the guidewire (i.e., the diameter of the guidewire at a region other than the region of the tapered guidewire core) and may be made from the same or different material as that of the guidewire. In some cases, the guidewire tip may have a larger diameter than the guidewire, such as a diameter than is 0.1% or more greater than the diameter of the guidewire, such as 1% greater, 2% greater, 5% greater or 10% or more greater. In other cases, the guidewire tip may have a smaller diameter than the guidewire, such as a diameter than is 0.1% or more smaller than the diameter of the guidewire, such as 1% smaller, 2% smaller, 5% smaller or 10% or more smaller. The longitudinal length of the guidewire tip may range from about 1 mm to 50 mm, such as 2 mm or 5 mm or 15 mm or 40 mm.

In some cases, the guidewire coil may be configured to form a blunt tip. By "blunt tip," it is meant that the guidewire coil is coiled so that a surface of, and not a single point of, the guidewire tip comes into contact with the proximal face of the total occlusion when the distal crosser unit is engaged. For example, the blunt tip of the guidewire may comprise a rounded or substantially hemispherical shape. In general, a blunt tip refers to a shape designed to spread the longitudinal force of the guidewire over a relatively greater cross-sectional surface area. In other cases, the guidewire tip may be shaped so that it forms a sharp tip. By sharp tip, it is meant that the guidewire coil is coiled so that the distal end of the tip substantially comes to a point. For example, the sharp tip of the guidewire tip may be substantially conical. In other cases, the sharp tip of the guidewire tip may be a nib at the end of a rounded or substantially hemispherical shaped tip. In general, a sharp tip refers to a shape designed to focus the longitudinal force of the guidewire over a relatively smaller cross-sectional surface area.

In such embodiments, the guidewire coil may be configured to form an atraumatic tip. By "atraumatic tip," it is meant that the guidewire tip is shaped to minimize or eliminate tissue damage or trauma to the total occlusion or the luminal tissue when the distal crosser unit is applied to the total occlusion. In other words, the guidewire tip may be shaped so that it reduces or eliminates the likelihood that the guidewire tip will puncture or lacerate tissue of the total occlusion or tissue proximal thereto during use of the distal crosser unit.

In still other cases, the guidewire tip may be configured into a shape that is based on a pathology of the total occlusion. That is, the guidewire tip may be configured to conform to the shape or other characteristics, such as density or stiffness, of the total occlusion. In some cases, the guidewire tip may be configured in a bespoke or nonlinear shape that complements the shape of the total occlusion. For example, the shape of the guidewire tip may be configured to complement the shape of the proximal face of the total occlusion. In some cases, the guidewire tip may be configured so that its shape offers the greatest structural support for the distal crosser unit as it progresses across the total occlusion. In other cases, the guidewire tip is configured so that its shape offers the greatest likelihood of enabling the distal crosser unit to cross the total occlusion.

Guidewire Tip Force:

In embodiments of the present invention, the unsupported length of the guidewire, meaning the length of the guidewire at its distal end that is not enclosed within the microcatheter, is small. Such small unsupported length of the guidewire can range between 5 mm and 50 mm, such as 15 mm or 30 mm or 45 mm. The unsupported length of the guidewire is chosen to be relatively small because the microcatheter, in which the guidewire is enclosed, acts as a support to the guidewire, preventing guidewire buckling. This support provided by the microcatheter acts to increase the potential tip force that the guidewire can apply without buckling (i.e., the amount of force the guidewire can apply to a chronic total occlusion).

The critical tip force before buckling is characterized by the following:

$$F_{critical} = \frac{\pi^2 EI}{(KL)^2}$$

where,
- $F_{critical}$ is the amount of force when applied to the guidewire, at which the guidewire will buckle;
- E is the modulus of elasticity of the material;
- I is the second moment of area;
- K is the effective length factor of the guidewire; and
- L is the guidewire's unsupported length. See Sakes A, Dodou D, Breedveld P. Buckling prevention strategies in nature as inspiration for improving percutaneous instruments: a review. Bioinspir Biomim. 2016; 11(2): 021001. doi:10.1088/1748-3190/11/2/021001.

In conventional guidewires, the unsupported length of the guidewire may be a large distance (e.g., the unsupported length of the guidewire may consist of a bend in the guidewire in contact with an outer portion of the vessel wall), and the second moment of area is due only to the relatively small diameter of the guidewire. In such cases, with respect to conventional guidewires, the critical buckling force, $F_{critical}$, is very low, which is a limiting factor in how the guidewire can be used. In contrast to conventional guidewires, with embodiments according to the present invention, the second moment of area increases as a result of housing the guidewire within the microcatheter, and the guidewire's unsupported length decreases, both of which design characteristics increase the critical load prior to buckling, $F_{critical}$, of embodiments of the present invention. This increased critical load provides the operator with an increased tip load to push through hardened proximal caps and to navigate through occlusions.

Guiding Sheath:

Embodiments of the microcatheter system may further comprise a guiding sheath used to align the distal crosser unit with the proximal cap of the total occlusion. In general, the guiding sheath itself does not traverse the total occlusion. That is, the guiding sheath holds the distal crosser unit in a fixed position relative to the cross section of the luminal tissue surrounding the total occlusion while the distal crosser unit initially interfaces with the total occlusion. The guiding sheath may be a sheath comprising a microcatheter lumen in which the microcatheter of the distal crosser unit is held. The guiding sheath may be made of a material that offers greater stiffness or ability to be steered so that the sheath can be manipulated to align the distal crosser unit with the proximal cap of the total occlusion. The interior diameter of the distal sheath may be configured to substantially conform to the diameter of the microcatheter so that there is minimal space between the outer diameter of the microcatheter and the inner diameter of the sheath. The outer diameter of the sheath may vary based on the diameter of the luminal tissue with the total occlusion.

A guiding sheath according to the present invention may comprise one or more balloons for aligning the sheath with the proximal cap of the total occlusion. A balloon may be mounted on the exterior of the guiding sheath at the distal end of the guiding sheath. The balloon may be mounted such that when inflated, the balloon engages the luminal tissue thereby holding the guiding sheath in a fixed position relative to the total occlusion. In some cases, the guiding sheath may comprise more than one balloon mounted on the exterior surface used to offset the center of the guiding sheath in the event an opening on the proximal cap of the total occlusion is off center with respect to the surrounding luminal tissue.

Steering:

Distal crosser units according to the present invention may be configured so that they are capable of being steered, i.e., directed within the luminal tissue towards a desired forward angle. Steering the distal crosser unit may facilitate aligning the distal crosser unit with the total occlusion; or may facilitate guiding the distal crosser unit through luminal tissue such as a vein or artery to arrive at a total occlusion; or may facilitate efficiently crossing the total occlusion. By steering, it is meant that the distal end of the distal crosser unit is oriented towards a new direction such that subsequent forward movement of the distal crosser unit is urged in such new direction.

In some cases, distal crosser units are configured so that they can be steered by rotating the microcatheter and the guidewire. In such cases, the microcatheter or the guidewire may be configured so that they have a bias towards one direction, such as a bias to rotate or turn in a specific direction. When the distal crosser unit is so configured, the distal crosser unit may be steered by rotating the microcatheter or the guidewire. Rotating the microcatheter or the guidewire enables steering because rotating the microcatheter or guidewire rotates the side to which the microcatheter or guidewire is biased. In some cases, a region of the microcatheter or the guidewire is relatively stiff compared with other regions of the microcatheter or guidewire where such stiff region of the microcatheter or guidewire biases the microcatheter or guidewire to turn in a specific direction. In other embodiments, steering the distal crosser unit is accomplished through steering springs. That is, in such embodiments, the distal crosser unit comprises steering springs configured to steer the microcatheter or the guidewire. Such springs may be mounted on, or incorporated into, the microcatheter or guidewire in a manner that biases the microcatheter or guidewire in a specific direction.

In still other embodiments, the distal crosser unit comprises one or more steering cables. For example, one or more steering cables may be attached to distal regions of the microcatheter or the guidewire. The steering cable may be configured such that retracting the steering cable (i.e., applying pressure to the cable in a proximal direction), urges the distal crosser unit to turn or otherwise change direction.
Feedback Control:

Microcatheter systems of embodiments of the invention may be configured to determine the distance the guidewire travels for given amount pressure and/or volume change in the proximal balloon. That is, embodiments of microcatheter systems are configured to measure the longitudinal distance the guidewire tip travels into the total occlusion given a specified amount of pressure change applied to the proximal balloon and/or a specified amount of volume change applied to the proximal balloon. In other embodiments, microcatheter systems are configured to measure the change in volume of the proximal balloon, given a specified amount of pressure change applied to the proximal balloon.

Embodiments configured to measure changes in distance traveled or changes in volume of the proximal balloon, given a specified change in pressure applied to the proximal balloon, are capable of determining, for example, when the distal crosser unit has reached a region of a total occlusion where the distance the guidewire tip moves begins to diminish notwithstanding that the same amount of pressure is applied to the proximal balloon, due, for example, to changed characteristics of the total occlusion or even malfunctioning of the distal crosser unit. Such embodiments may be used to understand the pathology, stiffness or other characteristics of the chronic total occlusion and/or to determine a current location of the guidewire in the vessel. For example, embodiments capable of providing this information (e.g., distance traveled by the guidewire tip for a given amount of pressure applied to the proximal balloon) may be used to understand when the distal region of the guidewire hits soft healthy tissue or vessel. Such information can be used to help minimize the possibility of puncturing health tissue or a vessel.

Embodiments may be configured to feedback such collected data, such as the volume change of the proximal balloon or distance traveled by the guidewire tip, to control, for example, the pressure applied to the proximal balloon. Such embodiments are configured to comprise a feedback control system based on such collected data.
Visualization:

Embodiments of the microcatheter system may further comprise catheter marker bands. In embodiments, catheter marker bands may be affixed to different components of the microcatheter system, such as, for example, to various locations on the microcatheter, the guidewire or the guidewire tip. Catheter marker bands may be used to visualize the position of the microcatheter system, or components thereof, when applied to a subject. Marker bands used in embodiments may be any convenient, readily available, off the shelf catheter marker band capable of being affixed, for example, crimped or heat bonded or welded, to components of the microcatheter system. Marker bands of interest may be polymer bands laden with gold or platinum or tungsten or another material that facilitates visualization, such as visualization via fluoroscopy. Catheter bands may be visualized via fluoroscopic or radioplastic visualization techniques.

Various aspects of the distal crosser unit of microcatheter systems of the invention being generally described above, elements of the distal crosser unit of the invention are now further reviewed in the context of specific embodiments.

Specific Embodiment—Distal Crosser Unit

A distal crosser unit in accordance with an embodiment of the invention is schematically illustrated in FIGS. 1A-1G. FIGS. 1A-1G show a distal region of an embodiment of a distal crosser unit of the invention with the right-hand side of the figures being relatively distal (i.e., towards the chronic total occlusion) and the left-hand side of the figures being relatively proximal (i.e., away from the chronic total occlusion). Shown in FIGS. 1A-1G is distal crosser unit 100 comprising microcatheter 110 and guidewire 120 extending beyond the distal end of microcatheter 110. Guidewire 120 is present in the guidewire lumen (not shown in figures) of microcatheter 110.

Proximal balloon 130 is shown inflated in FIGS. 1A-1D and deflated in FIG. 1E. Proximal balloon when inflated and also when deflated straddles the distal end of microcatheter 110 and guidewire 120. In the embodiment shown in FIGS. 1A-1E, proximal balloon 130 is tapered such that when inflated, as shown in FIGS. 1A-1C, proximal balloon 130 has a relatively wider diameter at its proximal end as compared with a relatively narrower diameter at its distal end.

Proximal balloon 130 is in fluidic communication with a fluidic passage (not shown) of microcatheter 110 so that when pressure is applied to fluid present in the fluidic passage of the microcatheter, such pressure is transmitted to proximal balloon 130 causing it to inflate. Proximal balloon 130 is deflated by releasing such pressure. In some embodiments, the fluidic passage of microcatheter 110 is also the guidewire lumen. Pressure may be applied to a fluid in the fluidic passage of microcatheter 110 at a proximal region of microcatheter 110.

Proximal balloon 130 is attached, at a proximal region of proximal balloon 130, to microcatheter 110 at a distal balloon bonding region 185 (the term "distal" in this case referring to a distal region of microcatheter 110), and, at a distal region of proximal balloon 130, a proximal balloon bonding region 190 of guidewire 120.

Distal anchor member 140 comprising distal balloon 140 is shown attached to a distal region of guidewire 120 in FIGS. 1A-1B and 1D-1E. Distal balloon 140 is inflated in FIGS. 1A and 1D and deflated in FIGS. 1B and 1E. In FIG. 1C, distal balloon 140 is not shown in order to reveal porting holes 170 fluidically connecting distal balloon 140 and a fluidic passage (not shown) of guidewire 120. Such fluidic passage of guidewire 120 may be referred to as an inner lumen of guidewire 120. Distal balloon 140 may be inflated (shown in FIGS. 1A and 1D) by applying pressure to a fluid in the inner lumen of guidewire 120 and deflated by removing such pressure. In each case, pressure applied to fluid in the inner lumen of guidewire 120 is transmitted to distal balloon 140 through porting holes 170. Pressure may be applied to the fluid in the inner lumen of guidewire 120 at a proximal region of guidewire 120.

The embodiment depicted in FIGS. 1A-1G includes guidewire coil tip 150 with atraumatic tip 160, shown in FIGS. 1A-1B and 1D-1E. In the embodiment shown, guidewire coil tip 150 comprises a wire coiled into a cylindrical shape culminating in a rounded cap that is atraumatic tip 160. FIG. 1C shows the distal end of guidewire 120 with guidewire coil tip 150 removed to show how the distal end of guidewire 120 is tapered to form tapered guidewire core 175. Shown in FIG. 1C, guidewire coil tip 150 is mounted on guidewire core 175. The taper of guidewire core 175 provides room for guidewire coil tip 150 to be mounted without necessitating a significant increase in the diameter of guidewire coil tip 150 relative to guidewire 120.

In the embodiment shown in FIGS. 1A-1G, compression spring 180 is integrated into proximal balloon 130. Compression spring 180 is shown in an extended state, i.e., such that the spring is exerting a tension force between microcatheter 110 and guidewire 120, in FIGS. 1A-1C and FIG. 1G. Compression spring 180 is extended when proximal balloon 130 is inflated, thereby exerting a longitudinal force on the distal end of guidewire 120, causing guidewire 120 to extend longitudinally in a distal direction and at the same time extending compression spring 180. Compression spring 180 is shown in an extended state, i.e., such that the spring is exerting a tension force between microcatheter 110 and guidewire 120, in FIGS. 1A-1C and FIG. 1G. Compression spring 180 is relaxed or compressed (i.e., not exerting a tension force between microcatheter 110 and guidewire 120) when proximal balloon 130 is deflated, such that no longitudinal force is applied to the distal end of guidewire 120 by proximal balloon 130.

FIGS. 1F and 1G show a region of distal crosser unit 100 with proximal balloon 130 removed to illustrate the action of compression spring 180 as well as extension of guidewire 120 relative to microcatheter 110 upon inflation of proximal balloon 130. The distance that guidewire 120 is moved longitudinally relative to microcatheter 110 upon inflation of proximal balloon 130 is referred to as stroke length 195, shown in FIG. 1G.

FIG. 2 further illustrates the action of components of a distal crosser unit according to the present invention, such as distal crosser unit 100 illustrated in FIGS. 1A-1G. The mechanism of distal crosser unit 100 upon sequential inflation of proximal balloon 130 and distal balloon 140 of distal anchor member 140 are described in connection with steps labeled 1-6 in FIG. 2 with reference to elements of distal crosser unit 100 shown in FIGS. 1A-1G.

At step 1, distal crosser unit is aligned with the proximal cap of a total occlusion such that a distal region of guidewire 120 including guidewire coil tip 150 and atraumatic tip 160 are inserted into the total occlusion. Such alignment of distal crosser unit 100 with a total occlusion may be facilitated by a guiding sheath. During step 1, neither proximal balloon 130 nor distal balloon 140 are inflated. Since proximal balloon 130 is not inflated, the distal end of guidewire 120 is not forced to extend longitudinally relative to microcatheter 110, and as a result, compression spring 180, also sometimes referred to as "linear spring," is in a compressed or relaxed state, i.e., a state where compression spring 180 does not apply tension between microcatheter 110 and guidewire 120.

At step 2, proximal balloon 130 is inflated and distal balloon 140 is deflated. Upon inflation, proximal balloon 130 expands circumferentially such that it engages with the interior wall of the luminal tissue or chronic total occlusion. By engaging with the interior wall of the luminal tissue, proximal balloon 130 prevents longitudinal movement of the microcatheter. That is, by pressing itself against interior walls, proximal balloon 130 holds microcatheter 110 in a fixed position with respect to the chronic total occlusion. Upon inflation, proximal balloon 130 also expands longitudinally, applying a force that pushes the distal end of guidewire 120 longitudinally, in a distal direction. Pushing guidewire 120 distally extends guidewire 120 relative to microcatheter 110 and causes compression spring 180 to change from a compressed or relaxed state to an extended state. In its extended state, compression spring 180 applies tension between microcatheter 110 and guidewire 120. (Such tension force applied by compression spring 180 in an extended state is not sufficient to overcome the longitudinal force applied to guidewire 120 by proximal balloon 130.)

At step 3, distal balloon 140 is inflated while proximal balloon 130 remains inflated. Upon inflation, distal balloon 140 expands circumferentially such that it engages with the interior wall of the luminal tissue or chronic total occlusion. By engaging with the interior wall of the chronic total occlusion, distal balloon 140 prevents longitudinal movement of guidewire 120. That is, by pressing itself against interior walls, distal balloon 140 holds guidewire 120 in a fixed position with respect to the chronic total occlusion. Upon sufficient inflation of distal balloon 140, compression spring 180 reaches its fully extended state and the distance between microcatheter 110 and guidewire 120 achieves its stroke length 195. Stroke length 195 depends on, among other things, the amount of pressure applied to proximal balloon 130 as well as characteristics of compression spring 180 and materials comprising proximal balloon 130.

At step 4, proximal balloon 130 is deflated while distal balloon 140 remains inflated. Upon deflation, proximal balloon 130 is no longer circumferentially expanded such that it no longer engages with the interior wall of the luminal tissue or chronic total occlusion. While it is no longer engaged with the interior wall of the luminal tissue or chronic total occlusion, microcatheter 110 is no longer held in a fixed position relative to the chronic total occlusion. Further, compression spring 180 continues to exert tension between microcatheter 110 and guidewire 120 urging the two components closer together. As a result, since distal balloon 140 remains inflated, holding guidewire 120 in a fixed position relative to the total occlusion, tension from compression spring 180 pulls microcatheter 110 longitudinally in a distal direction towards distal balloon 140, causing microcatheter 110 to follow guidewire 120 a distance corresponding to a stroke length 195 across the total occlusion. As microcatheter 110 is pulled toward the distal balloon, compression spring 180 transitions from an extended state to a compressed or relaxed state (i.e., the potential energy of compression spring 180 is consumed by the movement of microcatheter 110). In addition, as microcatheter 110 moves, a region of guidewire 120 is retracted into the guidewire lumen of microcatheter 110.

At step 5, proximal balloon 130 is fully deflated and distal balloon 140 remains inflated. Upon fully deflating proximal balloon 130, compression spring 180 returns to its fully compressed or relaxed state.

At step 6, the process of sequential movement of distal crosser unit 100 restarts by returning to step 2, where proximal balloon 130 is inflated, pushing guidewire 130, while distal balloon 140 is deflated, allowing guidewire 130 to move relative to the total occlusion.

Another embodiment of a distal crosser unit of the present invention is depicted in FIGS. 3A-3I, illustrating how sequential inflation of proximal balloon 330 and distal balloon 340 of distal anchor member 340 of distal crosser unit 300 causes distal crosser unit 300 to incrementally advance in a distal direction, i.e., across a chronic total occlusion. For reference, the right-hand side of FIGS. 3A-3I is a relatively distal direction, and the left-hand side of FIGS. 3A-3E is a relatively proximal direction. FIGS. 3A-3E depict a single cycle of sequentially inflating and deflating proximal and distal balloons, and FIGS. 3F-3I show further details of a single cycle of sequentially inflating and deflating proximal and distal balloons.

In FIGS. 3A-3E reference starting position of distal crosser unit 300 is shown by dotted line 399. Such a reference position may reflect any arbitrary position of distal crosser unit 300 relative to a chronic total occlusion, such as the proximal cap of a chronic total occlusion. The different steps of sequential inflation, of proximal balloon 330 and distal balloon 340, discussed above in connection with FIG. 2, are shown in FIGS. 3A-3E, and again in FIG. 3F-3I.

FIG. 3A illustrates step 1 of sequentially inflating proximal and distal balloons, in which distal crosser unit 300 is initially aligned with a proximal end of a chronic total occlusion and guidewire coil tip 350 of guidewire 320 is aligned with the chronic total occlusion. In some cases, distal end of guidewire 320 is inserted into an initial portion of the chronic total occlusion. In step 1, neither proximal balloon 330 nor distal balloon 340 are inflated.

FIG. 3B illustrates step 2 of sequentially inflating proximal and distal balloons, in which proximal balloon 330 is inflated, while distal balloon 340 remains uninflated. Inflation of proximal balloon 330 causes longitudinal expansion of proximal balloon 330 in a distal direction. Proximal balloon 330 is attached to both microcatheter 310 and guidewire 320 such that longitudinal expansion of proximal balloon 330 applies a longitudinal force to guidewire 320, pushing guidewire in a distal direction relative to the total occlusion and also relative to a fixed position of microcatheter 330. An increased lateral length of proximal balloon 330 is depicted in FIG. 3B, relative to that shown in FIG. 3A, indicating longitudinal expansion of proximal balloon 330 has occurred.

In the embodiment shown in FIG. 3B, inflation of proximal balloon 330 also causes proximal balloon 330 to expand radially such that exterior walls of proximal balloon 330 are pressed to the interior walls of the lumen wall or chronic total occlusion, holding the microcatheter in place relative to the chronic total occlusion. Radial expansion of proximal balloon 330 may occur substantially concurrently with longitudinal expansion of proximal balloon 330. Proximal balloon 330 may also be held in a fixed position relative to the chronic total occlusion by textured or roughened exterior surface of proximal balloon 330 that engages with interior walls of the luminal tissue or chronic total occlusion.

The action of distal crosser unit 300 is further illustrated in FIG. 3B by showing that the microcatheter 310 has not moved relative to fixed starting position 399, but guidewire 310 is extended a distance in the distal direction. That is, guidewire tip 350 extends further to the right in the figure, as between FIGS. 3A and 3B.

FIG. 3C illustrates step 3 of sequentially inflating proximal and distal balloons, in which both proximal balloon 330 and distal balloon 340 are inflated. Inflation of distal balloon 340 causes radial expansion of distal balloon 340. Radial expansion of distal balloon 340 causes exterior walls of distal balloon 340 to be pressed to the interior walls of the liminal tissue or chronic total occlusion, holding the guidewire in place relative to the chronic total occlusion. That is, radial expansion of distal balloon holds guidewire 320 in a fixed position relative to the chronic total occlusion.

At step 3, proximal balloon 330 is fully inflated such that it has expanded to its full extent longitudinally, pushing guidewire 320 the full stroke length. As a result, compression spring (not shown) is extended such that it applies tension between the microcatheter and the guidewire. Such spring tension force is overcome by the longitudinal force applied by proximal balloon 330 to guidewire 320 upon longitudinal expansion of proximal balloon 330.

FIG. 3D illustrates steps 4-5 of sequentially inflating proximal and distal balloons, in which proximal balloon 330 is deflated while distal balloon 340 remains inflated. Upon deflation of proximal balloon 330, microcatheter 310 is no longer held in a fixed position relative to the chronic total occlusion. Deflation of proximal balloon 330 also removes the longitudinal force applied to guidewire 320 in a distal direction. Since distal balloon 340 remains inflated holding guidewire in a fixed position relative to the chronic total occlusion and proximal balloon 330 no longer applies a longitudinal force opposing compression spring, spring tension pulls microcatheter 310 towards guidewire 320. Such movement is illustrated in FIG. 3D as microcatheter 310 is now advanced further past reference position 399. Step 5 is characterized by the compression spring returning to a compressed or relaxed state, where it no longer applies tension between microcatheter 310 and guidewire 320 pulling microcatheter 310 toward guidewire 320.

FIG. 3E illustrates the return to step 2 of sequentially inflating proximal and distal balloons, in which the process repeats itself as described above so that distal crosser unit 300 continues to incrementally move across the chronic total occlusion. As seen in FIG. 3E, proximal balloon 330 is inflated again while distal balloon 340 is deflated. That is, FIG. 3E shows an identical configuration of distal crosser unit 300 to that shown in FIG. 3B, only moved a stroke length in the distal direction.

FIG. 3F depicts distal crosser unit 300 in an initial state with neither proximal balloon 330 nor distal balloon 340 inflated. A spring connecting microcatheter (i.e., co-axial shaft (outer)) 310 to guidewire (i.e., co-axial shaft (inner)) 320 is in a normally compressed state, i.e., it is not applying tension to pull or push either microcatheter 310 or guidewire 320.

FIG. 3G depicts the effect of pressurizing the fluidic passage (not shown) of microcatheter 310 (i.e., outer shaft P), while the fluidic passage of guidewire 320 (i.e., inner shaft P) is not pressurized. That is, pressure in the fluidic passage of microcatheter 310 is high while pressure in the fluidic passage of guidewire 320 is low. High pressure in the fluidic passage of microcatheter 310 causes proximal balloon 330 to inflate and expand longitudinally causing axial extension (i.e., a localized guidewire push) as well as expand radially causing proximal balloon 330 to wall engagement (i.e., total occlusion wall or luminal tissue wall). As a result, guidewire tip 350 is pushed distally (to the right in FIG. 3G), relative to the position shown in FIG. 3F. In addition, the spring connecting microcatheter 310 to guidewire 320 is stretched such that it applies tension between microcatheter 310 and guidewire 320 opposing the longitudinal force applied by longitudinal expansion of proximal balloon 330.

FIG. 3H depicts the effect of pressurizing the fluidic passage (not shown) of guidewire 320 (i.e., inner shaft P), while the fluidic passage (not shown) of microcatheter 310 (i.e., outer shaft P) remains pressurized. That is, pressure in the fluidic passage of guidewire 320 is high while pressure in the fluidic passage of microcatheter 310 also remains high. High pressure in the fluidic passage of guidewire 320 causes distal balloon 340 to inflate and expand radially causing distal balloon 340 to engage with wall (i.e., total occlusion wall or luminal tissue wall).

FIG. 3I depicts the effect of de-pressurizing the fluidic passage (not shown) of microcatheter 310 (i.e., outer shaft P), while the fluidic passage of guidewire 320 (i.e., inner shaft P) remains pressurized. That is, pressure in the fluidic passage of microcatheter 310 is low while pressure in the fluidic passage of guidewire 320 is high. Low pressure in the fluidic passage of microcatheter 310 means proximal balloon 330 does not engage with the wall (i.e., total occlusion wall or luminal tissue wall) and is free to move longitudinally. High pressure in the fluidic passage of guidewire 320 causes guidewire 320 to be held in a fixed position relative to the total occlusion by distal balloon 340. As a result, microcatheter 310 is allowed to retract towards guidewire 320 and distal balloon 340. Such retraction of microcatheter 310 is urged by the relaxation of the spring connecting microcatheter 310 to guidewire 320, which pulls microcatheter 310 in a distal direction.

Actuator

Microcatheter systems according to the present invention further comprise an actuator configured to sequentially inflate and deflate the proximal balloon such that the distal crosser unit progressively moves across a chronic total occlusion. Sequential inflation of the proximal balloon generally means that inflation of the proximal balloon is repeated in time (i.e., one inflation after one deflation) and is described in detail below in connection with an exemplary embodiment of the present invention showing the resulting incremental movement of the distal crosser unit. In embodiments, sequential inflation enables movement of the distal crosser unit across a total occlusion by: (1) the guidewire is advanced through the total occlusion by force applied via the inflation of the proximal balloon; (2) the guidewire anchors, via the distal anchor member, to the tissue of the chronic occlusion; (3) the guidewire acts as a rail for the microcatheter to advance over; and (4) once advanced, the microcatheter anchors to the tissue of the chronic occlusion, and the process starts over again. Any suitable frequency of inflating and deflating the proximal balloon may be applied and may vary.

In some embodiments, as described in detail below, the distal anchor member may comprise a distal balloon. In such embodiments, the actuator may be configured to sequentially inflate and deflate the proximal balloon and the distal balloon. In such cases, sequential inflation of the proximal and distal balloons generally means that inflation of the proximal and distal balloons is staggered in time (i.e., one after the other).

Actuators employed in systems of the invention may be configured to be reusable or single use, as desired. Actuators employed in systems of the invention may be configured to receive a sterile sleeve such that the actuator may be used while not contaminating the sterile field of the operating room.

In some embodiments, an actuator may comprise a source of potential energy configured to provide energy which may be regulated as desired by a regulator and an oscillator to provide for the inflation of the proximal balloon and, in some cases, the distal balloon as well. Any convenient potential energy source may be employed, where examples include voltage sources, pressure sources, electromagnetic sources, electric field sources, chemical sources and the like. In some embodiments, the potential energy source is a pressure source, where examples of suitable pressure sources include, but are not limited to: compressed gas cylinders, compressors, and the like. Where desired, the potential energy source may be operably coupled to a regulator, which serves to modulate energy to a suitable form so that it may be further acted upon by the oscillator. For example, where the potential source is a high-pressure gas source, e.g., as may be employed in a pneumatic actuator, the regulator may serve to regulate the pressure of the gas to a suitable value that can be input to the oscillator. In addition to the potential energy source and regulator, the actuator may include an oscillator. In such instances, the oscillator is used to modulate the magnitude and timing of the potential energy from the potential energy source to provide for the desired energy for use in inflating the proximal balloon, and, in some embodiments, the distal balloon as well.

In embodiments, an actuator may comprise a pressure source and an operable connection between such pressure source and, ultimately, the proximal balloon, and, in some embodiments, the distal balloon, as well, where the actuator is configured to transmit pressure to the proximal balloon, and, in some embodiments, the distal balloon, as well, in a sequential manner. In some cases, the actuator is configured to transmit pressure to the proximal balloon, and, in some embodiments, the distal balloon, as well, via the microcatheter and the guidewire, for example, via a fluid, such as a saline solution, present in the system. In some cases, the actuator converts pressure from a pressure source in one form to pressure in another form for inflation of a balloon. For example, the actuator may convert pneumatic pressure from a gas pressure source to liquid pressure applied to a balloon via a saline solution. The actuator may be configured to receive pressure from a single pressure source and use exclusively that pressure source to sequentially inflate a balloon or may receive pressure from more than one pressure source and sequentially transmit pressure from the different pressure sources to the proximal balloon, and in some instances, the distal balloon as well. For example, in some embodiments, the actuator comprises a manifold configured to generate multiple oscillating outputs from a single pressure source. In other embodiments, the actuator may comprise two pressure sources used to sequentially apply pressure to the proximal and distal balloons, respectively.

Further details regarding potential energy sources, oscillators, regulators, etc., and components thereof, that may be employed in embodiments of the present invention are provided in United States Published Patent Application Publication No. 20200046949 as well as pending PCT Application Serial No. PCT/US2020/055458; the disclosures of which are herein incorporated by reference.

Proximal Connector:

In some embodiments, the actuator comprises a first proximal connector operably connected to the microcatheter. In some cases, the actuator further comprises a second proximal connector operably connected to the guidewire. In embodiments, a proximal connector is a component of the microcatheter system located proximally in the assembled system, e.g., at the proximal end or near the proximal end, e.g., within 1 m or closer to the proximal end. The proximal connector may be configured to operably connect the microcatheter and, in some instances, the guidewire, as the case may be, to a potential energy source, such as a pressure source. In such embodiments, the proximal connector is configured to transduce energy derived from, for example, the pressure source to energy transmitted along the microcatheter or guidewire for inflating the proximal balloon or distal balloon.

In embodiments, each of the first proximal connector and the second proximal connector comprise a proximal chamber and a distal chamber separated by a membrane. The volume of each of the proximal and distal chambers may vary, ranging in some instances from 0.1 mL to 100 mL, such as 1 mL to 4 mL, where in some instances the proximal and/or the distal chamber is occupied by a liquid. In each case, the proximal chamber is operably connected to a potential energy source, such as, for example, a pressure source and configured to transduce energy (i.e., pressure) to the distal chamber, via the membrane. While the form of the proximal connectors of embodiments may vary, in some instances the proximal chamber is defined by a proximal flange and the distal chamber is defined by a distal flange, where the proximal and distal flanges are positioned on either side of the membrane to define the proximal and distal chambers, which may be hermetically sealed from each other by the separating membrane.

The membrane is configured to move in response to pressure applied to the proximal chamber and, based on such movement, produce pressure in the distal chamber of the connector. The dimensions of the membrane may vary, where in some instances the membrane has an area ranging from 100 mm$^2$ to 5,000 mm$^2$, such as 500 mm$^2$ to 2,000 mm$^2$. The membrane may be fabricated from any convenient elastic (e.g., pliant) material, where in some instances the material has a hardness ranging from Shore 10A to Shore 90A, such as Shore 50A, and a thickness between 0.5 mm to 5 mm, such as 1.0 mm to 2.5 mm. Examples of suitable membrane materials include, but are not limited to: silicone, rubber, and the like and in some cases may be strengthened by adding a reinforcing component, such as a braid. Where desired, a biasing component, such as a spring, may be provided to provide for a default or baseline membrane position. For example, a spring may be provided on the distal chamber side of the membrane which urges the membrane back to an initial position when force is removed from the proximal chamber side of the membrane.

In embodiments, the proximal chamber of the proximal connector comprises a port operably connecting the proximal chamber with, ultimately, a pressure source. Similarly, in embodiments, the distal chamber of the proximal connector comprises a port operably connecting the distal chamber with, ultimately, a fluidic passage of the microcatheter (or, in some embodiments, the guidewire, as the case may be).

Where desired, the proximal connector may include one or more sensors, e.g., configured to provide data regarding one or more components of the system. Any convenient type of sensor may be included in the proximal connector, where sensors of interest include, but are not limited to: pressure sensors, positional sensors, displacement sensors, proximity sensors, flow sensors, temperature sensors and the like. In some instances, the proximal connector includes a pressure sensor operably coupled to the distal chamber. In such instances, the pressure sensor may detect pressure and changes thereof in the fluid, such as liquid, in the distal chamber. When included, any convenient type of pressure sensor may be present, where examples of pressure sensors that may be present include, but are not limited to: resistive, capacitive, piezoelectric, optical, and MEMS-based pressure sensors, and the like. In some instances, the proximal connector includes a membrane positional sensor configured to provide spatial data regarding the position of the membrane at a given time, e.g., during use of the system. When present, any convenient membrane position sensor may be employed. In some instances, the membrane positional sensor is a Hall sensor, e.g., which may be employed in conjunction with a magnet (e.g., permanent or electromagnet) present at a fixed location relative to the membrane, such as a fixed location of the proximal connector or the pulse generator (e.g., hand-held actuator), etc., such that the fixed magnet is positioned to modulate voltage of the Hall Sensor upon membrane movement. In other instances, the membrane positional sensor may be an optical sensor, electric field potential sensor, resistive sensor, magnetic sensor, angle sensor, or acceleration sensor. Further, any combination of these sensors may be used to gather positional data of the membrane or diaphragm. In cases in which a combination of membrane positional sensors is employed, e.g., to ensure sensors provide correct data across a variety of conditions, such as frequencies, sensor data may be combined through "sensor fusion" techniques, such as those known in the art. Fabrication methods of the membrane sensor may include, but are not limited to: adhesives, direct printing, welding, embedding and the like.

Further details regarding embodiments of proximal connectors which may be employed in connection with the systems described herein are provided in U.S. Application No. 63/145,641, the disclosure of which is hereby incorporated herein by reference.

Microcatheter and Guidewire Shafts and Inflation Lumen:

In certain embodiments of the present invention, the actuator further comprises a microcatheter shaft connecting the first proximal connector to a microcatheter inflation lumen configured to propagate pressure from the first proximal connector along the microcatheter shaft to the microcatheter inflation lumen. In other embodiments, the actuator further comprises a guidewire shaft connecting the second proximal connector to a guidewire inflation lumen configured to propagate pressure from the second proximal connector along the guidewire shaft to the guidewire inflation lumen.

In embodiments, the microcatheter shaft may include tubing connecting the distal chamber of the first proximal connector (i.e., attaching to a distal chamber port) to a microcatheter inflation lumen. A microcatheter inflation lumen may comprise a chamber in which a proximal region of the microcatheter is exposed to fluid contained in the inflation lumen, such that pressure applied to fluid in the microcatheter shaft is transmitted to the fluid of the fluidic passage of the microcatheter, via the microcatheter inflation lumen. Such pressure applied to the microcatheter inflation lumen is ultimately transmitted to the proximal balloon for inflating the proximal balloon. The microcatheter shaft and inflation lumen may take any convenient configuration and may vary. In some cases, the microcatheter shaft is a tube-like cylinder and, in some cases, may be tapered. Similarly, in some cases, the microcatheter inflation lumen is a tube-like cylinder and, in some cases, may be tapered. In some cases, the microcatheter shaft comprises a stopcock or valve or port by which a fluid, such as a saline solution, may be injected.

In some cases, the microcatheter shaft may comprise one or more ports or valves configured to allow access to fluid in the microcatheter shaft and/or microcatheter inflation lumen. In other cases, the microcatheter shaft may comprise fittings, such as threaded fittings enabling the microcatheter shaft to be replaced or swapped out of the system. The microcatheter shaft, in embodiments, is made of a stiff material such as polyvinyl chloride (PVC) or polycarbonate (PC) or polyimide or the like and may be reinforced with a braid of nitinol or steel or fibrous wire or the like. The microcatheter shaft may have a length between 100 cm and 300 cm, such as 200 cm or 300 cm or 400 cm.

In embodiments, the microcatheter inflation lumen may comprise tubing configured such that the microcatheter is longitudinally aligned within the microcatheter inflation lumen. That is, the microcatheter may be fitted within the microcatheter inflation lumen in a coaxial configuration.

The microcatheter inflation lumen may take any convenient shape and may vary, such as a cylindrical shape with or without a taper. The microcatheter inflation lumen, in embodiments, is made of a stiff material such as polyvinyl chloride (PVC) or polycarbonate (PC) or the like. The microcatheter inflation lumen may have a length between 1 and 1000 mm, such as 1 mm or 10 mm or 100 mm, and may have a diameter between 0.2 mm and 10 mm, such as 1 mm or 3 mm.

In embodiments, the guidewire shaft may include tubing connecting the distal chamber of the second proximal connector (i.e., attaching to a distal chamber port) to a guidewire inflation lumen. A guidewire inflation lumen may comprise a chamber in which a proximal region of the guidewire is exposed to fluid contained in the inflation lumen, such that pressure applied to fluid in the guidewire shaft is transmitted to the fluid of the fluidic passage of the guidewire, via the guidewire inflation lumen. Such pressure applied to the guidewire inflation lumen is ultimately transmitted to the distal balloon for inflating the distal balloon. The guidewire shaft and inflation lumen may take any convenient configuration and may vary. In some cases, the guidewire shaft is a tube-like cylinder and, in some cases, may be tapered. Similarly, in some cases, the guidewire inflation lumen is a tube-like cylinder and, in some cases, may be tapered. In some cases, the guidewire shaft comprises a stopcock or valve or port by which a fluid, such as a saline solution, may be injected.

In some cases, the guidewire shaft may comprise one or more ports or valves configured to allow access to fluid in the guidewire shaft and/or guidewire inflation lumen. In other cases, the guidewire shaft may comprise fittings, such as threaded fittings enabling the guidewire shaft to be replaced or swapped out of the system. The guidewire shaft is made of a stiff material such as polyvinyl chloride (PVC) or polycarbonate (PC) or the like. The guidewire shaft may have a length between 100 cm and 300 cm, such as 200 cm or 300 cm or 400 cm.

In embodiments, the guidewire inflation lumen may comprise tubing configured such that the guidewire is longitudinally aligned within the guidewire inflation lumen. That is, the guidewire may be fitted within the guidewire inflation lumen in a coaxial configuration. The guidewire inflation lumen may take any convenient shape and may vary, such as a cylindrical shape with or without a taper. The guidewire inflation lumen is made of a stiff material such as polyvinyl chloride (PVC) or polycarbonate (PC) or the like. The guidewire inflation lumen may have a length between 1 and 1000 mm, such as 1 mm or 10 mm or 100 mm, and may have a diameter between 0.1 mm and 10 mm, such as 0.1 mm or 1 mm.

Connector:

In embodiments, the microcatheter and guidewire inflation lumens may be housed in a connector, such as a Y-hub connector, comprising ports configured to allow passage of the microcatheter and guidewire. One of the ports or branches of the connector houses the microcatheter inflation lumen, and a second port of the connector houses the guidewire inflation lumen. The microcatheter and guidewire, with the guidewire present within the microcatheter, exit the connector through a third port of the connector. That is, the third port of the connector may be positioned relatively distally and the microcatheter and guidewire exit the third branch of the connector towards, for example, a total chronic occlusion. The connector may be made of any convenient material, such as polyvinyl chloride (PVC) or polycarbonate (PC) or the like, and may comprise strain relief elements, such as, for example, flexible tubing, providing flexibility in the positioning of the connector with respect to the microcatheter and guidewire shafts.

Various aspects of the actuator of microcatheter systems of the invention being generally described above, elements of the actuator of the invention are now further reviewed in the context of specific embodiments.

Specific Embodiment—Actuator

Figure 4:
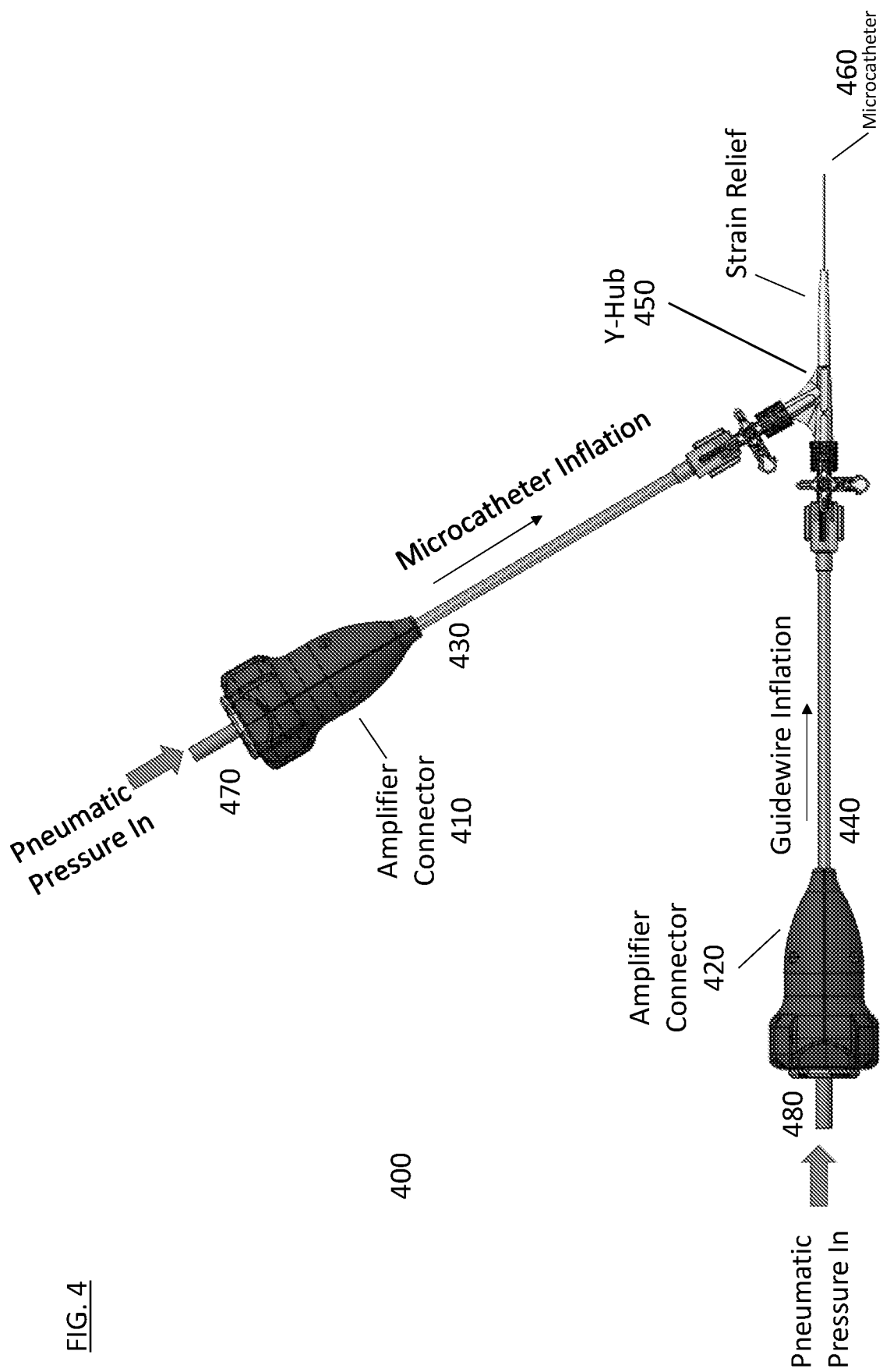
FIG. 4 depicts an actuator of an embodiment of a microcatheter system of the invention.

An actuator in accordance with an embodiment of the invention is schematically illustrated in FIG. 4. FIG. 4 shows a proximal region of aspects of a microcatheter system, i.e., components of an embodiment of an actuator, with the right-hand side of the figure being relatively distal (i.e., towards the chronic total occlusion) and the left-hand side of the figure being relatively proximal (i.e., away from the chronic total occlusion).

Shown in FIG. 4 is actuator 400 comprising first proximal connector 410 and second proximal connector 420. First proximal connector 410 is operably connected to microcatheter 460. FIG. 4 depicts a region of microcatheter 460, with other regions of microcatheter 460 being present within actuator 400 as well as extending in a distal direction where, ultimately, a distal crosser unit, such as a distal crosser unit described in connection with FIGS. 1A-1E and FIGS. 3A-3I is present. First proximal connector 410 is configured to transduce pressure received from a pressure source ultimately to the proximal balloon, via microcatheter 460. As described in detail above, first proximal connector 410 comprises proximal and distal chambers separated by a membrane. The proximal chamber is operably connected to a source of pressure (not shown) and the distal chamber is operably connected to microcatheter 460 via microcatheter shaft 430. Microcatheter shaft 430 is located in a distal direction relative to proximal connector 410. Microcatheter shaft 430 is configured as tubing where the distal end of microcatheter shaft 430 is connected to a port of Y-hub connector 450. A microcatheter inflation lumen, by which a fluidic passage of microcatheter 460 is pressurized, is housed within Y-hub connector 450. Microcatheter 460 is pressurized with a fluid, such as a saline solution, housed in the distal chamber of first proximal connector 410, microcatheter shaft 430 and microcatheter inflation lumen. The saline solution is used to fill and expand the proximal balloon when pressure is applied to the distal chamber of first proximal connector 410.

Second proximal connector 420 is operably connected to a guidewire (not shown) present in the guidewire lumen of microcatheter 460. Second proximal connector 420 is identical to first proximal connector 410, having proximal and distal chambers separated by a membrane. The proximal chamber of second proximal connector 420 is operably connected to a pressure source (not shown) and the distal chamber is ultimately connected to the guidewire, via guidewire shaft 440. Guidewire shaft 440 is located in a distal direction relative to second proximal connector 420. Guidewire shaft 440 is configured as tubing where the distal end of guidewire shaft 440 is connected to another port of Y-hub connector 450. A guidewire inflation lumen, by which a fluidic passage of the guidewire is pressurized, is housed within Y-hub connector 450. The guidewire is pressurized with a second fluid, a saline solution, present in the distal chamber of second proximal connector 420, guidewire shaft 430 and the guidewire inflation lumen. The saline solution is used to fill and expand the distal balloon when pressure is applied to the distal chamber of first proximal connector 410.

As described above, FIG. 4 depicts two fluidic paths, the first path flowing from first proximal connector 410 through microcatheter 460 and the second flowing from second proximal connector 420 through the guidewire. Such configuration enables the sequential pressurization of each fluidic path and ultimately the sequential inflation of the proximal and distal balloons.

Figure 5:
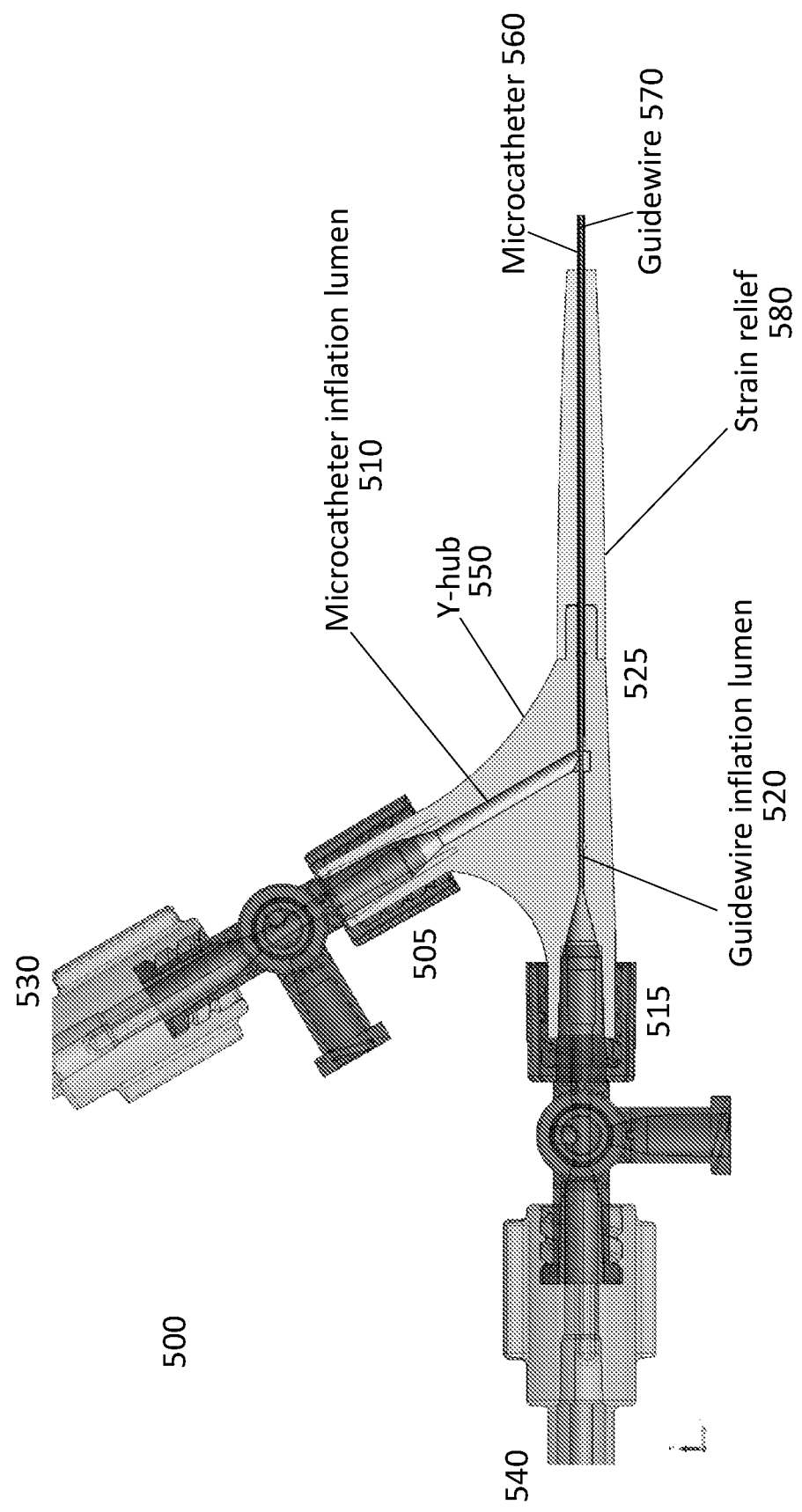
FIG. 5 depicts a close-up, cutaway view of a Y-hub connector of an embodiment of the invention.

FIG. 5 depicts a close-up, cutaway view of Y-hub connector 500. Y-hub connector 550 comprises first port 505, to which microcatheter shaft 530 is connected. The distal end of microcatheter shaft 530 is threaded and interfaces with a threaded fitting of Y-hub first port 505. Housed within Y-hub first port 505 is microcatheter inflation lumen 510. Microcatheter inflation lumen 510 is configured to transmit pressurized fluid to a fluidic passage of microcatheter 560. That is, microcatheter inflation lumen 510 receives pressurized fluid from microcatheter shaft 530 and enables fluidic communication of microcatheter shaft 530 with a fluidic passage (not shown) of microcatheter 560. Such application of pressurized fluid to the fluidic passage of microcatheter 560 ultimately is responsible for inflating the proximal balloon of the distal crosser unit (not shown).

Y-hub connector 550 further comprises second port 515, to which guidewire shaft 540 is connected. The distal end of guidewire shaft 540 is threaded and interfaces with a threaded fitting of Y-hub second port 515. Housed within Y-hub second port 515 is guidewire inflation lumen 520. Guidewire inflation lumen 520 is configured to transmit pressurized fluid to a fluidic passage of guidewire 570. That is, guidewire inflation lumen 520 receives pressurized fluid from guidewire shaft 540 and enables fluidic communication of guidewire shaft 540 with a fluidic passage (not shown) of guidewire 570. Such application of pressurized fluid to the fluidic passage of guidewire 570 ultimately is responsible for inflating the distal balloon of the distal crosser unit (not shown).

Y-hub connector 550 further comprises third port 525 located in a relatively distal position, relative to Y-hub first port 505 and second port 515. Y-hub third port 525 is configured such that microcatheter 560 with guidewire 570 positioned within the microcatheter guidewire lumen exit Y-hub through Y-hub third port 525. That is, as the distal crosser unit (not shown) is moved closer to a chronic total occlusion, microcatheter 560 and guidewire 570 are fed in a distal direction through Y-hub third port 525. The distal side of Y-hub third port 525 is connected to strain relief tubing 580 allowing for flexibility with respect to the direction of microcatheter 560 and guidewire 570 as it exits Y-hub 500.

Figure 6:
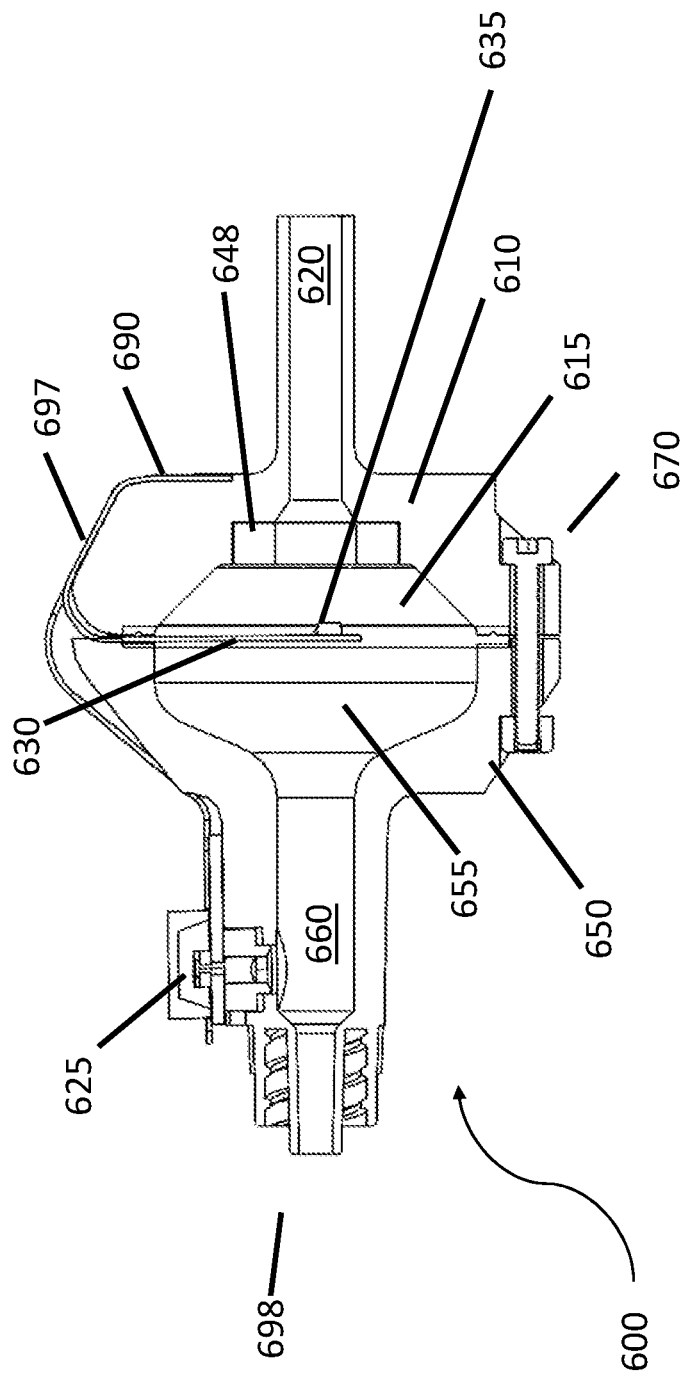
FIG. 6 provides a cutaway side illustration of an embodiment of a proximal connector of the invention.

FIG. 6 provides a cutaway side illustration of proximal connector 600, such as first proximal connector 410 or second proximal connector 420 depicted in FIG. 4. Proximal connector 600 includes proximal flange 610 and distal flange 650 separated by membrane 630. Proximal flange 610 defines proximal chamber 615 which is accessed by proximal port 620. Distal flange 650 defines distal chamber 655 which is accessed by distal port 660. Pressure transducer 625 is operably coupled to distal port 660 and distal chamber 655. Pressure transducer 625 is configured to measure fluid pressure in distal chamber 655, which pressure originated via membrane 630 from proximal chamber 615 and ultimately from a pressure source attached thereto. Readings from pressure transducer 625 may be electronically transmitted to a remote display for review by a user.

The proximal and distal flanges 610, 650 are held together by screws, as illustrated by screw 670. Alternatively, the flanges can be fixed via any other appropriate assembly method such as an adhesive, weld, or other means. In other instances, the flanges can be fabricated as a single component via a multi-stage injection molding or over-molding process around the flexible membrane and electronics. Also shown is Hall sensor 635, permanent magnet 648 (which may also be located in a handheld actuator), electrical connector 690, and flexible printed circuit board 697. Hall sensor 635 and permanent magnet 648 are configured to sense displacement of membrane 630. Displacement of membrane 630 indicates change in volume of distal chamber 655. The threaded portion 698 at the distal end of the distal port serves as the interface between a microcatheter or guidewire shaft, as the case may be, and the distal flange.

Methods

Methods of crossing a total occlusion are also provided and similarly find benefit in the applications described above. Methods according to the present invention comprise deploying a microcatheter system so that the distal end of the microcatheter system is adjacent to the proximal end of the total occlusion. Such microcatheter system comprises: a distal crosser unit comprising: a microcatheter having a guidewire lumen; a guidewire present in the guidewire lumen and extending beyond the distal end of the microcatheter; a proximal balloon attached to both the microcatheter and the guidewire, wherein the proximal balloon is configured to longitudinally expand; and a distal anchor member present on the guidewire; and an actuator configured to sequentially inflate and deflate the proximal balloon. Such components of microcatheter systems are described in detail above. Methods according to the present invention further comprise engaging the actuator in a manner sufficient to sequentially inflate and deflate the proximal balloon and move the guidewire across the total occlusion. By "sequentially inflate and deflate," it is meant that the proximal balloon is repeatedly inflated and deflated as described in detail above in connection with embodiments of systems as well as below with respect to specific embodiments of the invention. Any suitable frequency of inflating and deflating may be used and may vary. By "move the guidewire across the total occlusion," it is meant that each cycle of inflation and deflation of the proximal balloon, as described in detail below, moves the guidewire, housed in the microcatheter of the distal crosser unit, a certain distance—a stroke length-relative to the proximal face of the chronic total occlusion such that repeated inflation and deflation of the proximal balloon work to incrementally move the guidewire across the total occlusion.

In embodiments of methods of crossing a total occlusion, sequentially inflating and deflating the proximal balloon comprises (a) inflating the proximal balloon allowing the longitudinal expansion of the proximal balloon to push the guidewire longitudinally relative to the total occlusion; (b) allowing the distal anchor member to engage a lumen wall; and (c) deflating the proximal balloon allowing the microcatheter to advance longitudinally relative to the total occlusion. In some embodiments, inflating the proximal balloon further comprises allowing the inflated proximal balloon to engage the lumen wall. In some embodiments, inflating the proximal balloon further comprises allowing the inflated proximal balloon to engage the lumen wall. In such embodiments, allowing the inflated proximal balloon to engage the lumen wall comprises allowing the inflated proximal balloon to hold the microcatheter in a fixed position relative to the total occlusion. By engage the lumen wall, it is meant that the exterior surface of the proximal balloon interfaces with the inner surface of the lumen wall. In embodiments, such contact works to hold the proximal balloon and the microcatheter attached thereto in a fixed position relative to the chronic total occlusion, even while other components of the system, including other components of the distal crosser unit, may change position relative to the chronic total occlusion. Similarly, but with respect to the distal anchor member and the guidewire, in some embodiments, allowing the distal anchor member to engage the lumen wall comprises allowing the distal anchor member to hold the guidewire in a fixed position relative to the total occlusion.

As described above, in some embodiments, the distal anchor member comprises a distal balloon attached to the guidewire and configured to radially expand, and the actuator is further configured to sequentially inflate and deflate the distal balloon. In such embodiments, engaging the actuator may further comprise engaging the actuator in a manner sufficient to sequentially inflate and deflate the distal balloon. In certain cases, sequentially inflating and deflating the proximal balloon and the distal balloon comprises: (a) inflating the proximal balloon allowing the longitudinal expansion of the proximal balloon to push the guidewire longitudinally relative to the total occlusion; (b) inflating the distal balloon allowing the inflated distal balloon to engage a lumen wall; (c) deflating the proximal balloon allowing the microcatheter to advance longitudinally relative to the total occlusion; and (d) deflating the distal balloon. In other embodiments, allowing the inflated distal balloon to engage the lumen wall comprises allowing the inflated distal balloon to hold the guidewire in a fixed position relative to the total occlusion.

As described in detail above, some embodiments of the distal crosser unit comprise a spring for applying tension between the microcatheter and the guidewire. In particular, in some embodiments, the distal crosser unit further comprises a spring connecting the microcatheter to the guidewire. In such embodiments, the spring may be configured to stretch upon longitudinal expansion of the proximal balloon, and, in some cases, the spring is configured to bias the guidewire and the microcatheter into a relatively proximal position. By "relatively proximal position," it is meant that the spring is configured such that its non-tension state corresponds to a position in which the guidewire extends beyond the distal end of the microcatheter no more than a specified length. In the event the guidewire extends further beyond the distal end of the microcatheter past such specified length, the spring would no longer be in a non-tension state but would instead apply tension to the microcatheter and the guidewire urging the microcatheter and guidewire to return to a configuration where the guidewire extends beyond the distal end of the microcatheter by the specified distance. In some embodiments, sequentially inflating and deflating the proximal balloon further comprises stretching and relaxing the spring in a manner sufficient to move the guidewire across the total occlusion. In some cases, stretching and relaxing the spring comprises: inflating the proximal balloon such that longitudinal expansion of the proximal balloon stretches the spring under tension; and deflating the proximal balloon such that the spring relaxes. In such embodiments, relaxation of the spring comprises allowing the spring to return to an initial length. By "initial length," it is meant, in some cases, the length of the spring when the spring is not stretched or compressed, such as when the longitudinal expansion of the proximal balloon does not apply a force to stretch the spring. In embodiments, relaxation of the spring comprises allowing the spring to pull the microcatheter into a position proximal to the distal balloon. As described above, allowing the spring to relax allows the spring to return to an initial length and in so doing, the spring pulls the microcatheter in a relatively distal direction, towards the distal end of the guidewire and the distal anchor member. In embodiments, the distal anchor member may hold the guidewire in a fixed position relative to the total occlusion while the spring is allowed to relax.

In some instances, methods for crossing a total occlusion of the invention further comprise using an imaging technique to align the distal crosser unit with a proximal cap of the total occlusion. Any convenient imaging technique capable of visualizing aspects of a catheter present in a lumen, such as a microcatheter system according to the invention, may be applied. Imaging techniques may comprise, for example, ultrasound imaging, such as intravascular ultrasound technique, a light-based imaging technique, an angioplasty-based imaging technique or an optical coherence tomography-based technique or the like. In some cases, diagnostic X-ray imaging may be applied.

As described above, in some cases, a guiding sheath may be applied within luminal tissue to orient and align the distal end of the distal crosser unit with a chronic total occlusion. For example, in some cases, methods of crossing a total occlusion of the invention further comprise using a guiding sheath having a microcatheter lumen to align the distal crosser unit with a proximal cap of the total occlusion. In embodiments, the guiding sheath comprises a balloon located in an exterior distal region of the guiding sheath. For example, the guiding sheath may comprise a wraparound balloon present near the distal end of the guiding sheath. Embodiments may further comprise inflating the guiding sheath balloon in a manner sufficient to align the distal crosser unit with a proximal cap of the total occlusion. By inflating the guiding sheath balloon, it is meant applying pressure to the interior of the balloon typically through a catheter system where fluid is applied under pressure. Any convenient fluid may be used for inflating a guiding sheath, such as, for example, a saline solution.

As described above, methods for crossing a total occlusion of the invention may be used in the context of treating cardiovascular disease, such that in some embodiments, the method is a method for treating cardiovascular disease. In some cases, the method is a method for treating arteriosclerosis, meaning the thickening and stiffening of arterial walls. In some cases, methods of crossing a total occlusion of the invention include a method for crossing the total occlusion of a subject, where in some cases, the subject is mammalian, and, in some cases, the subject is human. For example, in some cases, a method of the present invention is a method of treating arteriosclerosis of a subject that is human.

Embodiments of a method of crossing a total occlusion of the invention may further comprises an additional intervention. For example, embodiments may comprise an additional intervention that utilizes a location of the guidewire extending across a distal end of the total occlusion. In other words, the additional invention may leverage the location of the guidewire of the microcatheter system when the guidewire has been moved a distance across the total occlusion, such as when the guidewire has been moved distally to the total occlusion such as to a position on the distal end of the total occlusion. In embodiments, the additional intervention may comprise applying a balloon-based catheter system to a region of the total occlusion. In such cases, the method may further comprise using the guidewire to position the balloon-based catheter system at a treatment region of the total occlusion. In some embodiments, the additional intervention comprises enlarging a region of the total occlusion with balloon angioplasty. In other embodiments, the additional intervention comprises inserting a stent into a region of the total occlusion. In still other embodiments, the additional intervention comprises using the guidewire to transport an object across the total occlusion. For example, embodiments could be used to pull large caliber devices along without causing damage to the rest of the arterial system. In some cases, large caliber devices may comprise a proximal tool such as a balloon or a percutaneously-inserted heart valve.
Modifying a Total Occlusion Proximal Cap:

In addition to the methods of crossing a total occlusion described above, also provided are methods of modifying a proximal cap of a total occlusion to receive a guidewire. Such method comprises deploying a microcatheter system so that the distal end of the microcatheter system is adjacent to the proximal end of the total occlusion, the microcatheter system comprising: a distal crosser unit comprising: a microcatheter having a guidewire lumen; a guidewire present in the guidewire lumen and extending beyond the distal end of the microcatheter; a proximal balloon attached to both the microcatheter and the guidewire, wherein the proximal balloon is configured to longitudinally expand; and a distal anchor member present on the guidewire; and an actuator configured to sequentially inflate and deflate the proximal balloon. Such components are described in detail above. The method further comprises engaging the actuator in a manner sufficient to sequentially inflate and deflate the proximal balloon and modify the proximal cap of the total occlusion to receive a guidewire. In some cases, modifying the proximal cap of the total occlusion comprises creating a divot in the proximal cap of the total occlusion. In other cases, modifying the proximal cap of the total occlusion comprises producing a hole in the proximal cap of the total occlusion.

Embodiments of methods of modifying a proximal cap of a total occlusion to receive a guidewire of the invention may further comprise an additional intervention applied to a region of the total occlusion comprising the divot in the proximal cap of the total occlusion. In some cases, the additional intervention comprises passing a conventional guidewire through the divot in the proximal cap of the total occlusion. By conventional guidewire, it is meant, for example, a guidewire configured for use in the context of treatment of total occlusions or arteriosclerosis or the like. Such conventional guidewires include those known in the art.

Various aspects of the methods of the invention being generally described above, elements of the method are now further reviewed in the context of specific embodiments.

Specific Embodiment—Method of Crossing Total Occlusion

Figure 7A:
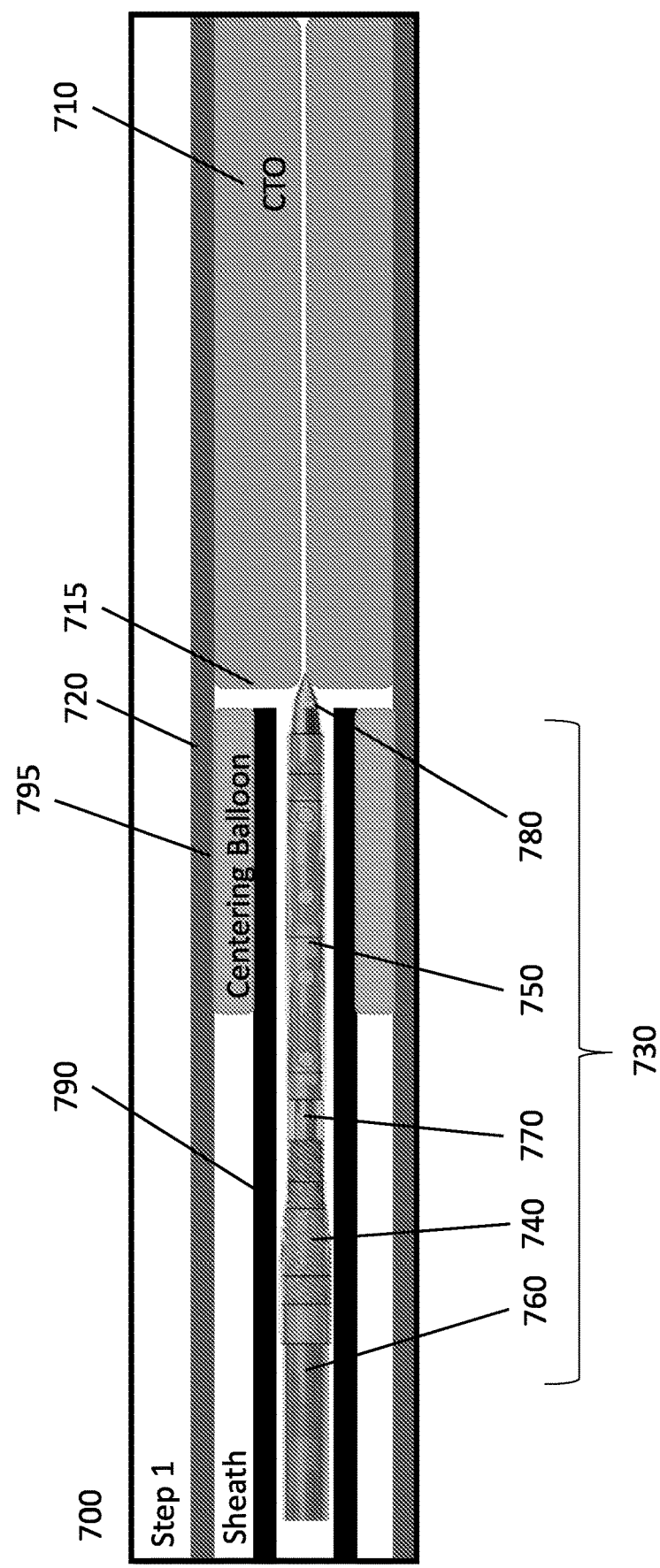
Figure 7C:
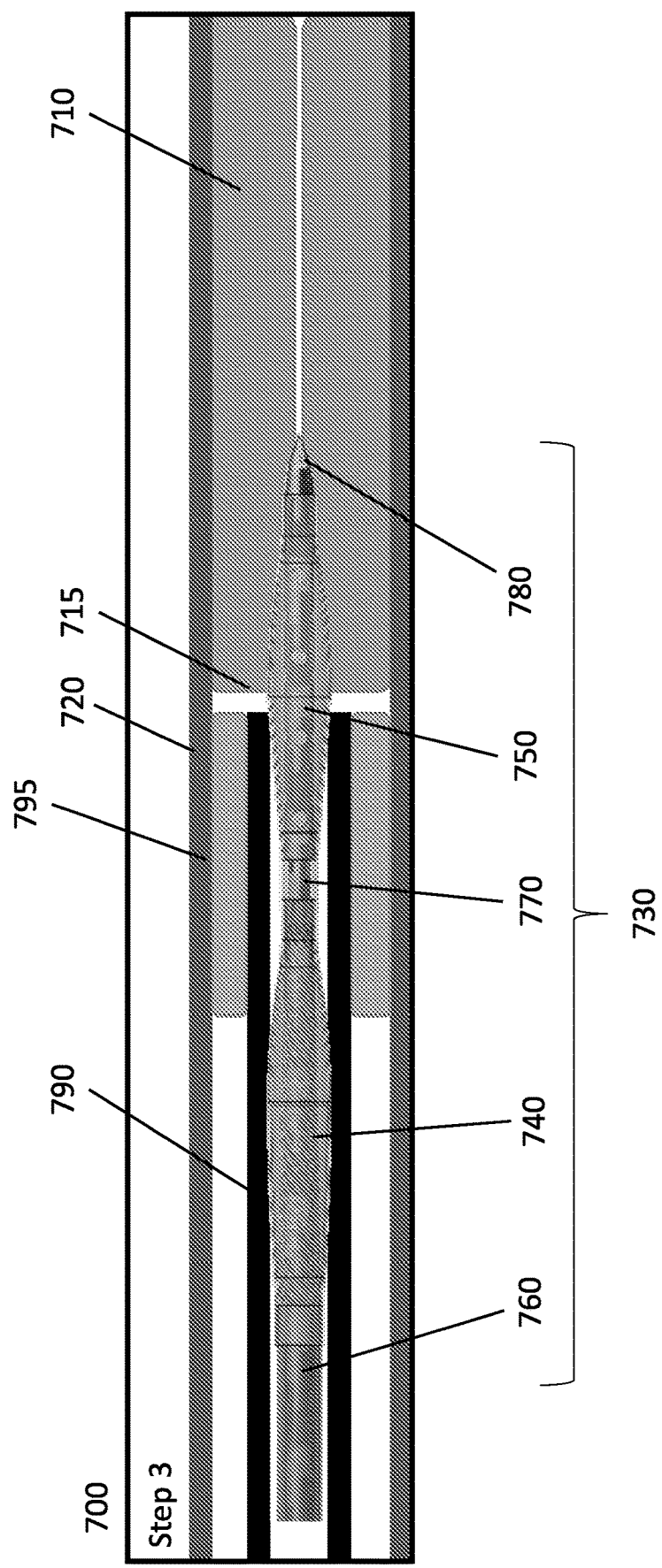
Figure 7D:
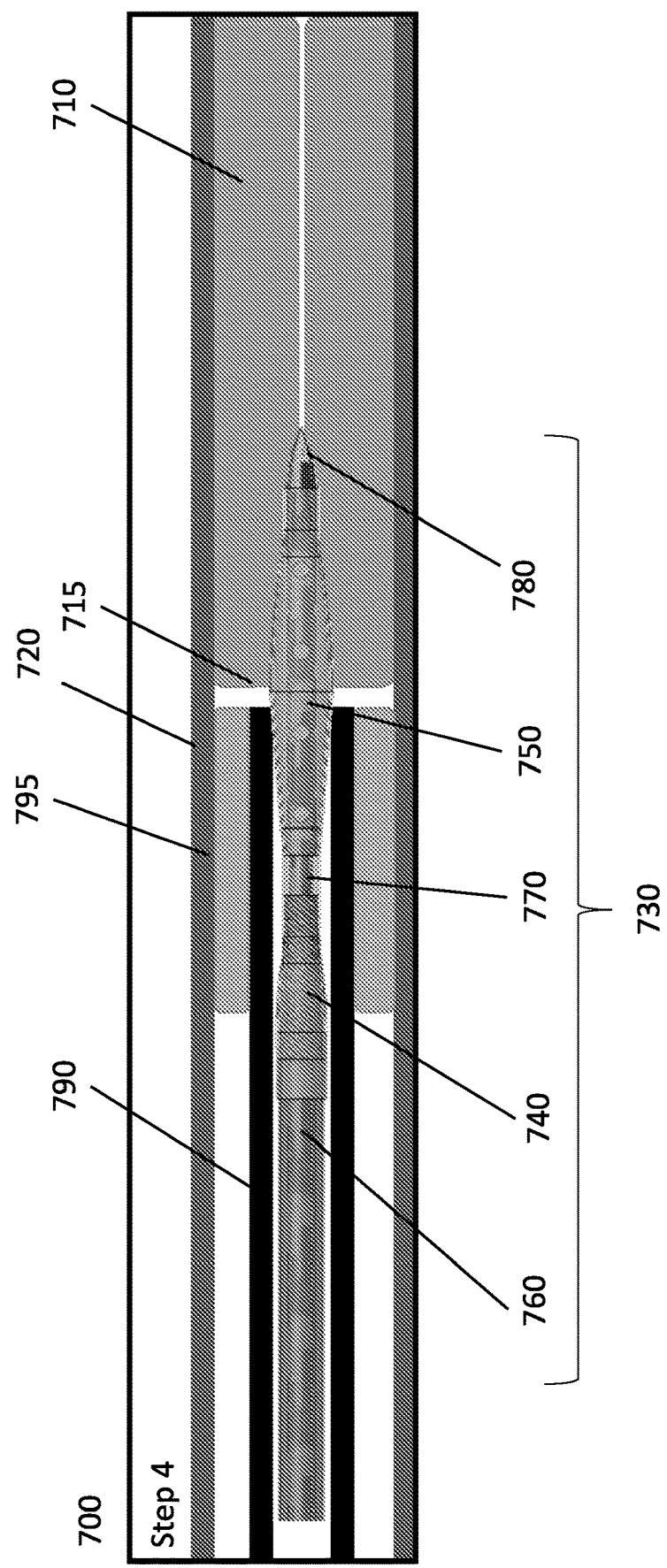
Figure 7E:
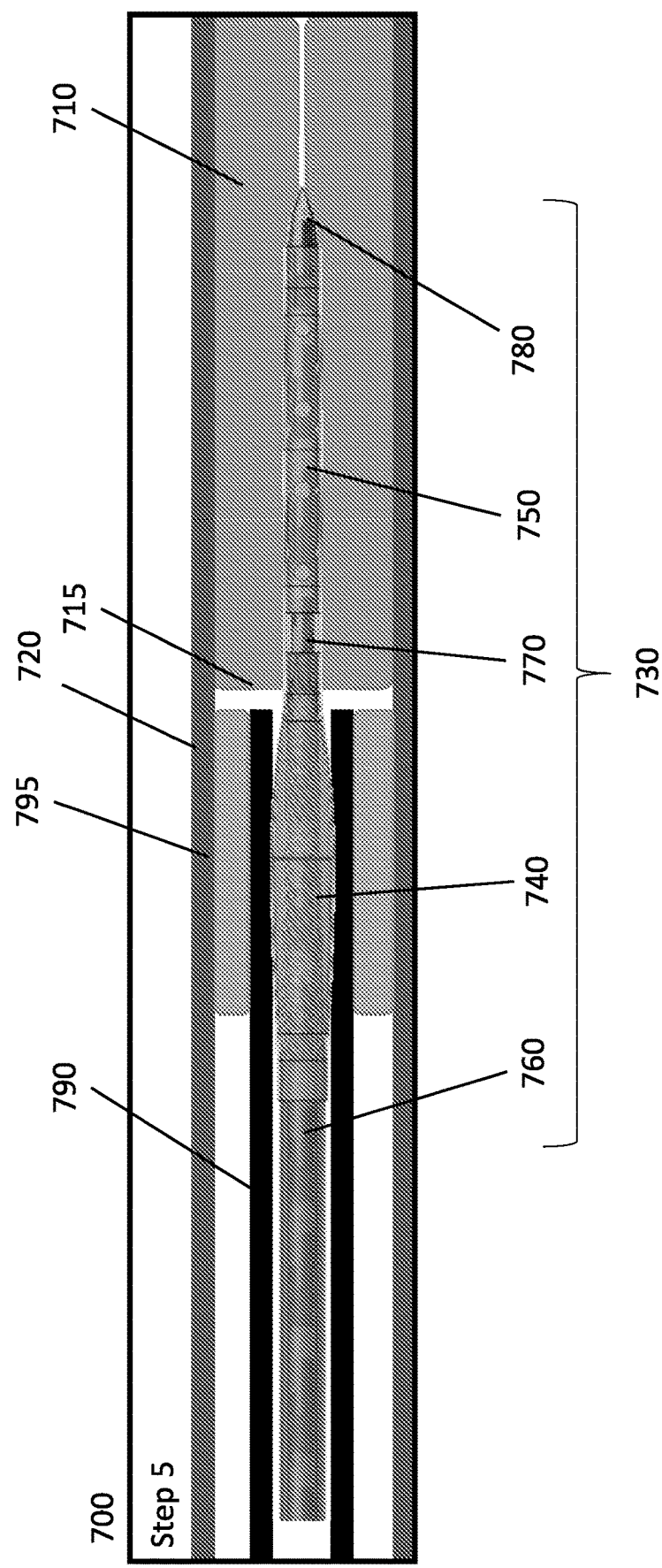
Figure 7F:
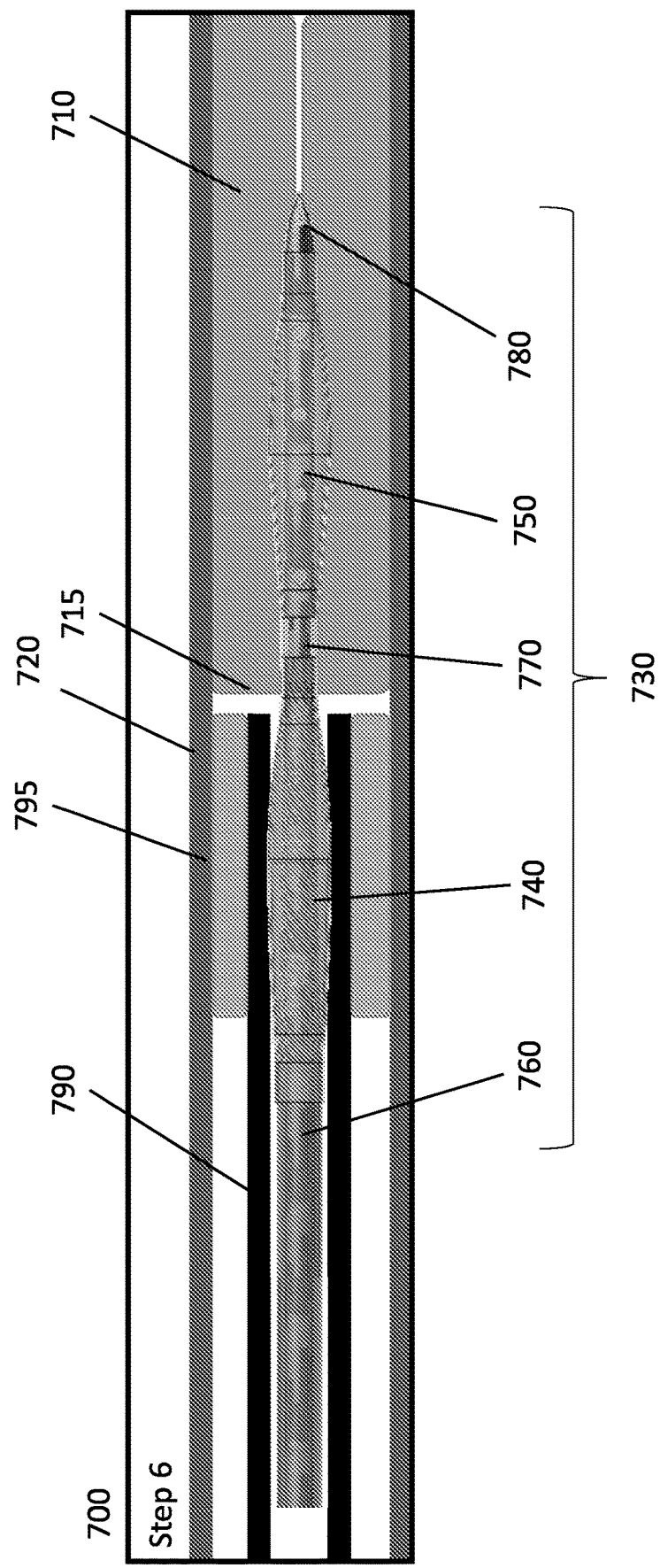
Figure 7G:
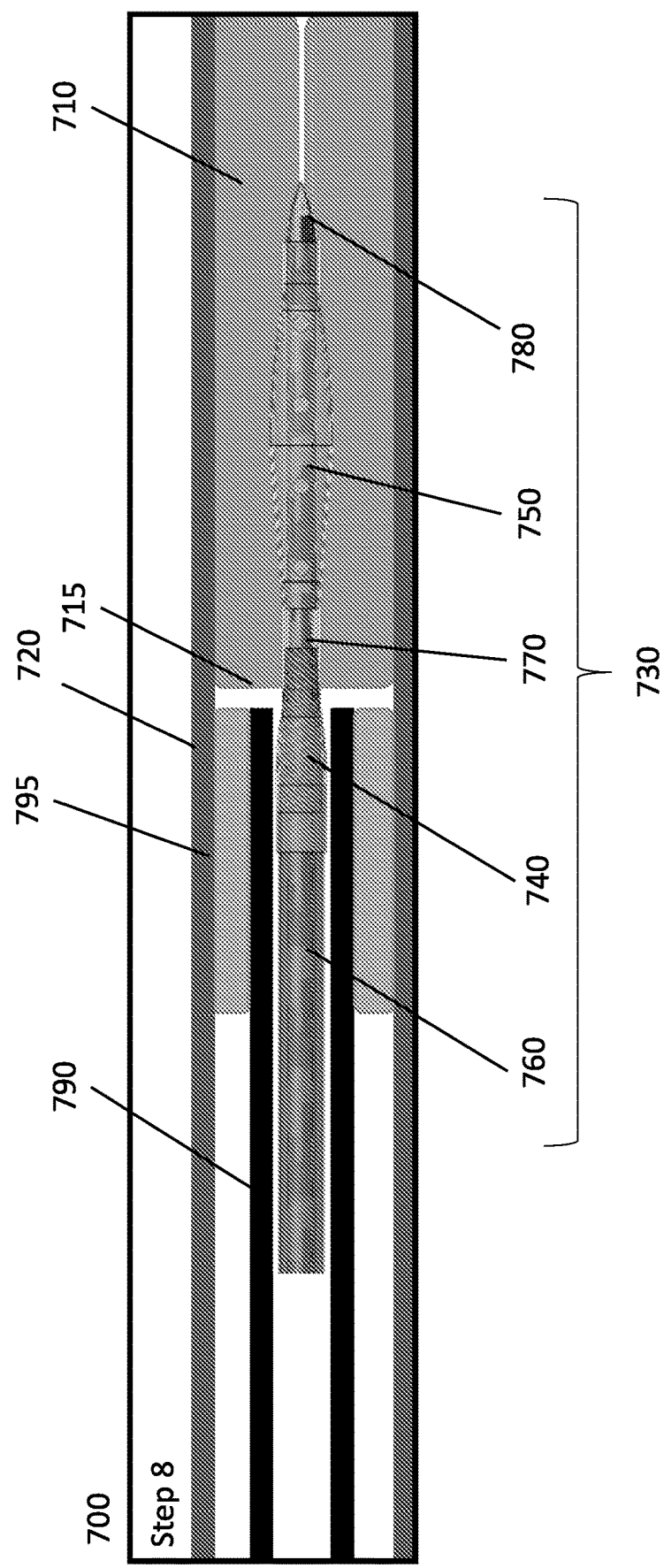
Figure 7H:
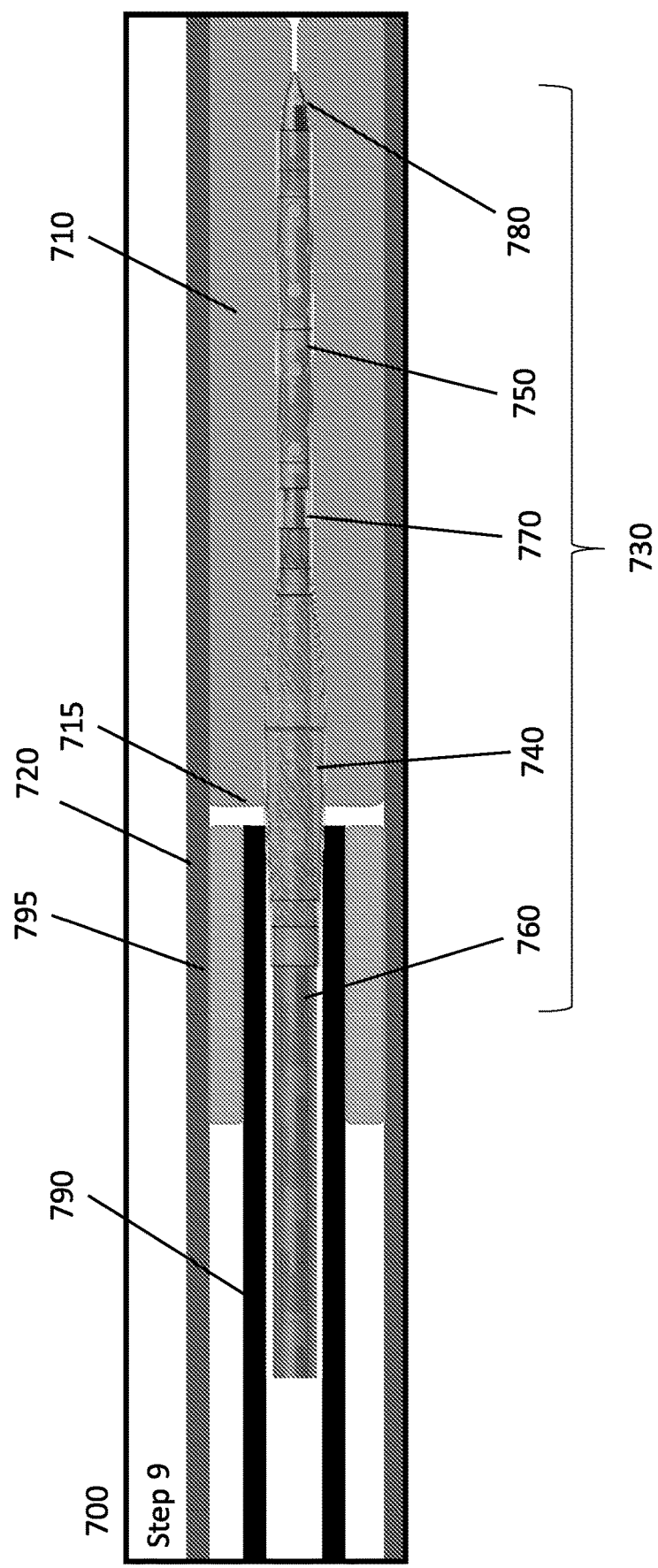
Figure 7I:
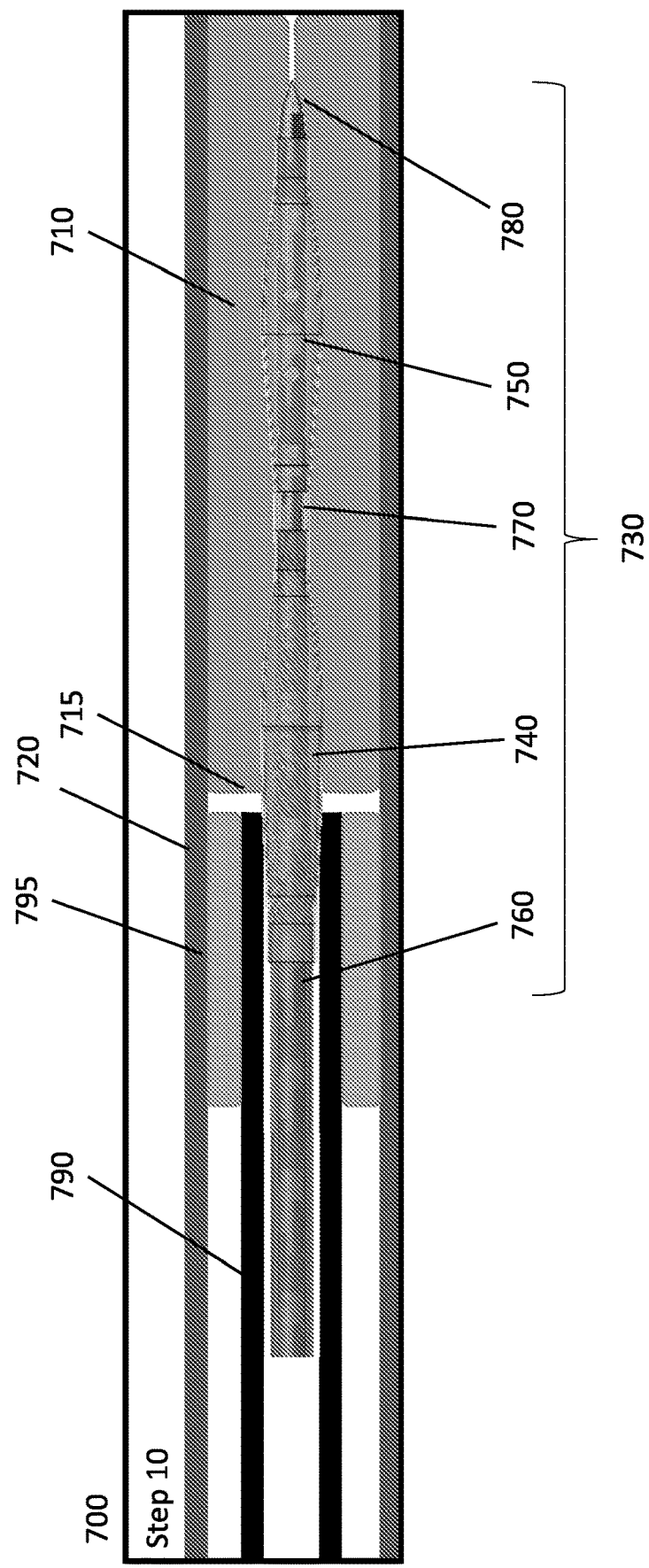
Figure 7J:
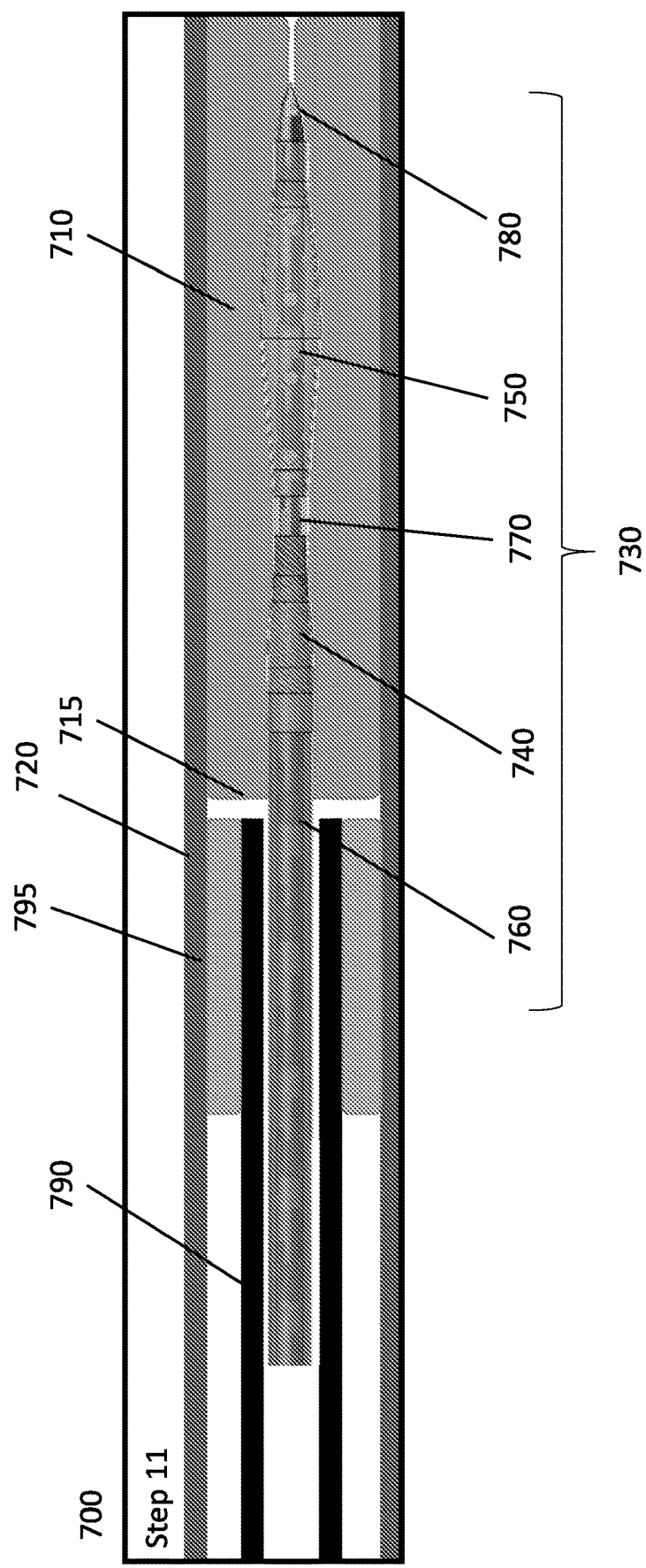

FIGS. 7A-7K depict aspects of an embodiment of the method of crossing total occlusions of the present invention. In the embodiment of distal crosser unit 730 depicted, distal anchor member 750 comprises distal balloon 750. FIGS. 7A-7K show the repeated application of this embodiment of the method 700, in particular repeatedly sequentially inflating and deflating proximal balloon 740 and distal balloon 750 illustrating how the repeated application of the method 700 works to move distal crosser unit 730 further and further across a total occlusion 710. FIGS. 7A-7D show a single application of sequentially inflating and deflating proximal balloon 740 and distal balloon 750 and moving the guidewire 770 across total occlusion 710. FIG. 7E-7H show a subsequent application of sequentially inflating and deflating proximal balloon 740 and distal balloon 750 and moving the guidewire 770 further across the total occlusion 710. FIG. 7I-7K shown another subsequent application of sequentially inflating and deflating proximal balloon 740 and distal balloon 750 and moving the guidewire 770 still further across the total occlusion 710.

Shown in FIGS. 7A-7K is chronic total occlusion 710 with proximal cap 715 (proximal face) present with internal luminal tissue 720 seen as a luminal wall. FIGS. 7A-7K depict only distal crosser unit 730 aspects of a microcatheter system of the invention. Proximal balloon 740 is shown attached to a distal region of microcatheter 760 and guidewire 770. Distal balloon 750 is shown attached to guidewire 770. Distal crosser unit 730 also comprises guidewire tip 780.

Distal crosser unit 730 is present in guiding sheath 760 with centering balloon 760. In FIG. 7A, the balloon 760 is inflated thereby aligning guidewire tip 780 with proximal cap 715 of total occlusion 710. In FIG. 7A, as distal crosser unit 730 is initially aligned with chronic total occlusion 710, proximal balloon 740 is in an uninflated state, and distal balloon 770 is also in an uninflated state.

In FIG. 7B, proximal balloon 740 is inflated such that it expands longitudinally and radially. Longitudinal expansion of proximal balloon 740 pushes guidewire 770 distally into the chronic total occlusion 710. Radial expansion of proximal balloon 740 holds proximal balloon 740 and microcatheter 760 in a fixed position relative to total chronic occlusion 710. As guidewire 770 is pushed distally into total occlusion 710, distal balloon 750 remains uninflated. The depiction of distal crosser unit 730 in FIG. 7B versus in FIG. 7A illustrates how the longitudinal expansion of proximal balloon 750 pushes guidewire 770 in a distal direction.

In FIG. 7C, distal balloon 750 is inflated such that it is expanded radially. Radial expansion of distal balloon 750 holds distal balloon 750 and guidewire 770 in a fixed position relative to total chronic occlusion 710. Note that radial expansion of distal balloon 750 holds distal balloon 750 and guidewire 770 in a fixed position notwithstanding that distal balloon 750 straddles guiding sheath 760 and total occlusion 710. Proximal balloon 740 remains inflated in FIG. 7C.

In FIG. 7D, proximal balloon 740 is deflated. Deflation of proximal balloon 740 allowed proximal balloon 740 and microcatheter 760 to be moved in a distal direction relative to total chronic occlusion 710 while distal balloon 750 and guidewire 770 remain in a fixed position. For example, a spring (not shown) connecting microcatheter 760 with guidewire 770 may be allowed to relax; since guidewire 770 is held in a fixed position, relaxation of the spring pulls microcatheter 760 toward guidewire 770. FIG. 7D shows the last state in an initial application of sequentially inflating and deflating proximal balloon 740 and distal balloon 750 and moving the guidewire 770 across total occlusion 710, with only deflation of distal balloon 750 remaining to complete a cycle. FIG. 7D illustrates how guidewire tip 780 has progressed distally across total chronic occlusion 710, relative to the position of guidewire tip 780 depicted in FIG. 7A. In FIG. 7D, distal crosser unit 730 has moved one stroke length in a distal direction, relative to that shown in FIG. 7A.

In FIG. 7E, proximal balloon 740 is inflated again such that it expands longitudinally and radially. Distal balloon 750 is deflated. Longitudinal expansion of proximal balloon 740 again pushes guidewire 770 distally into the chronic total occlusion 710. Radial expansion of proximal balloon 740 holds proximal balloon 740 and microcatheter 760 in a fixed position relative to total chronic occlusion 710. As guidewire 770 is pushed distally into total occlusion 710, distal balloon 750 remains uninflated. The depiction of distal crosser unit 730 in FIG. 7E versus in FIG. 7A or 7D illustrates how the longitudinal expansion of proximal balloon 750 pushes guidewire 770 in a distal direction.

In FIG. 7F, distal balloon 750 is again inflated such that it is expanded radially. Radial expansion of distal balloon 750 holds distal balloon 750 and guidewire 770 in a fixed position relative to total chronic occlusion 710. Proximal balloon 740 remains inflated in FIG. 7F.

In FIG. 7G, proximal balloon 740 is again deflated. Deflation of proximal balloon 740 allowed proximal balloon 740 and microcatheter 760 to be moved in a distal direction relative to total chronic occlusion 710 while distal balloon 750 and guidewire 770 remain in a fixed position. For example, a spring (not shown) connecting microcatheter 760 with guidewire 770 may be allowed to relax; since guidewire 770 is held in a fixed position, relaxation of the spring pulls microcatheter 760 toward guidewire 770. FIG. 7G shows the last state in an application of sequentially inflating and deflating proximal balloon 740 and distal balloon 750 and moving the guidewire 770 across total occlusion 710, with only deflation of distal balloon 750 remaining to complete a cycle. FIG. 7G illustrates how guidewire tip 780 has progressed distally across total chronic occlusion 710, relative to the position of guidewire tip 780 depicted in FIG. 7D or 7A. In FIG. 7G, distal crosser unit 730 has moved one stroke length in a distal direction, relative to that shown in FIG. 7D, and two stroke lengths relative to that shown in FIG. 7A.

In FIG. 7H, proximal balloon 740 is inflated again such that it expands longitudinally and radially. Distal balloon 750 is deflated. Longitudinal expansion of proximal balloon 740 again pushes guidewire 770 distally into the chronic total occlusion 710. Radial expansion of proximal balloon 740 holds proximal balloon 740 and microcatheter 760 in a fixed position relative to total chronic occlusion 710. As guidewire 770 is pushed distally into total occlusion 710, distal balloon 750 remains uninflated. The depiction of distal crosser unit 730 in FIG. 7H versus in FIG. 7G or 7D or 7A illustrates how the longitudinal expansion of proximal balloon 750 pushes guidewire 770 in a distal direction.

In FIG. 7I, distal balloon 750 is again inflated such that it is expanded radially. Radial expansion of distal balloon 750 holds distal balloon 750 and guidewire 770 in a fixed position relative to total chronic occlusion 710. Proximal balloon 740 remains inflated in FIG. 7J. In FIG. 7J, proximal balloon 740 is again deflated. Deflation of proximal balloon 740 allowed proximal balloon 740 and microcatheter 760 to be moved in a distal direction relative to total chronic occlusion 710 while distal balloon 750 and guidewire 770 remain in a fixed position. As described above, a spring (not shown) connecting microcatheter 760 with guidewire 770 may be allowed to relax; since guidewire 770 is held in a fixed position, relaxation of the spring pulls microcatheter 760 toward guidewire 770. FIG. 7J shows the last state in an application of sequentially inflating and deflating proximal balloon 740 and distal balloon 750 and moving the guidewire 770 across total occlusion 710, with only deflation of distal balloon 750 remaining to complete a cycle. FIG. 7J illustrates how guidewire tip 780 has progressed distally across total chronic occlusion 710, relative to the position of guidewire tip 780 depicted in FIG. 7F or 7D or 7A. In FIG. 7J, distal crosser unit 730 has moved one stroke length in a distal direction, relative to that shown in FIG. 7E; two stroke lengths in a distal direction, relative to that shown in FIG. 7B; and three stroke lengths relative to that shown in FIG. 7A.

The methods may be used for crossing total occlusions or strictures or otherwise restricted luminal tissue in tissue locations of any number of different subjects. In some instances, the subjects are "mammals" or "mammalian," where these terms are used broadly to describe organisms which are within the class mammalia, including the orders carnivore (e.g., dogs and cats), rodentia (e.g., mice, guinea pigs, and rats), and primates (e.g., humans, chimpanzees, and monkeys). In some instances, the subjects are humans.

KITS

Also provided are kits that include systems, or one or more components thereof, e.g., as described above. As such, kits may include, in some instances, one or more of, a distal crosser unit, an actuator, with or without a potential energy source, e.g., a pressure source, or components thereof, e.g., a manifold device for linking a plurality of pressure sources for sequential inflation of proximal and distal balloons, etc. The kit components may be present in packaging, which packaging may be sterile, as desired. Components of the kit may be disposable or reusable, as desired. In some cases, kits may comprise a plurality of components including multiple versions of the same component in different sizes, such as, for example, multiple microcatheters of varying diameters.

Also present in the kit may be instructions for using the kit components. The instructions may be recorded on a suitable recording medium. For example, the instructions may be printed on a substrate, such as paper or plastic, etc. As such, the instructions may be present in the kits as a package insert, in the labeling of the container of the kit or components thereof (i.e., associated with the packaging or sub-packaging) etc. In other embodiments, the instructions are present as an electronic storage data file present on a suitable computer readable storage medium, e.g., portable flash drive, DVD- or CD-ROM, etc. The instructions may take any form, including complete instructions for how to use the device or as a website address with which instructions posted on the world wide web may be accessed.

The following example(s) is/are offered by way of illustration and not by way of limitation.

EXAMPLES

Figure 8B:
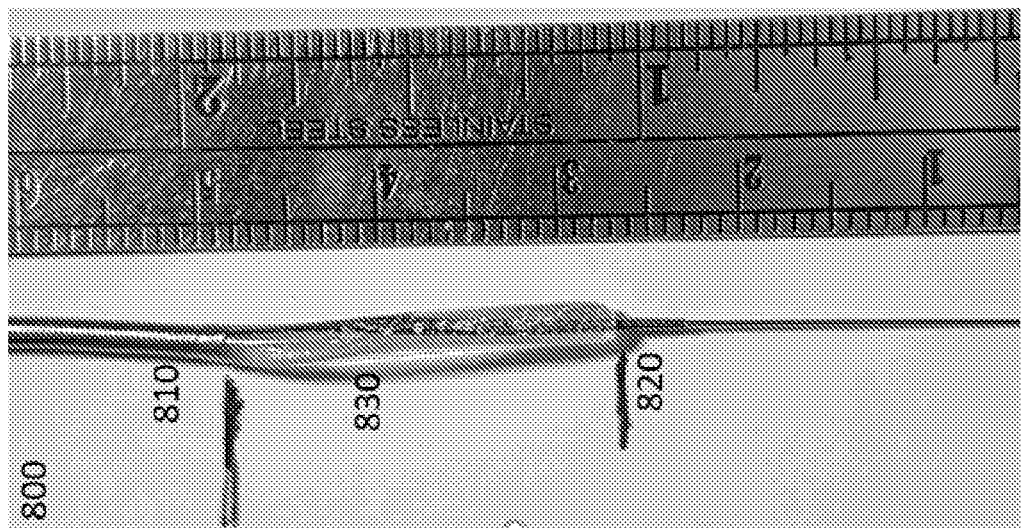
FIG. 8A-8D depict aspects of a distal crosser unit according to embodiments of the invention.
Figure 8A:
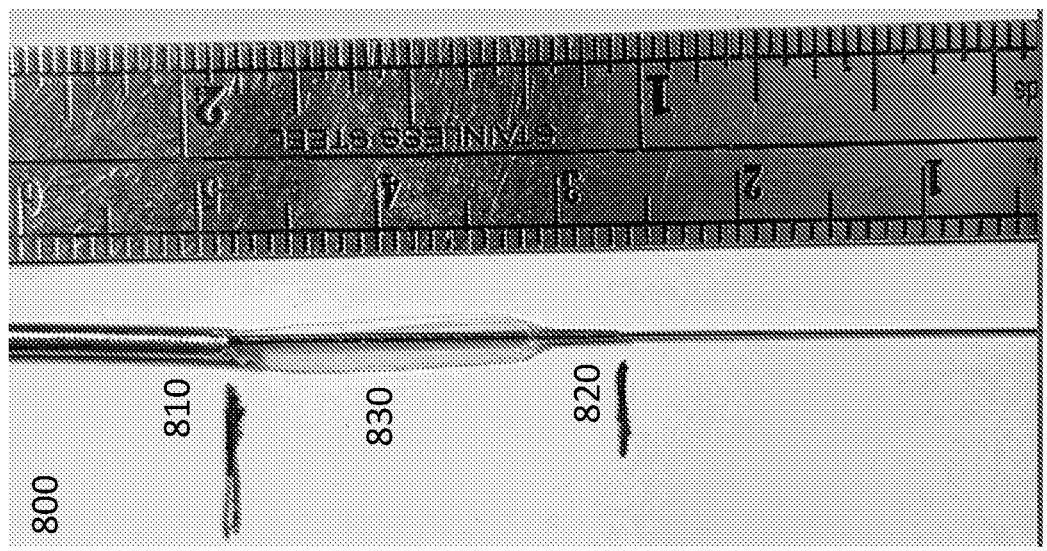

FIGS. 8A-8B provide pictures of aspects of a distal crosser unit according to an embodiment of the invention. Distal crosser unit 800 is depicted with microcatheter 810 and guidewire 820. In FIG. 8A, proximal balloon 830 is shown in a relatively deflated state, and in FIG. 8B, proximal balloon 830 is shown in a relatively inflated state. When inflated as such, proximal balloon 830 expands longitudinally (represented vertically in FIGS. 8A-8B). Proximal balloon 830 is shown bonded on one side to the distal end of microcatheter 810 and on the other side to a region of guidewire 820. Such configuration enables the longitudinal expansion of proximal balloon to push guidewire 820 longitudinally, upon expansion of proximal balloon 830. The stroke length of distal crosser unit is indicated based on the position of the guidewire tip relative to the ruler in FIGS. 8A-8B. The average velocity of the tip of the guidewire of the distal crosser unit is approximately 500 mm/s.

Figure 8D:
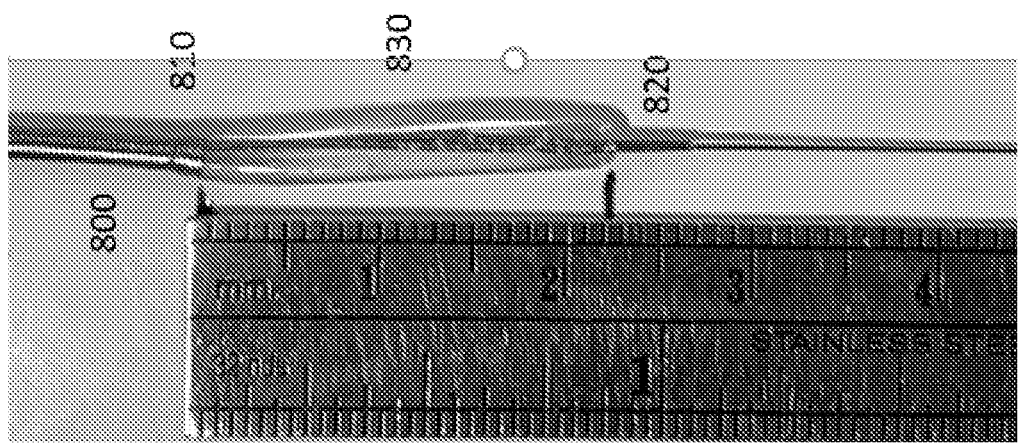
Figure 8C:
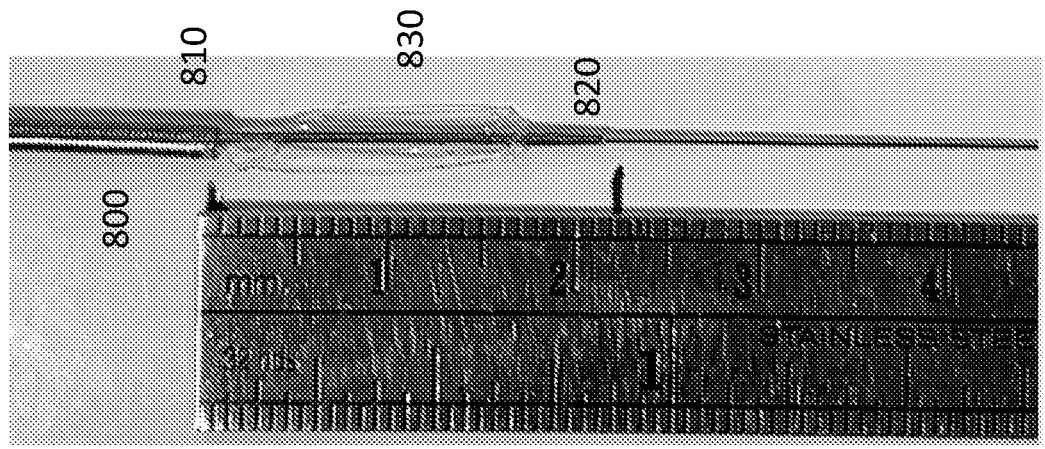

FIGS. 8C-8D provide pictures of aspects of a distal crosser unit according to another embodiment of the invention. Distal crosser unit 800 is depicted with microcatheter 810 and guidewire 820. In FIG. 8C, proximal balloon 830 is shown in a relatively deflated state, and in FIG. 8D, proximal balloon 830 is shown in a relatively inflated state. When inflated as such, proximal balloon 830 expands longitudinally (represented vertically in FIGS. 8C-8D). Proximal balloon 830 is shown bonded on one side to the distal end of microcatheter 810 and on the other side to a region of guidewire 820. Such configuration enables the longitudinal expansion of proximal balloon to push guidewire 820 longitudinally, upon expansion of proximal balloon 830. The stroke length of distal crosser unit 800 is indicated based on the position of the guidewire tip relative to the ruler in FIGS. 8C-8D. The average velocity of the tip of the guidewire of the distal crosser unit is approximately 600 mm/s.

Notwithstanding the appended claims, the disclosure is also defined by the following clauses:

1. A microcatheter system for crossing total occlusions, the system comprising:
   (a) a distal crosser unit comprising:
      (i) a microcatheter having a guidewire lumen;
      (ii) a guidewire present in the guidewire lumen and extending beyond the distal end of the microcatheter;
      (iii) a proximal balloon attached to both the microcatheter and the guidewire, wherein the proximal balloon is configured to longitudinally expand; and
      (iv) a distal anchor member present on the guidewire; and
   (b) an actuator configured to sequentially inflate and deflate the proximal balloon such that the distal crosser unit progressively moves across a chronic total occlusion.
2. The microcatheter system of Clause 1, wherein the distal crosser unit is configured so that longitudinal expansion of the proximal balloon applies a longitudinal force to the guidewire.
3. The microcatheter system of Clause 2, wherein the longitudinal force applied to the guidewire advances the guidewire across the total occlusion.
4. The microcatheter system of any of Clauses 1 to 3, wherein the distal crosser unit is configured such that inflation of the proximal balloon advances the guidewire by a specified stroke-per-cycle length.
5. The microcatheter system of Clause 4, wherein the stroke-per-cycle length is configurable based on pressure applied to the proximal balloon.
6. The microcatheter system of any of Clauses 1 to 5, wherein the proximal balloon is further configured to expand radially.
7. The microcatheter system of any of Clauses 1 to 6, wherein the proximal balloon comprises a passive feature for holding the proximal balloon in a fixed position relative to the chronic total occlusion.
8. The microcatheter system of Clause 7, wherein the passive feature comprises a rough exterior surface or a serrated surface or a rough edge or a serrated edge.
9. The microcatheter system of any of Clauses 1 to 8, wherein the proximal balloon is tapered.
10. The microcatheter system of any of Clauses 1 to 9, wherein the proximal balloon has a high circumferential stiffness.
11. The microcatheter system of any of Clauses 1 to 10, wherein the proximal balloon is non-compliant.
12. The microcatheter system of any of Clauses 1 to 11, wherein the proximal balloon is attached to a distal region of the microcatheter and to a distal region of the guidewire.
13. The microcatheter system of Clauses 1 to 12, wherein the proximal balloon is configured to be folded in a configuration that enhances longitudinal expansion upon inflation.
14. The microcatheter system of Clause 13, wherein the proximal balloon is configured to return to the folded configuration upon deflation.
15. The microcatheter system of any of Clauses 13 to 14, wherein the proximal balloon is folded in a C-shape.
16. The microcatheter system of any of Clauses 1 to 15, wherein the distal anchor member comprises a passive feature for holding the distal anchor member in a fixed position relative to the total chronic occlusion.
17. The microcatheter system of Clause 16, wherein the passive feature comprises a rough exterior surface or a serrated exterior surface or a rough edge or a serrated edge.
18. The microcatheter system of any of Clauses 1 to 17, wherein the microcatheter comprises a first fluidic passage configured to propagate pressure along the first fluidic passage from a proximal region of the microcatheter to the proximal balloon.
19. The microcatheter system of Clause 18, wherein the guidewire lumen of the microcatheter comprises the first fluidic passage.
20. The microcatheter system of any of Clauses 18 to 19, wherein the first fluidic passage comprises a first fluid.
21. The microcatheter system of Clause 20, wherein the first fluid comprises a saline solution or a contrast fluid.
22. The microcatheter system of any of Clauses 1 to 21, wherein a region of the microcatheter is tapered.
23. The microcatheter system of any of Clauses 1 to 22, wherein
   the distal anchor member comprises a distal balloon attached to the guidewire and configured to radially expand, and
   the actuator is further configured to sequentially inflate and deflate the distal balloon.
24 The microcatheter system of Clause 23, wherein the distal balloon is configured to conform to a diameter of the guidewire upon deflation.
25. The microcatheter system of any of Clauses 23 to 24, wherein the distal balloon is compliant.
26. The microcatheter system of any of Clauses 23 to 25, wherein the guidewire comprises a second fluidic passage configured to propagate pressure along the second fluidic passage to the distal balloon.
27. The microcatheter system of Clause 26, wherein the second fluidic passage comprises a second fluid.
28. The microcatheter system of Clause 27, wherein the second fluid comprises a saline solution or a contrast fluid.
29. The microcatheter system of any of Clauses 26 to 28, wherein the guidewire comprises porting holes fluidically coupling the second fluidic passage to the distal balloon.
30. The microcatheter system of any of Clauses 1 to 29, wherein the microcatheter and the guidewire are coaxial.
31. The microcatheter system of any of Clauses 1 to 30, wherein the distal crosser unit further comprises a spring connecting the microcatheter to the guidewire.
32. The microcatheter system of Clause 31, wherein the spring is configured to stretch upon longitudinal expansion of the proximal balloon.
33. The microcatheter system of Clause 32, wherein the spring is configured to bias the guidewire and the microcatheter into a relatively proximal position.
34. The microcatheter system of any of Clauses 31 to 33, wherein the spring is configured to apply longitudinal tension to the microcatheter and the guidewire upon longitudinal expansion of the proximal balloon.

35. The microcatheter system of any of Clauses 31 to 34, wherein the spring is a continuation of the distal end of the microcatheter configured to act as a spring.

36. The microcatheter system of any of Clauses 31 to 35, wherein the spring is integrated into the proximal balloon.

37 The microcatheter system of any of Clauses 31 to 36, wherein the spring is configured in a helical configuration or a wave configuration.

38. The microcatheter system of any of Clauses 1 to 37, wherein the distal end of the guidewire is configured to form a tapered guidewire core.

39. The microcatheter system of Clause 38, wherein the distal crosser unit further comprises a guidewire tip comprising a guidewire coil attached to the tapered guidewire core.

40. The microcatheter system of Clause 39, wherein the guidewire tip is a blunt tip or a sharp tip.

41. The microcatheter system of any of Clauses 39 to 40, wherein the guidewire tip is an atraumatic tip.

42. The microcatheter system of Clauses 39 to 41, wherein the guidewire tip is shaped based on a pathology of the total occlusion.

43. The microcatheter system of any of Clauses 1 to 42, further comprising a guiding sheath having a microcatheter lumen for aligning the distal crosser unit with a proximal cap of the total occlusion.

44. The microcatheter system of Clause 43, wherein the guiding sheath comprises a balloon located in an exterior distal region of the guiding sheath.

45. The microcatheter system of any of Clauses 1 to 44, wherein the distal crosser unit is configured so that the distal end of the distal crosser unit can be steered by rotating the microcatheter or the guidewire.

46. The microcatheter system of Clause 45, wherein the microcatheter or the guidewire comprise a region where the microcatheter or the guidewire are relatively stiff.

47. The microcatheter system of any of Clauses 1 to 46, wherein the distal crosser unit comprises a steering spring configured to steer the microcatheter or the guidewire.

48. The microcatheter system of any of Clauses 1 to 47, wherein the distal crosser unit comprises a steering cable configured such that proximally retracting the steering cable causes the distal crosser unit to change direction.

49. The microcatheter system of any of Clauses 1 to 48, wherein the actuator comprises a first proximal connector operably connected to the microcatheter.

50. The microcatheter system of Clause 49, wherein the actuator further comprises a microcatheter shaft connecting the first proximal connector to a microcatheter inflation lumen configured to propagate pressure from the first proximal connector along the microcatheter shaft to the microcatheter inflation lumen.

51. The microcatheter system of Clause 50, wherein the actuator further comprises a second proximal connector operably connected to the guidewire.

52. The microcatheter system of Clause 51, wherein the actuator further comprises a guidewire shaft connecting the second proximal connector to a guidewire inflation lumen configured to propagate pressure from the second proximal connector along the guidewire shaft to the guidewire inflation lumen.

53. The microcatheter system of Clause 52, further comprising a connector comprising a first port, a second port and a third port, wherein:
the microcatheter inflation lumen is housed in the first port;
the guidewire inflation lumen is housed in the second port; and
the microcatheter and guidewire exit the connector at the third port.

54. The microcatheter system of Clause 53 wherein one or more of the ports of the connector comprise flexible strain relief tubing.

55. The microcatheter system of Clauses 53 to 54, wherein the connector is a Y-hub.

56. The microcatheter system of any of Clauses 51 to 55, wherein each of the first proximal connector and the second proximal connector comprise a proximal chamber and a distal chamber separated by a membrane.

57. The microcatheter system of any of Clause 1 to 56, wherein the actuator comprises a first pressure source.

58. The microcatheter system of Clause 57, wherein the first pressure source is a single pressure source, and the actuator comprises a manifold configured to generate multiple oscillating outputs.

59. The microcatheter system of any of Clauses 57 to 58, further comprising flexible tubing operably connected to the distal end of the first pressure source.

60. The microcatheter system of any of Clauses 57 to 59, wherein the actuator comprises a second pressure source.

61. The microcatheter system of Clause 60, wherein the first pressure source and the second pressure source are configured to generate multiple oscillating outputs.

62. A method of crossing a total occlusion, the method comprising:
deploying a microcatheter system so that the distal end of the microcatheter system is adjacent to the proximal end of the total occlusion, the microcatheter system comprising:
a distal crosser unit comprising:
a microcatheter having a guidewire lumen;
a guidewire present in the guidewire lumen and extending beyond the distal end of the microcatheter;
a proximal balloon attached to both the microcatheter and the guidewire, wherein the proximal balloon is configured to longitudinally expand; and
a distal anchor member present on the guidewire; and
an actuator configured to sequentially inflate and deflate the proximal balloon; and
engaging the actuator in a manner sufficient to sequentially inflate and deflate the proximal balloon and move the guidewire across the total occlusion.

63. The method of crossing a total occlusion of Clause 62, wherein sequentially inflating and deflating the proximal balloon comprises:
(a) inflating the proximal balloon allowing the longitudinal expansion of the proximal balloon to push the guidewire longitudinally relative to the total occlusion;
(b) allowing the distal anchor member to engage a lumen wall; and
(c) deflating the proximal balloon allowing the microcatheter to advance longitudinally relative to the total occlusion.

64. The method of crossing a total occlusion of Clause 63, wherein inflating the proximal balloon further comprises allowing the inflated proximal balloon to engage the lumen wall.
65. The method of crossing a total occlusion of Clause 64, wherein allowing the inflated proximal balloon to engage the lumen wall comprises allowing the inflated proximal balloon to hold the microcatheter in a fixed position relative to the total occlusion.
66. The method of crossing a total occlusion of any of Clauses 63 to 65, wherein allowing the distal anchor member to engage the lumen wall comprises allowing the distal anchor member to hold the guidewire in a fixed position relative to the total occlusion.
67. The method of crossing a total occlusion of any of Clauses 62 to 66, wherein
    the distal anchor member comprises a distal balloon attached to the guidewire and configured to radially expand; and
    the actuator is further configured to sequentially inflate and deflate the distal balloon.
68. The method of crossing a total occlusion of Clause 67, wherein engaging the actuator further comprises engaging the actuator in a manner sufficient to sequentially inflate and deflate the distal balloon.
69. The method of crossing a total occlusion of Clause 68, wherein sequentially inflating and deflating the proximal balloon and the distal balloon comprises:
    (a) inflating the proximal balloon allowing the longitudinal expansion of the proximal balloon to push the guidewire longitudinally relative to the total occlusion;
    (b) inflating the distal balloon allowing the inflated distal balloon to engage a lumen wall;
    (c) deflating the proximal balloon allowing the microcatheter to advance longitudinally relative to the total occlusion; and
    (d) deflating the distal balloon.
70. The method of crossing a total occlusion of Clause 69, wherein allowing the inflated distal balloon to engage the lumen wall comprises allowing the inflated distal balloon to hold the guidewire in a fixed position relative to the total occlusion.
71. The method of crossing a total occlusion of any of Clauses 62 to 70, wherein the distal crosser unit further comprises a spring connecting the microcatheter to the guidewire.
72. The method of crossing a total occlusion of Clause 71, wherein the spring is configured to stretch upon longitudinal expansion of the proximal balloon.
73. The method of crossing a total occlusion of Clause 72, wherein the spring is configured to bias the guidewire and the microcatheter into a relatively proximal position.
74. The method of crossing a total occlusion of any of Clauses 71 to 73, wherein sequentially inflating and deflating the proximal balloon further comprises stretching and relaxing the spring in a manner sufficient to move the guidewire across the total occlusion.
75. The method of crossing a total occlusion of Clause 74, wherein stretching and relaxing the spring comprises:
    inflating the proximal balloon such that longitudinal expansion of the proximal balloon stretches the spring under tension; and
    deflating the proximal balloon such that the spring relaxes.
76. The method of crossing a total occlusion of Clause 75, wherein relaxation of the spring comprises allowing the spring to return to an initial length.
77. The method of crossing a total occlusion of any of Clauses 75 to 76, wherein relaxation of the spring comprises allowing the spring to pull the microcatheter into a position proximal to the distal anchor member.
78. The method of crossing a total occlusion of Clause 77, wherein the distal anchor member engages the lumen wall to hold the guidewire in a fixed position relative to the total occlusion while the spring is allowed to relax.
79. The method of crossing a total occlusion of Clause 78, wherein the distal anchor member is configured to hold the guidewire in a fixed position relative to the total occlusion while the spring is allowed to relax.
80. The method of crossing a total occlusion of any of Clauses 62 to 79, further comprising using an imaging technique to align the distal crosser unit with a proximal cap of the total occlusion.
81. The method of crossing a total occlusion of Clause 80, wherein the imaging technique comprises an intravascular ultrasound technique, a light-based imaging technique, an angioplasty-based imaging technique or an optical coherence tomography-based technique.
82. The method of crossing a total occlusion of any of Clauses 62 to 81, further comprising using a guiding sheath having a microcatheter lumen to align the distal crosser unit with a proximal cap of the total occlusion.
83. The method of crossing a total occlusion of Clause 82, wherein the guiding sheath comprises a balloon located in an exterior distal region of the guiding sheath.
84. The method of crossing a total occlusion of Clause 83, further comprising inflating the guiding sheath balloon in a manner sufficient to align the distal crosser unit with a proximal cap of the total occlusion
85. The method of crossing a total occlusion of any of Clauses 61 to 84, wherein the method is a method for treating cardiovascular disease.
86. The method of crossing a total occlusion of Clause 85, wherein the method is a method for treating arteriosclerosis.
87. The method of crossing a total occlusion of any of Clauses 62 to 86, wherein the method further comprises an additional intervention.
88. The method of crossing a total occlusion of Clause 87, wherein the additional intervention utilizes a location of the guidewire extending across a distal end of the total occlusion.
89. The method of crossing a total occlusion of Clause 88, wherein the additional intervention comprises applying a balloon-based catheter system to a region of the total occlusion.
90. The method of crossing a total occlusion of Clause 89, comprising using the guidewire to position the balloon-based catheter system at a treatment region of the total occlusion.
91. The method of crossing a total occlusion of Clause 90, wherein the additional intervention comprises enlarging a region of the total occlusion with balloon angioplasty.
92. The method of crossing a total occlusion of any of Clauses 87 to 88, wherein the additional intervention comprises inserting a stent into a region of the total occlusion.

93. The method of crossing a total occlusion of any of Clauses 87 to 88, wherein the additional intervention comprises using the guidewire to transport an object across the total occlusion.
94. The method of crossing a total occlusion of any of Clauses 62 to 93, wherein the method is a method for crossing the total occlusion of a subject.
95. The method of crossing a total occlusion of Clause 94, wherein the subject is mammalian.
96 The method of crossing a total occlusion of Clause 95, wherein the subject is human.
97. A method of modifying a proximal cap of a total occlusion to receive a guidewire, the method comprising:
   deploying a microcatheter system so that the distal end of the microcatheter system is adjacent to the proximal end of the total occlusion, the microcatheter system comprising:
      a distal crosser unit comprising:
         a microcatheter having a guidewire lumen;
         a guidewire present in the guidewire lumen and extending beyond the distal end of the microcatheter;
         a proximal balloon attached to both the microcatheter and the guidewire, wherein the proximal balloon is configured to longitudinally expand; and
         a distal anchor member present on the guidewire; and
      an actuator configured to sequentially inflate and deflate the proximal balloon; and
   engaging the actuator in a manner sufficient to sequentially inflate and deflate the proximal balloon and modify the proximal cap of the total occlusion to receive a guidewire.
98. The method of Clause 97, wherein modifying a proximal cap of a total occlusion to receive a guidewire comprises creating a divot in the proximal cap of the total occlusion.
99. The method according to Clause 98, wherein the method further comprises an additional intervention applied to a region of the total occlusion comprising the divot in the proximal cap of the total occlusion.
100. The method according to Clause 99, wherein the additional intervention comprises passing a conventional guidewire through the divot in the proximal cap of the total occlusion.
101. The method of Clause 97, wherein modifying the proximal cap of the total occlusion to receive a guidewire comprises punching a hole in the proximal cap of the total occlusion.
102. The method according to Clause 101, wherein the method further comprises an additional intervention applied to a region of the total occlusion comprising the hole in the proximal cap of the total occlusion.
103. The method according to Clause 102, wherein the additional intervention comprises passing a conventional guidewire through the hole in the proximal cap of the total occlusion.
104. A distal crosser unit comprising:
   (a) a microcatheter having a guidewire lumen;
   (b) a guidewire present in the guidewire lumen and extending beyond the distal end of the microcatheter;
   (c) a proximal balloon attached to both the microcatheter and the guidewire, wherein the proximal balloon is configured to longitudinally expand; and
   (d) a distal anchor member present on the guidewire.
105. The distal crosser unit of Clause 104 configured so that longitudinal expansion of the proximal balloon applies a longitudinal force to the guidewire.
106. The distal crosser unit of Clause 105, wherein the longitudinal force applied to the guidewire advances the guidewire across the total occlusion.
107. The distal crosser unit of any of Clauses 104 to 105, wherein the distal crosser unit is configured such that inflation of the proximal balloon advances the guidewire by a specified stroke-per-cycle length.
108. The distal crosser unit of Clause 107, wherein the stroke-per-cycle length is configurable based on pressure applied to the proximal balloon.
109. The distal crosser unit of any of Clauses 104 to 108, wherein the proximal balloon is further configured to expand radially.
110. The distal crosser unit of any of Clauses 104 to 109, wherein the proximal balloon comprises a passive feature for holding the proximal balloon in a fixed position relative to the chronic total occlusion.
111. The distal crosser unit of Clause 110, wherein the passive feature comprises a rough exterior surface or a serrated surface or a rough edge or a serrated edge.
112. The distal crosser unit of any of Clauses 104 to 111, wherein the proximal balloon is tapered.
113. The distal crosser unit of any of Clauses 104 to 112, wherein the proximal balloon has a high circumferential stiffness.
114. The distal crosser unit of any of Clauses 104 to 113, wherein the proximal balloon is non-compliant.
115. The distal crosser unit of any of Clauses 104 to 114, wherein the proximal balloon is attached to a distal region of the microcatheter and to a distal region of the guidewire.
116. The distal crosser unit of Clauses 104 to 115, wherein the proximal balloon is configured to be folded in a configuration that enhances longitudinal expansion upon inflation.
117. The distal crosser unit of Clause 116, wherein the proximal balloon is configured to return to the folded configuration upon deflation.
118. The distal crosser unit of any of Clauses 116 to 117, wherein the proximal balloon is folded in a C-shape.
119. The distal crosser unit of any of Clauses 104 to 118, wherein the distal anchor member comprises a passive feature for holding the distal anchor member in a fixed position relative to the total chronic occlusion.
120. The distal crosser unit of Clause 119, wherein the passive feature comprises a rough exterior surface or a serrated exterior surface or a rough edge or a serrated edge.
121. The distal crosser unit of any of Clauses 104 to 120, wherein the microcatheter comprises a first fluidic passage configured to propagate pressure along the first fluidic passage from a proximal region of the microcatheter to the proximal balloon.
122. The distal crosser unit of Clause 121, wherein the guidewire lumen of the microcatheter comprises the first fluidic passage.
123. The distal crosser unit of any of Clauses 121 to 122, wherein the first fluidic passage comprises a first fluid.
124. The distal crosser unit of Clause 123, wherein the first fluid comprises a saline solution or a contrast fluid.
125. The distal crosser unit of any of Clauses 104 to 124, wherein a region of the microcatheter is tapered.

126. The distal crosser unit of any of Clauses 104 to 125, wherein the distal anchor member comprises a distal balloon attached to the guidewire and configured to radially expand.
127. The distal crosser unit of Clause 126, wherein the distal balloon is configured to conform to a diameter of the guidewire upon deflation.
128. The distal crosser unit of any of Clauses 126 to 127, wherein the distal balloon is compliant.
129. The distal crosser unit of any of Clauses 126 to 128, wherein the guidewire comprises a second fluidic passage configured to propagate pressure along the second fluidic passage to the distal balloon.
130. The distal crosser unit of Clause 129, wherein the second fluidic passage comprises a second fluid.
131. The distal crosser unit of Clause 130, wherein the second fluid comprises a saline solution or a contrast fluid.
132. The distal crosser unit of any of Clauses 129 to 131, wherein the guidewire comprises porting holes fluidically coupling the second fluidic passage to the distal balloon.
133. The distal crosser unit of any of Clauses 104 to 132, wherein the microcatheter and the guidewire are coaxial.
134. The distal crosser unit of any of Clauses 104 to 133, further comprising a spring connecting the microcatheter to the guidewire.
135. The distal crosser unit of Clause 134, wherein the spring is configured to stretch upon longitudinal expansion of the proximal balloon.
136. The distal crosser unit of Clause 135, wherein the spring is configured to bias the guidewire and the microcatheter into a relatively proximal position.
137. The distal crosser unit of any of Clauses 134 to 136, wherein the spring is configured to apply longitudinal tension to the microcatheter and the guidewire upon longitudinal expansion of the proximal balloon.
138. The distal crosser unit of any of Clauses 134 to 137, wherein the spring is a continuation of the distal end of the microcatheter configured to act as a spring.
139. The distal crosser unit of any of Clauses 134 to 138, wherein the spring is integrated into the proximal balloon.
140. The distal crosser unit of any of Clauses 134 to 139, wherein the spring is configured in a helical configuration or a wave configuration.
141. The distal crosser unit of any of Clauses 104 to 140, wherein the distal end of the guidewire is configured to form a tapered guidewire core.
142. The distal crosser unit of Clause 141, wherein the distal crosser unit further comprises a guidewire tip comprising a guidewire coil attached to the tapered guidewire core.
143. The distal crosser unit of Clause 142, wherein the guidewire tip is a blunt tip or a sharp tip.
144. The distal crosser unit of any of Clauses 142 to 143, wherein the guidewire tip is an atraumatic tip.
145. The distal crosser unit of Clauses 142 to 144, wherein the guidewire tip is shaped based on a pathology of the total occlusion.
146. The distal crosser unit of any of Clauses 104 to 145, further configured so that the distal end of the distal crosser unit can be steered by rotating the microcatheter or the guidewire.
147. The distal crosser unit of Clause 146, wherein the microcatheter or the guidewire comprise a region where the microcatheter or the guidewire are relatively stiff.
148. The distal crosser unit of any of Clauses 104 to 147, further comprising a steering spring configured to steer the microcatheter or the guidewire.
149. The distal crosser unit of any of Clauses 104 to 148, further comprising a steering cable configured such that proximally retracting the steering cable causes the distal crosser unit to change direction.
150. A kit comprising a distal crosser unit according to any of Clauses 104 to 149.
151. The kit according to Clause 1, further comprising an actuator as claused in any of Clauses 1 to 61.
152. The kit according to any of Clauses 150 to 151, wherein one or more components of the kit are reusable.

In at least some of the previously described embodiments, one or more elements used in an embodiment can interchangeably be used in another embodiment unless such a replacement is not technically feasible. It will be appreciated by those skilled in the art that various other omissions, additions and modifications may be made to the methods and structures described above without departing from the scope of the claimed subject matter. All such modifications and changes are intended to fall within the scope of the subject matter, as defined by the appended claims.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into sub-ranges as discussed above. Finally, as will be understood by one skilled in the art, a range includes each individual member. Thus, for example, a group having 1-3 articles refers to groups having 1, 2, or 3 articles. Similarly, a group having 1-5 articles refers to groups having 1, 2, 3, 4, or 5 articles, and so forth.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Moreover, nothing disclosed herein is intended to be dedicated to the public regardless of whether such disclosure is explicitly recited in the claims.

The scope of the present invention, therefore, is not intended to be limited to the exemplary embodiments shown and described herein. Rather, the scope and spirit of present invention is embodied by the appended claims. In the claims, 35 U.S.C. § 112 (f) or 35 U.S.C. § 112 (6) is expressly defined as being invoked for a limitation in the claim only when the exact phrase "means for" or the exact phrase "step for" is recited at the beginning of such limitation in the claim; if such exact phrase is not used in a limitation in the claim, then 35 U.S.C. § 112 (f) or 35 U.S.C. § 112 (6) is not invoked.

What is claimed is:

1. A microcatheter system for crossing total occlusions, the system comprising:
    (a) a distal crosser unit comprising:
        (i) a microcatheter having a guidewire lumen;
        (ii) a guidewire present in the guidewire lumen and extending beyond the distal end of the microcatheter;
        (iii) a proximal balloon attached to both the microcatheter and the guidewire, wherein the proximal balloon is configured to longitudinally expand; and
        (iv) a distal anchor member present on the guidewire; and
    (b) an actuator configured to sequentially inflate and deflate the proximal balloon such that the distal crosser unit progressively moves across a chronic total occlusion.

2. The microcatheter system of claim 1, wherein the distal crosser unit is configured so that longitudinal expansion of the proximal balloon applies a longitudinal force to the guidewire.

3. The microcatheter system of claim 2, wherein the longitudinal force applied to the guidewire advances the guidewire across the total occlusion.

4. The microcatheter system of claim 3, wherein the distal crosser unit is configured such that inflation of the proximal balloon advances the guidewire by a specified stroke-per-cycle length.

5. The microcatheter system of claim 4, wherein the stroke-per-cycle length is configurable based on pressure applied to the proximal balloon.

6. The microcatheter system of claim 1, wherein the proximal balloon is further configured to expand radially.

7. The microcatheter system of claim 1, wherein the proximal balloon comprises a passive feature for holding the proximal balloon in a fixed position relative to the chronic total occlusion.

8. The microcatheter system of claim 7, wherein the passive feature comprises a rough exterior surface or a serrated surface or a rough edge or a serrated edge.

9. The microcatheter system of claim 1, wherein the proximal balloon is tapered.

10. The microcatheter system of claim 1, wherein the proximal balloon is attached to a distal region of the microcatheter and to a distal region of the guidewire.

11. The microcatheter system of claim 1, wherein the proximal balloon is configured to be folded in a configuration that enhances longitudinal expansion upon inflation.

12. The microcatheter system of claim 1, wherein the distal anchor member comprises a passive feature for holding the distal anchor member in a fixed position relative to the total chronic occlusion.

13. The microcatheter system of claim 1, wherein
    the distal anchor member comprises a distal balloon attached to the guidewire and configured to radially expand, and the actuator is further configured to sequentially inflate and deflate the distal balloon.

14. The microcatheter system of claim 1, further comprising a guide sheath for aligning the distal crosser unit with a proximal cap of the total occlusion.

15. The microcatheter system of claim 1, wherein the distal crosser unit further comprises a spring connecting the microcatheter to the guidewire.

16. The microcatheter system of claim 15, wherein the spring is configured to stretch upon longitudinal expansion of the proximal balloon.

17. The microcatheter system of claim 15, wherein the spring is configured to apply longitudinal tension to the microcatheter and the guidewire upon longitudinal expansion of the proximal balloon.

18. The microcatheter system of claim 15, wherein the spring is integrated into the proximal balloon.

19. The microcatheter system of claim 15, wherein the spring is configured in a helical configuration or a wave configuration.

20. A method of crossing a total occlusion, the method comprising:

deploying a microcatheter system so that the distal end of the microcatheter system is adjacent to the proximal end of the total occlusion, the microcatheter system comprising:
   a distal crosser unit comprising:
      a microcatheter having a guidewire lumen;
      a guidewire present in the guidewire lumen and extending beyond the distal end of the microcatheter;
      a proximal balloon attached to both the microcatheter and the guidewire, wherein the proximal balloon is configured to longitudinally expand; and
      a distal anchor member present on the guidewire; and
an actuator configured to sequentially inflate and deflate the proximal balloon; and
engaging the actuator in a manner sufficient to sequentially inflate and deflate the proximal balloon and move the guidewire across the total occlusion.

\* \* \* \* \*